US008914055B2

(12) United States Patent  
Dimou et al.

(10) Patent No.: US 8,914,055 B2  
(45) Date of Patent: Dec. 16, 2014

(54) DYNAMIC RESOURCE SELECTION TO REDUCE INTERFERENCE THAT RESULTS FROM DIRECT DEVICE TO DEVICE COMMUNICATIONS

(75) Inventors: Konstantinos Dimou, San Francisco, CA (US); Gabor Fodor, Hasselby (SE); Tarcisio Fereira Maciel, Fortaleza (BR); Francisco Rodrigo Porto Cavalcanti, Fortaleza (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 345 days.

(21) Appl. No.: 13/525,752

(22) Filed: Jun. 18, 2012

(65) Prior Publication Data

US 2013/0252621 A1      Sep. 26, 2013

Related U.S. Application Data

(63) Continuation-in-part of application No. 13/425,836, filed on Mar. 21, 2012.

(51) Int. Cl.
```
H04B 7/00       (2006.01)
H04W 72/08      (2009.01)
H04W 4/02       (2009.01)
H04W 76/02      (2009.01)
```
(52) U.S. Cl.  
CPC .............. *H04W 72/082* (2013.01); *H04W 4/02* (2013.01); *H04W 4/025* (2013.01); *H04W 76/023* (2013.01)  
USPC ........... 455/517; 455/500; 455/509; 455/518; 455/67.11; 455/508; 370/260; 370/261; 370/268; 370/329; 370/310

(58) Field of Classification Search  
CPC ..... H04W 4/02; H04W 4/025; H04W 76/023; H04W 24/10; H04W 72/04  
USPC .............. 455/517, 500, 509, 508, 67.11, 518, 455/519, 524, 525, 445, 511, 515, 550.1, 455/426.1, 426.2, 403, 422.1; 370/260, 370/261, 268, 310, 328, 329, 338, 343  
See application file for complete search history.

(56) References Cited

U.S. PATENT DOCUMENTS

2004/0048609 A1    3/2004  Kosaka  
2007/0211677 A1    9/2007  Laroia et al.  
(Continued)

FOREIGN PATENT DOCUMENTS

EP            2012443 A2    1/2009  
WO       2011088619 A1    7/2011  
(Continued)

OTHER PUBLICATIONS

International Search Report and Written Opinion for PCT/IB2013/053631, mailed Nov. 22, 2013, 12 pages.  
(Continued)

*Primary Examiner* — Keith Ferguson  
(74) *Attorney, Agent, or Firm* — Withrow & Terranova, PLLC

(57) ABSTRACT

Systems and methods are disclosed for selecting resources for direct device to device (D2D) communications in a cellular communication network. In one embodiment, a downlink resource is selected as a resource for a direct D2D communication link between a first wireless device and a second wireless device if a base station serving each of the first and second wireless devices is equipped with an interference cancellation receiver and both the first and second wireless devices are less than a predefined threshold radio distance from their serving base station. An uplink resource is selected as a resource for the direct D2D communication link if the base station serving each of the first and second wireless devices is equipped with an interference cancellation receiver and at least one of the first and second wireless devices is more than the predefined threshold radio distance from its serving base station.

30 Claims, 38 Drawing Sheets

(56) References Cited

U.S. PATENT DOCUMENTS

| | | | |
|---|---|---|---|
| 2008/0310329 A1* | 12/2008 | Sun et al. .................. 370/280 |
| 2009/0010185 A1 | 1/2009 | Li et al. |
| 2009/0016229 A1 | 1/2009 | Wu et al. |
| 2009/0016261 A1 | 1/2009 | Laroia et al. |
| 2009/0016363 A1 | 1/2009 | Laroia et al. |
| 2009/0017843 A1 | 1/2009 | Laroia et al. |
| 2009/0034447 A1 | 2/2009 | Yu et al. |
| 2010/0093364 A1 | 4/2010 | Ribeiro et al. |
| 2011/0063995 A1 | 3/2011 | Chen et al. |
| 2011/0223953 A1 | 9/2011 | Lee et al. |
| 2011/0228666 A1 | 9/2011 | Barbieri et al. |
| 2012/0020213 A1 | 1/2012 | Horneman et al. |
| 2012/0044815 A1 | 2/2012 | Geirhofer et al. |
| 2012/0202542 A1 | 8/2012 | Dimou et al. |

FOREIGN PATENT DOCUMENTS

| | | |
|---|---|---|
| WO | 2011116815 A1 | 9/2011 |
| WO | 2011123799 A1 | 10/2011 |
| WO | 2012015698 A1 | 2/2012 |

OTHER PUBLICATIONS

International Search Report and Written Opinion for PCT/IB2013/054965 mailed Feb. 7, 2014, 10 pages.

Doppler, K. et al., "Mode Selection for Device-to-Device Communication Underlaying an LTE-Advanced Network," IEEE Wireless Communications and Networking Conference, Sydney, Australia, Apr. 2010, 6 pages.

Doppler, K. et al.,"Device-to-Device Communication as an Underlay to LTE-Advanced Networks," IEEE Communications Magazine, vol. 47, No. 12, Dec. 2009, pp. 42-49.

Corson, M.S. et al., "Towards Proximity-Aware Internetworking," IEEE Wireless Communications, Dec. 2010, pp. 26-33.

Peng, T. et al., "Interference Avoidance Mechanisms in the Hybrid Cellular and Device-2-Device Systems," 2009 IEEE 20th International Symposium on Personal, Indoor and Mobile Radio Communications, Sep. 2009, pp. 617-621.

Yu, C.H. et al., "Power Optimization of Device-to-Device Communication Underlaying Cellular Communication," IEEE International Conference on Communications, ICC, Dresden, Germany, Jun. 2009, 5 pages.

Li, Yu et al., "Adaptive TDD UL/DL Slot Utilization for Cellular Controlled D2D Communications," 2011 IEEE Global Mobile Congress, Oct. 17, 2011, pp. 1-6.

Yu, Chia-Hao et al., "On the Performance of Device-to-Device Underlay Communication with Simple Power Control," 2009 IEEE 69th Vehicular Technology Conference, Apr. 26-29, 2009, pp. 1-5, Barcelona, Spain.

International Search Report and Written Opinion for PCT/IB2013/052220, mailed Sep. 5, 2013, 15 pages.

Non-Final Office Action for U.S. Appl. No. 13/465,303, mailed Dec. 17, 2013, 13 pages.

International Search Report and Written Opinion for PCT/IB2013/056741, mailed Jan. 16, 2014, 12 pages.

Notice of Allowance for U.S. Appl. No. 13/425,836, mailed Aug. 22, 2014, 9 pages.

Final Office Action for U.S. Appl. No. 13/465,303, mailed Jun. 13, 2014, 15 pages.

Notice of Allowance for U.S. Appl. No. 13/465,303, mailed Aug. 15, 2014, 8 pages.

* cited by examiner

DYNAMIC RESOURCE SELECTION TO REDUCE INTERFERENCE THAT RESULTS FROM DIRECT DEVICE TO DEVICE COMMUNICATIONS

RELATED APPLICATIONS

This application is a Continuation-in-Part (CIP) of U.S. patent application Ser. No. 13/425,836, entitled DYNAMIC RESOURCE SELECTION TO REDUCE INTERFERENCE RESULTING FROM DIRECT DEVICE TO DEVICE COMMUNICATIONS which was filed on Mar. 21, 2012, the disclosure of which is hereby incorporated herein by reference in its entirety.

FIELD OF THE DISCLOSURE

The present disclosure relates to direct device to device communications in a cellular communication network and more particularly relates to reducing interference resulting from direct device to device communications in a cellular communication network.

BACKGROUND

Network-assisted direct device to device (D2D) communication is expected to be a key feature supported by next generation cellular communication networks. FIG. 1 illustrates a cellular communication network 10 that enables direct D2D communications. As illustrated, the cellular communication network 10 includes a base station 12 that serves a corresponding cell 14 of the cellular communication network 10. While only one base station 12 is illustrated, the cellular communication network 10 includes numerous base stations 12 serving corresponding cells 14. In this example, wireless devices (WDs) 16, 18, 20, and 22 are located within the cell 14. The wireless devices 16 and 18 are in proximity to one another. As such, when the wireless devices 16 and 18 desire to establish a bearer link, rather than establishing the bearer link through the base station 12, the cellular communication network 10 assists the wireless devices 16 and 18 to establish a direct D2D communication link (i.e., a direct D2D bearer link) between one another. More specifically, through signaling with the base station 12 or some other mechanism, the wireless devices 16 and 18 discover one another using a D2D device discovery process and then establish a D2D communication link directly between one another rather than through the base station 12.

Direct D2D communication is possible regardless of whether the cellular communication network 10 is Frequency Division Duplex (FDD) (i.e., uses different uplink and downlink frequency bands) or Time Division Duplex (i.e., using the same frequency band but different time slots for uplink and downlink). However, it is commonly accepted that direct D2D communication links, such as that established between the wireless devices 16 and 18, is preferably a TDD communication link where transmission by one wireless device uses the same resources as reception by the other wireless device. These "resources" are physical frequency and/or time resources depending on the particular implementation of the cellular communication network 10. TDD (i.e., half duplex operation) is preferred because operating a transmitter and receiver in the same frequency band in a half duplex fashion is easier to implement than a full duplex FDD implementation.

In order to provide spectral efficiency, it is preferable for the D2D communication links to use the same resources as those used by the cellular communication network 10 where the cellular communication network 10 performs actions such as mode selection, network-controlled scheduling, and power control. In this example, the D2D communication link uses either an uplink resource or a downlink resource of the cellular communication network 10 that is also assigned to the wireless device 22. While using the same resources as the cellular communication network 10 provides spectral efficiency, doing so also gives rise to new intra-cell and inter-cell interference situations. For example, due to the presence of D2D communication links, intra-cell orthogonality is no longer maintained.

Specifically, when the D2D communication link between the wireless devices 16 and 18 uses a downlink (DL) resource of the cellular communication network 10, strong intra-cell interference may be caused for the wireless device 22, which also uses the same DL resource, as illustrated in FIG. 2. In addition, the transmissions over this D2D communication link between the wireless devices 16 and 18 may cause inter-cell interference to wireless devices located in neighboring cells in the cellular communication network 10. For simplicity and for the clarity of presentation, the case of intra-cell DL interference is displayed in FIG. 2. The case of inter-cell, or other cell, interference resulting from the direct D2D communication link between the wireless devices 16 and 18 can be easily deduced. The transmission from, for instance, the wireless device 16 over the D2D communication link to the wireless device 18 using the DL resource of the cellular communication network 10 may result in interference to a wireless device located in a neighboring cell that uses the same DL resource. It should also be noted that transmissions by the wireless devices 16 and 18 over the direct D2D communication link result in interference to other nearby wireless devices (not shown) regardless of whether those other wireless devices use the same DL resource (e.g., the same resource blocks in an Orthogonal Frequency Division Multiplexing (OFDM) downlink frequency band).

Similarly, when the D2D communication link between the wireless devices 16 and 18 uses an uplink (UL) resource of the cellular communication network 10, strong intra-cell interference may be caused to the base station 12 serving the cell 14 for the uplink from the wireless device 22, which uses the same UL resource, as illustrated in FIG. 3. For instance, transmission by the wireless device 16 over the D2D communication link to the wireless device 18 using an UL frequency band of the cellular communication network 10 may result in interference to the base station 12 for an uplink from the wireless device 22 using the same UL frequency band. As with the DL interference, the case of inter-cell interference resulting from D2D communication using UL resources can easily be deduced. Transmissions from, for example, the wireless device 16 over the D2D communication link to the wireless device 18 using the UL resource may also generate interference to base stations serving neighboring cells for uplinks from wireless devices in the neighboring cells that use the same UL resource, which are referred to herein as neighboring base stations. It should also be noted that transmissions by the wireless devices 16 and 18 over the direct D2D communication link using the UL resource result in interference to the base station 12 regardless of whether other wireless devices (not shown) use the same UL resource (e.g., the same resource blocks in an OFDM uplink frequency band).

From the discussion above, it is readily understood that D2D communication using the same resources used for downlinks and uplinks in the cellular communication network 10 results in new interference scenarios not envisioned in conventional cellular communication networks. As such, there is a need for systems and methods for minimizing, or at least substantially reducing, interference resulting from D2D communication in a cellular communication network.

SUMMARY

Systems and methods are disclosed for selecting resources for direct device to device (D2D) communications in a cellular communication network. Preferably, resources for the direct D2D communications are selected to minimize, or at least substantially reduce, interference that results from the direct D2D communications in the cellular communication network. In one embodiment, a downlink resource of the cellular communication network is selected as a resource for a direct D2D communication link between a first wireless device and a second wireless device if a base station serving each of the first and second wireless devices is equipped with an interference cancellation receiver and both of the first and second wireless devices are less than a predefined threshold radio distance from their serving base station. An uplink resource of the cellular communication network is selected as a resource for the direct D2D communication link between the first wireless device and the second wireless device if the base station serving each of the first and second wireless devices is equipped with an interference cancellation receiver and at least one of the first and second wireless devices is more than the predefined threshold radio distance from its serving base station. In one embodiment, the base station serving the first wireless device and the base station serving the second wireless device are the same base station. In another embodiment, the base station serving the first wireless device and the base station serving the second wireless device are neighboring base stations in the cellular communication network.

More specifically, in one particular embodiment, a network node obtains an indication of a radio distance between a first wireless device and a base station serving the first wireless device. Similarly, the network node obtains an indication of a radio distance between a second wireless device and a base station serving the second wireless device. The base stations serving the first and second wireless devices may be the same base station or neighboring base stations in the cellular communication network. If the serving base station(s) is equipped with an interference cancellation receiver and the radio distance of both the first wireless device and the second wireless device is less than a predefined threshold radio distance, then a downlink resource of the cellular communication network is selected as a resource for a direct D2D communication link between the first wireless device and the second wireless device. Conversely, if the serving base station(s) is equipped with an interference cancellation receiver and at least one of the radio distances for the first and second wireless devices is greater than the predefined threshold radio distance, then an uplink resource of the cellular communication network is selected as a resource for a direct D2D communication link between the first wireless device and the second wireless device.

In another embodiment, a downlink resource of the cellular communication network is selected as a resource for a direct D2D communication link between a first wireless device and a second wireless device if a base station serving each of the first and second wireless devices is equipped with an interference cancellation receiver, both the first and second wireless devices are less than a predefined threshold radio distance from their serving base station, and at least a predefined threshold amount (e.g., a majority) of one or more wireless devices that are near the first and second wireless devices are equipped with an interference cancellation receiver. An uplink resource of the cellular communication network is selected as a resource for the direct D2D communication link between the first wireless device and the second wireless device if the base station serving each of the first and second wireless devices is equipped with an interference cancellation receiver and at least one of the first and second wireless devices is more than the predefined threshold radio distance from its serving base station. An uplink resource of the cellular communication network is also selected as a resource for the direct D2D communication link between the first and second wireless devices if a base station serving each of the first and second wireless devices is equipped with an interference cancellation receiver, both the first and second wireless devices are less than a predefined threshold radio distance from their serving base station, and less than a predefined threshold amount (e.g., a majority) of one or more wireless devices that are near the first and second wireless devices are equipped with an interference cancellation receiver. In one embodiment, the base station serving the first wireless device and the base station serving the second wireless device are the same base station. In another embodiment, the base station serving the first wireless device and the base station serving the second wireless device are neighboring base stations in the cellular communication network.

More specifically, in one particular embodiment, a network node obtains an indication of a radio distance between a first wireless device and a base station serving the first wireless device. Similarly, the network node obtains an indication of a radio distance between a second wireless device and a base station serving the second wireless device. The base stations serving the first and second wireless devices may be the same base station or neighboring base stations in the cellular communication network. If the serving base station(s) is equipped with an interference cancellation receiver, the radio distance of both the first and second wireless devices is less than a predefined threshold radio distance, and at least a predefined threshold amount (e.g., a majority) of one or more wireless devices that are near the first and second wireless devices are equipped with an interference cancellation receiver, a downlink resource of the cellular communication network is selected as a resource for a direct D2D communication link between the first wireless device and the second wireless device. If the serving base station(s) is equipped with an interference cancellation receiver and at least one of the first and second wireless devices is more than the predefined threshold radio distance from its serving base station, an uplink resource of the cellular communication network is selected as a resource for the direct D2D communication link between the first wireless device and the second wireless device. If the serving base station(s) is equipped with an interference cancellation receiver, both the first and second wireless devices are less than a predefined threshold radio distance from their serving base station, and less than a predefined threshold amount (e.g., a majority) of one or more wireless devices that are near the first and second wireless devices are equipped with an interference cancellation receiver, an uplink resource of the cellular communication network is selected as a resource for the direct D2D communication link between the first and second wireless devices.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
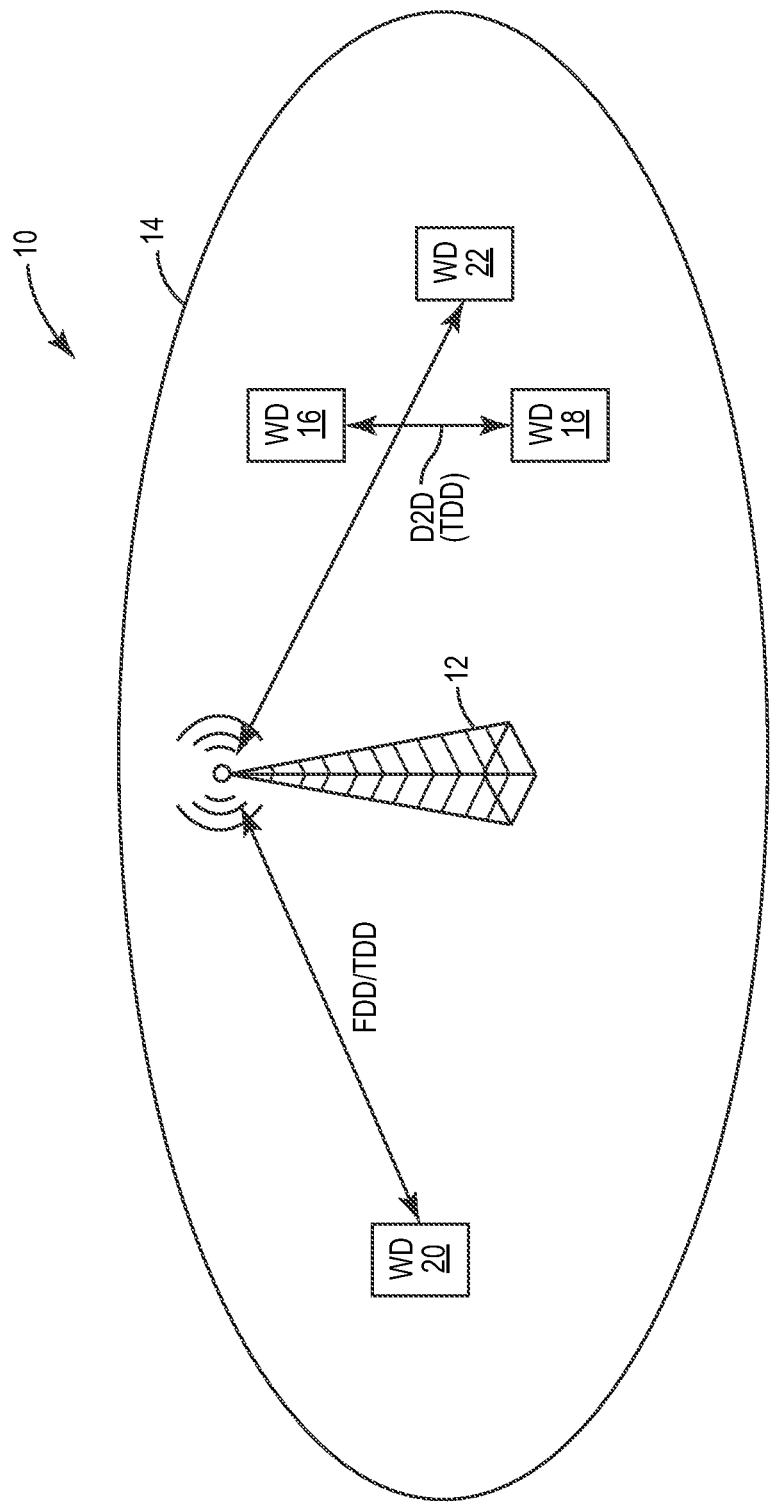
FIG. 1 illustrates a direct device-to-device (D2D) communication link in a cellular communication network.
Figure 2:
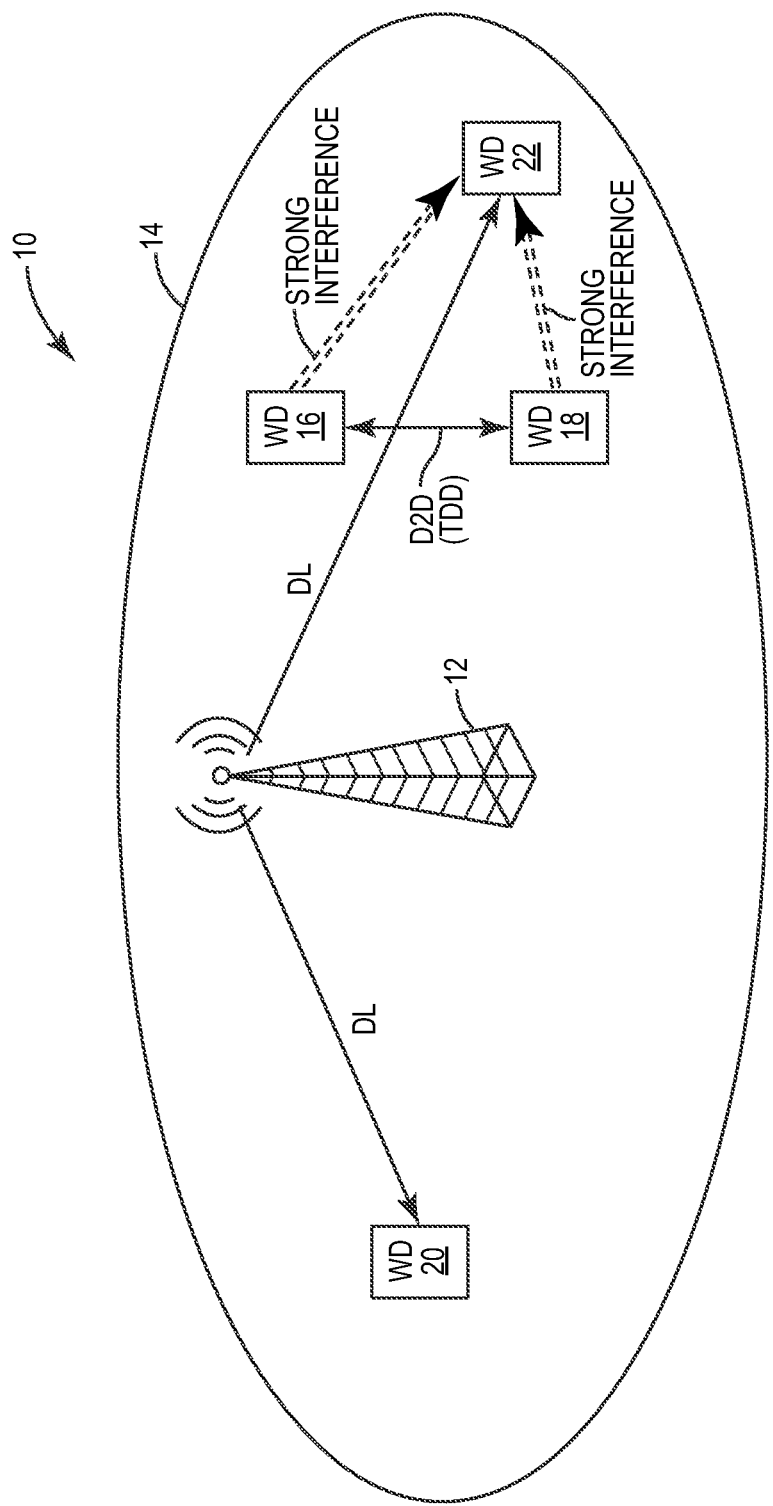
FIG. 2 illustrates a direct D2D communication link that causes strong interference in a downlink from a base station in a cellular communication network.
Figure 3:
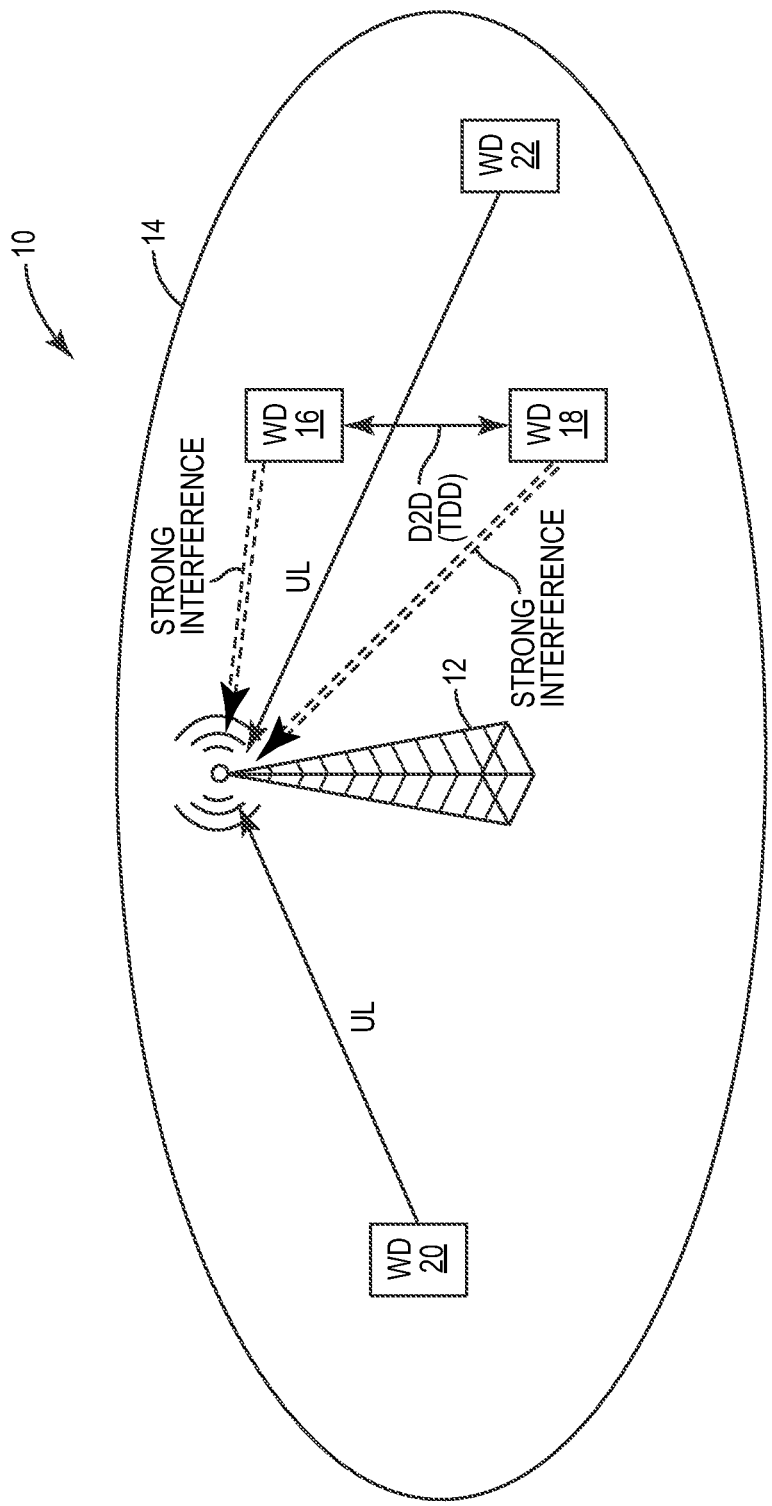
FIG. 3 illustrates a direct D2D communication link that causes strong interference in an uplink from a base station in a cellular communication network.
Figure 4A:
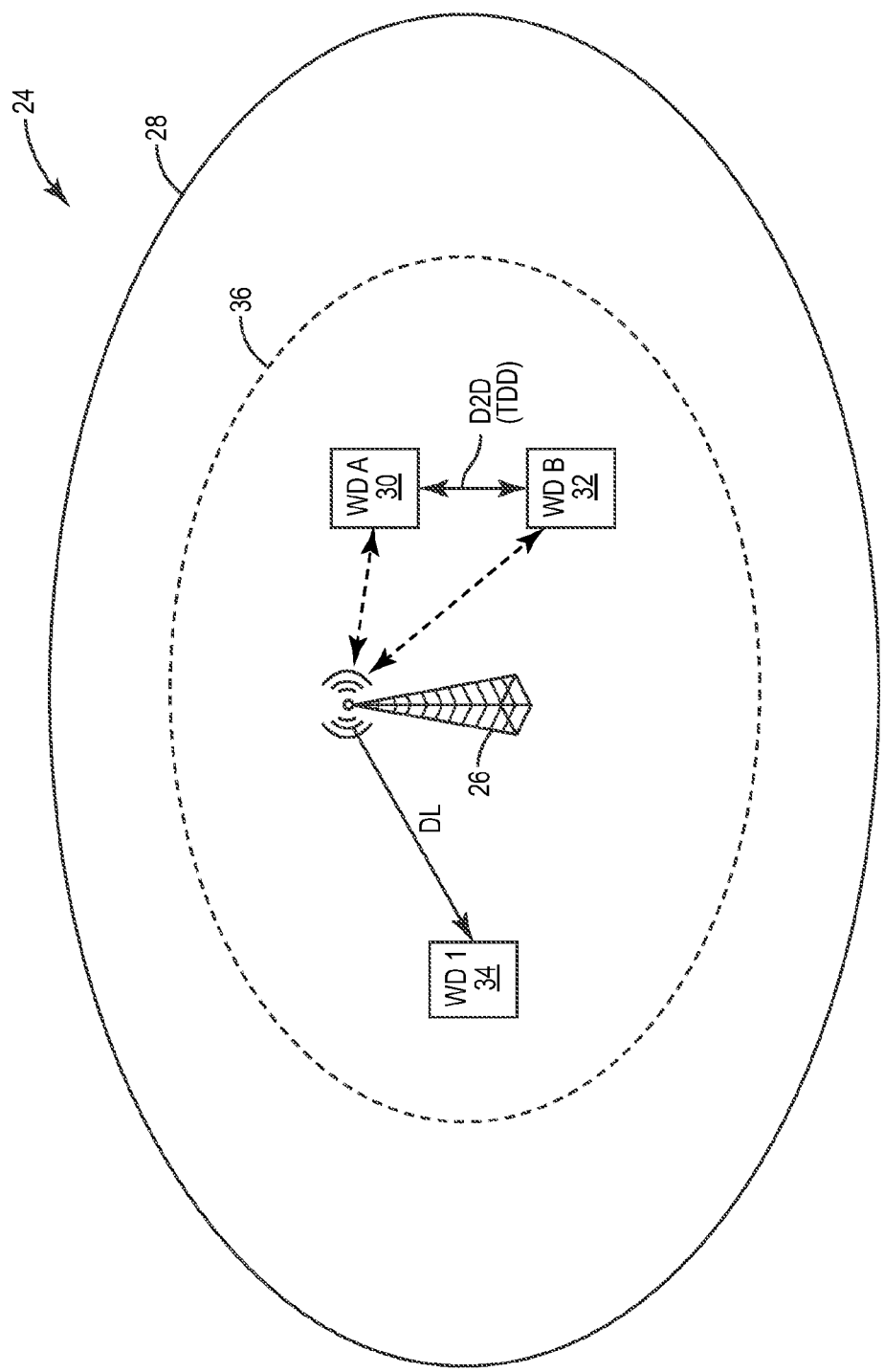
Figure 4B:
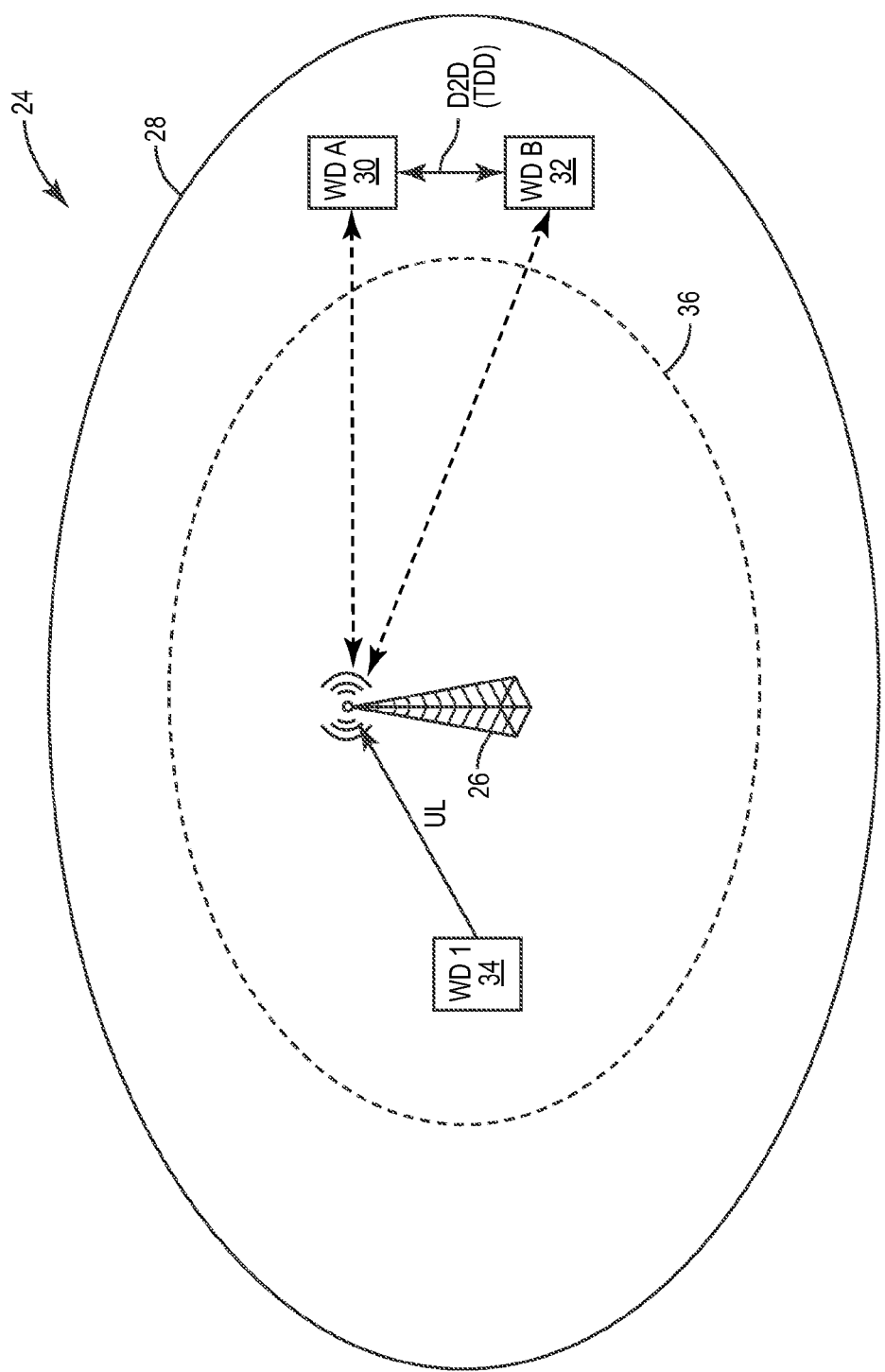
Figure 4C:
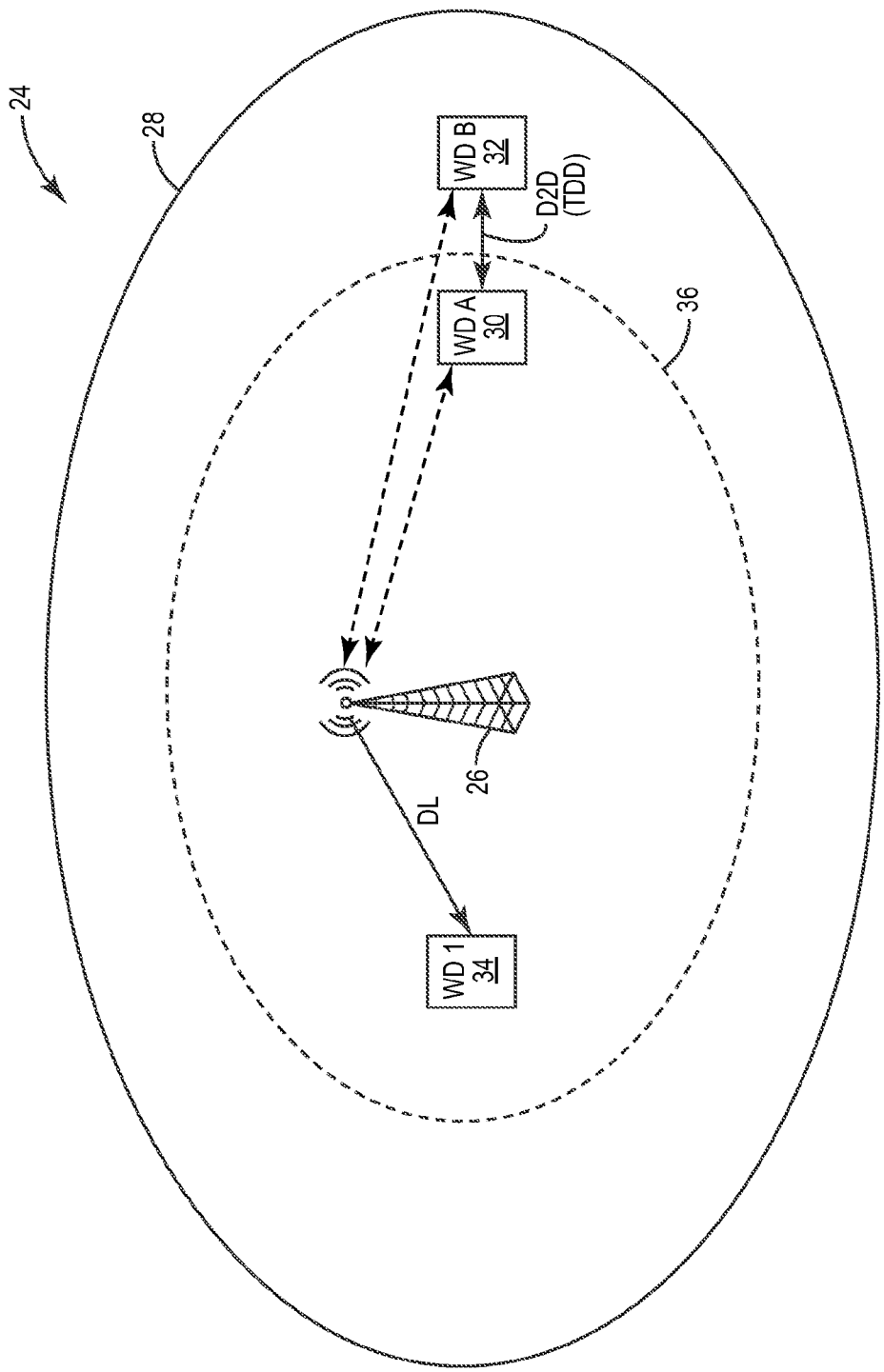
Figure 5:
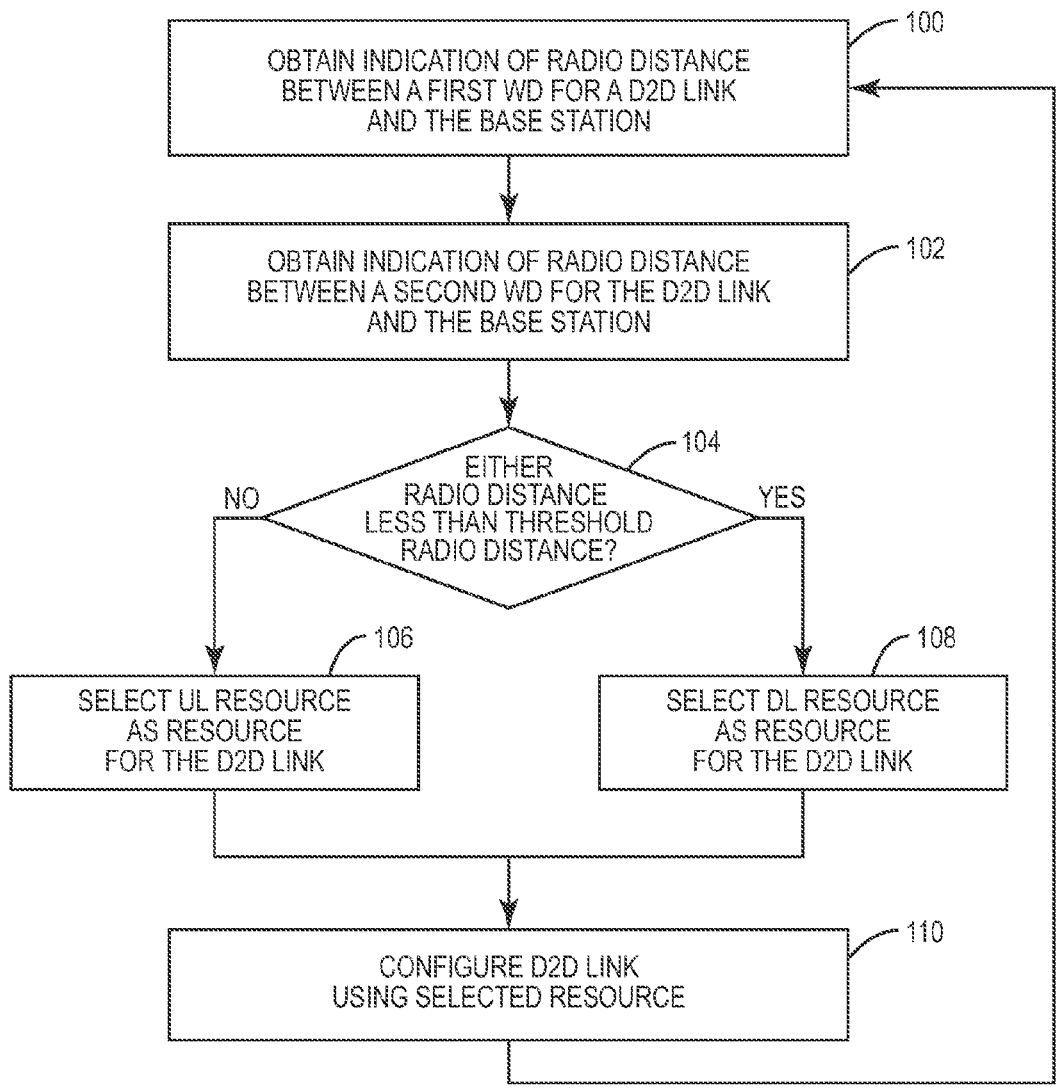
Figure 6:
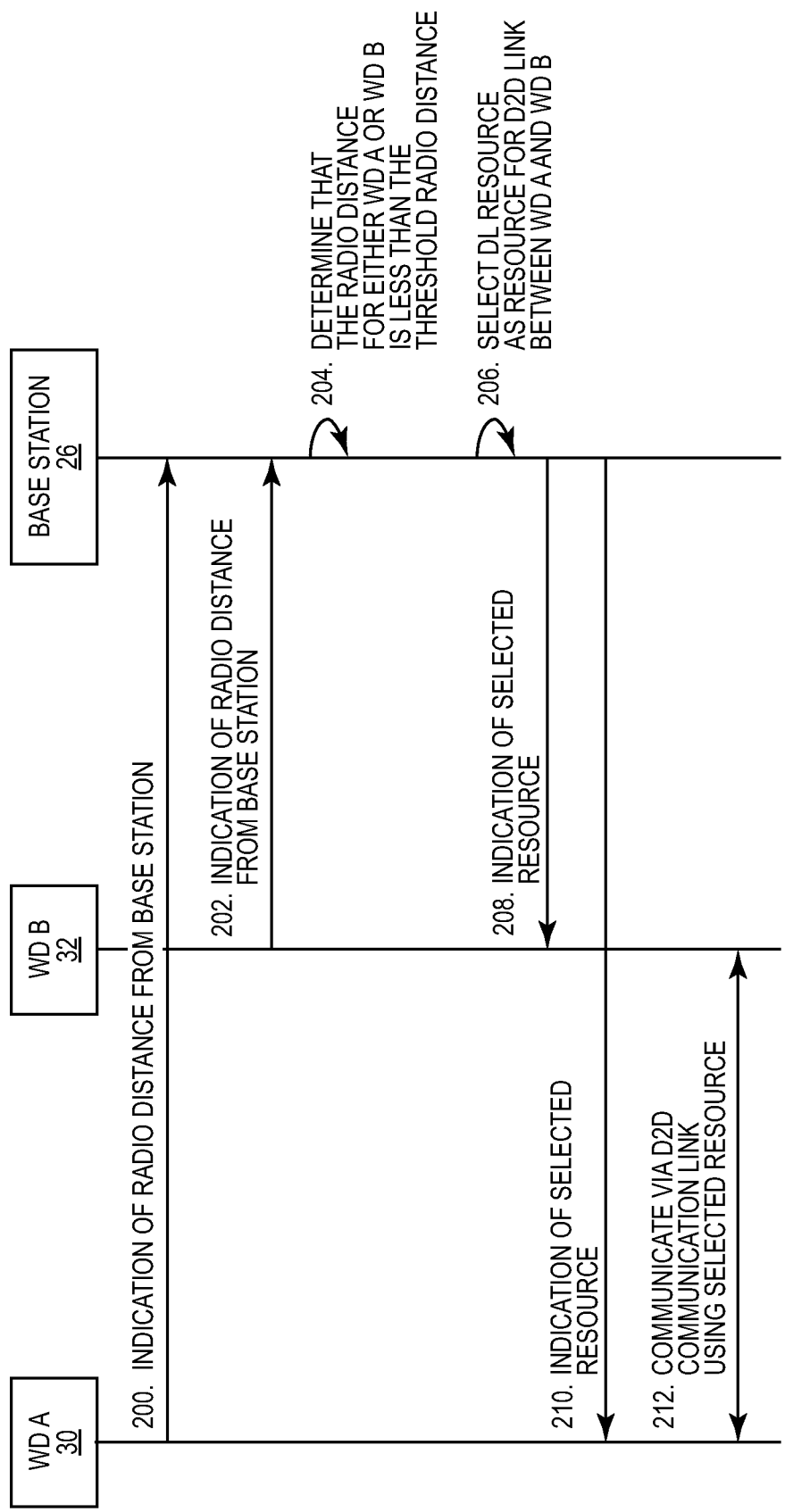
Figure 7:
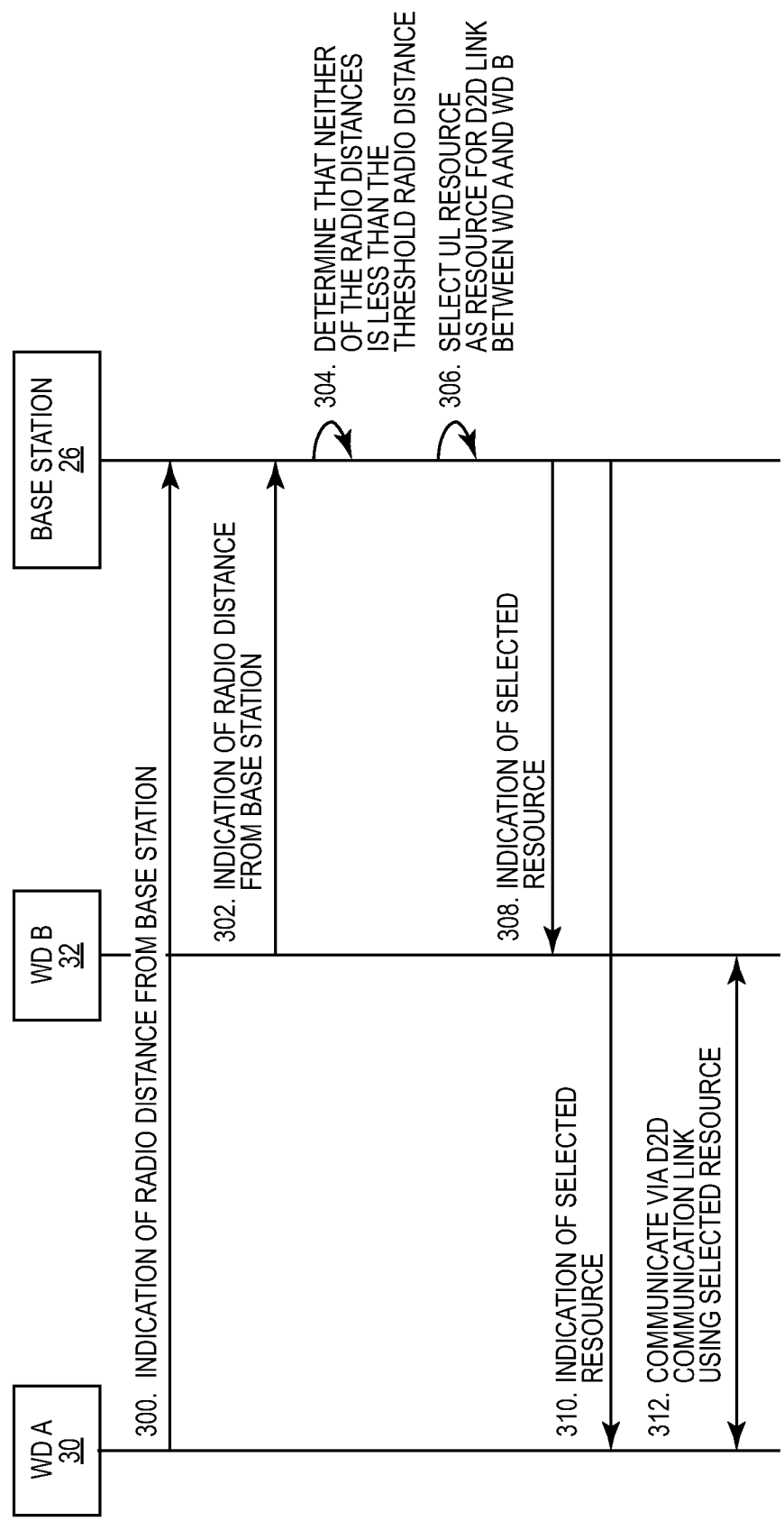
Figure 8:
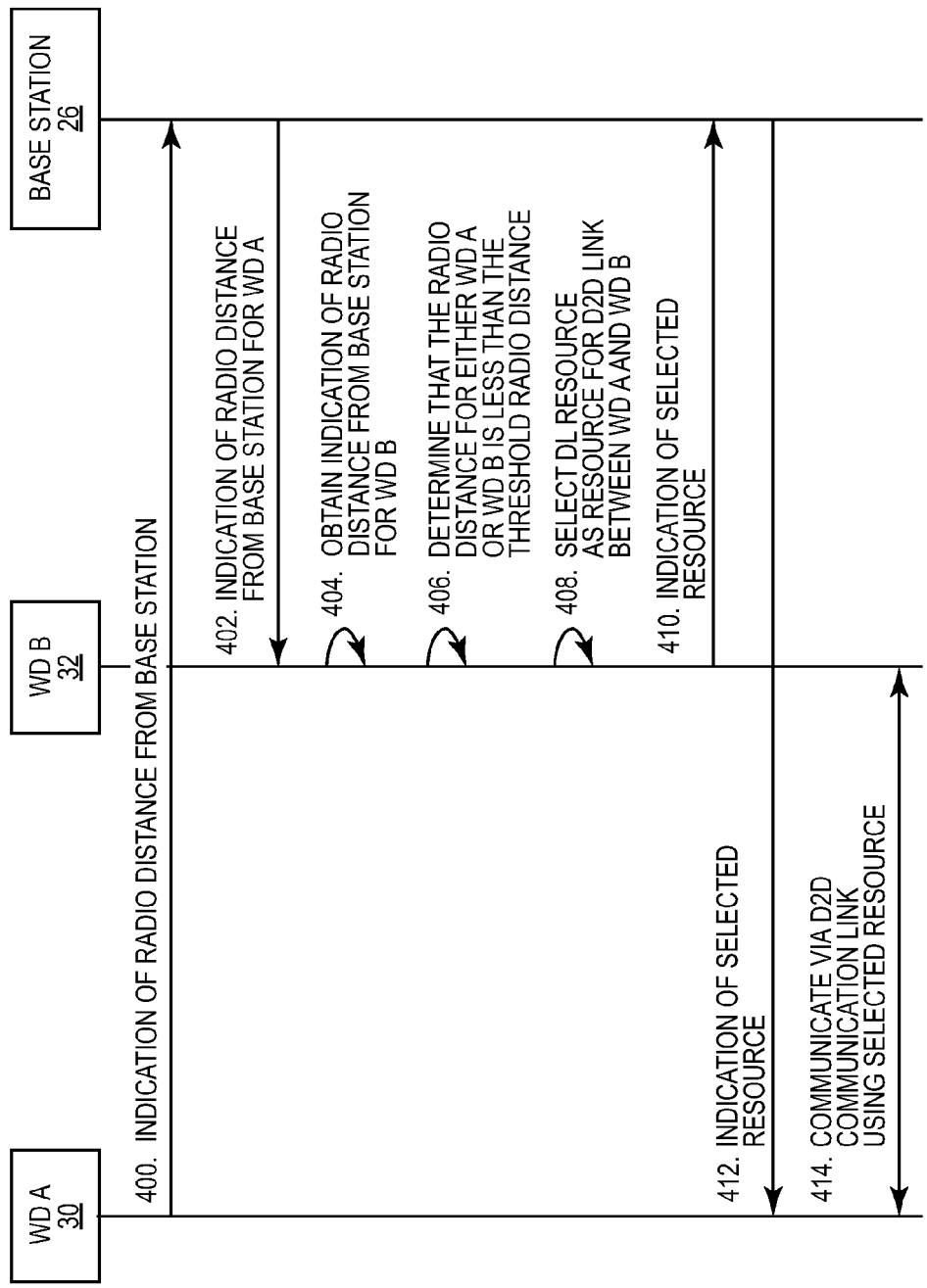
Figure 9:
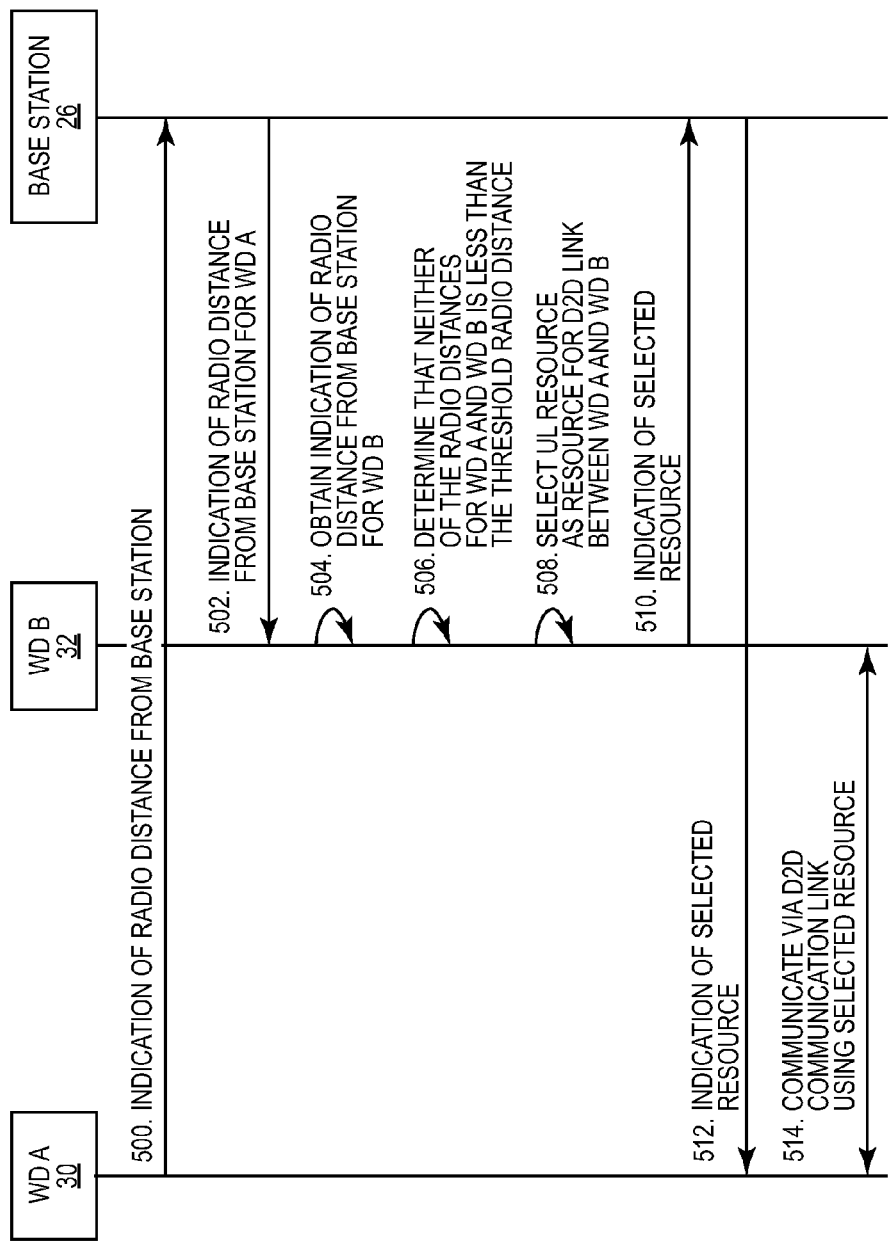
Figure 10:
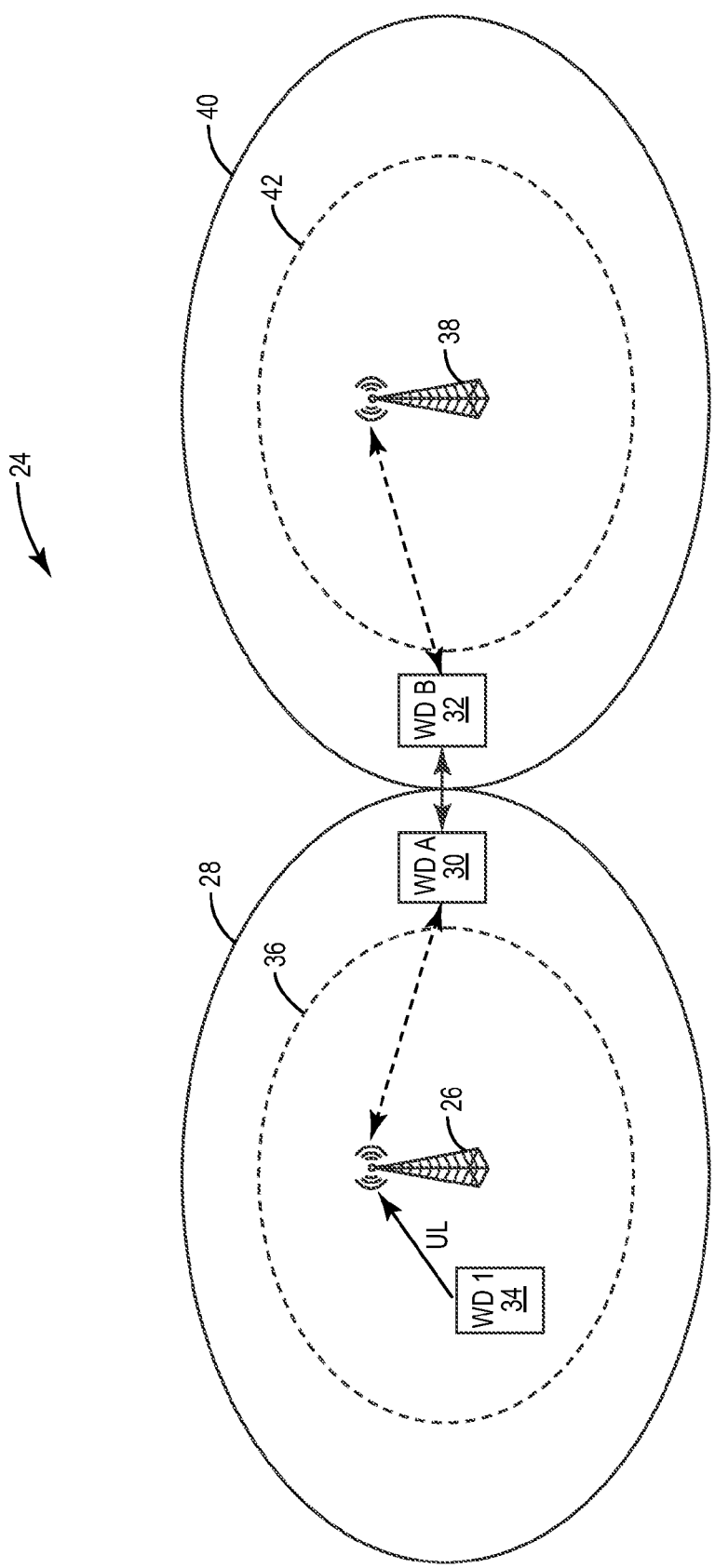
Figure 11:
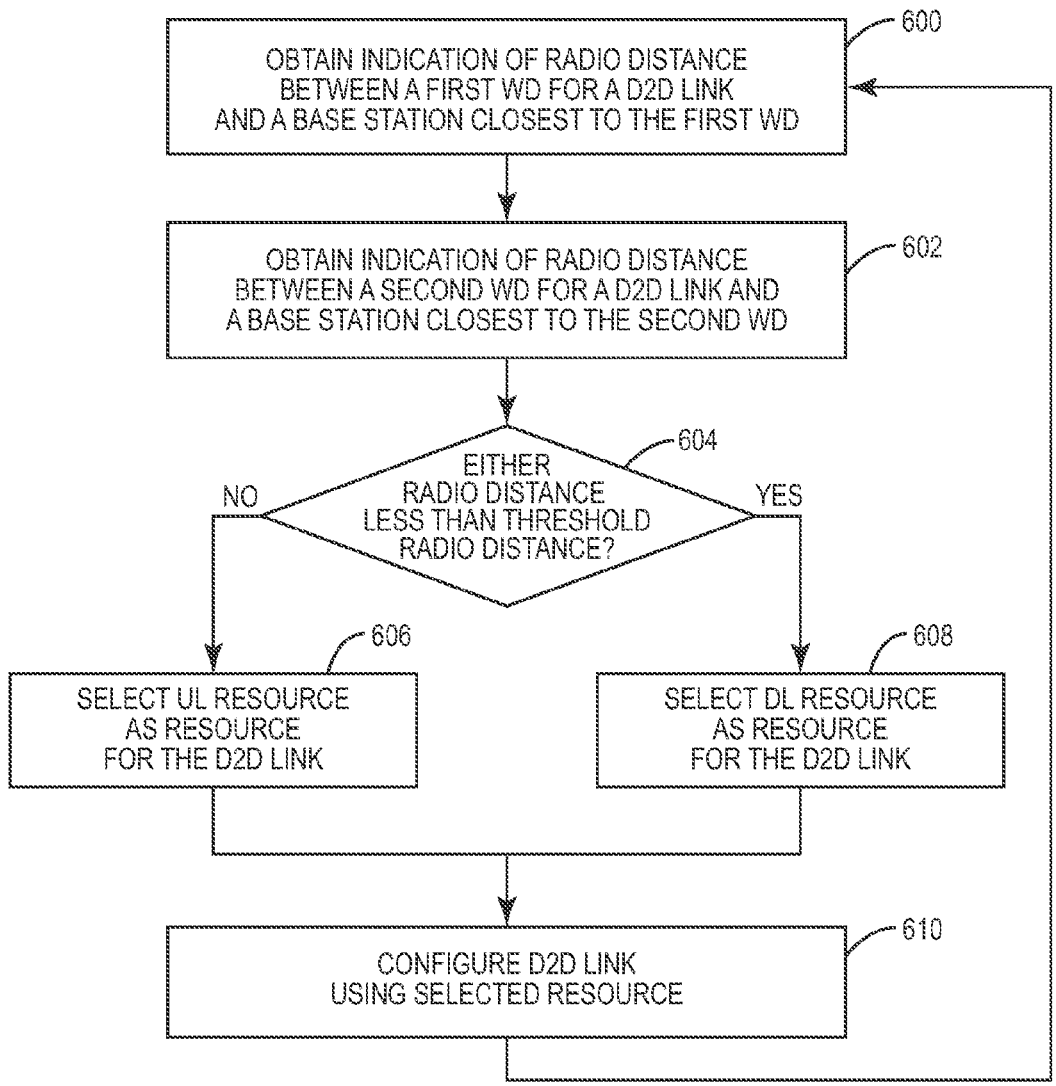
Figure 12:
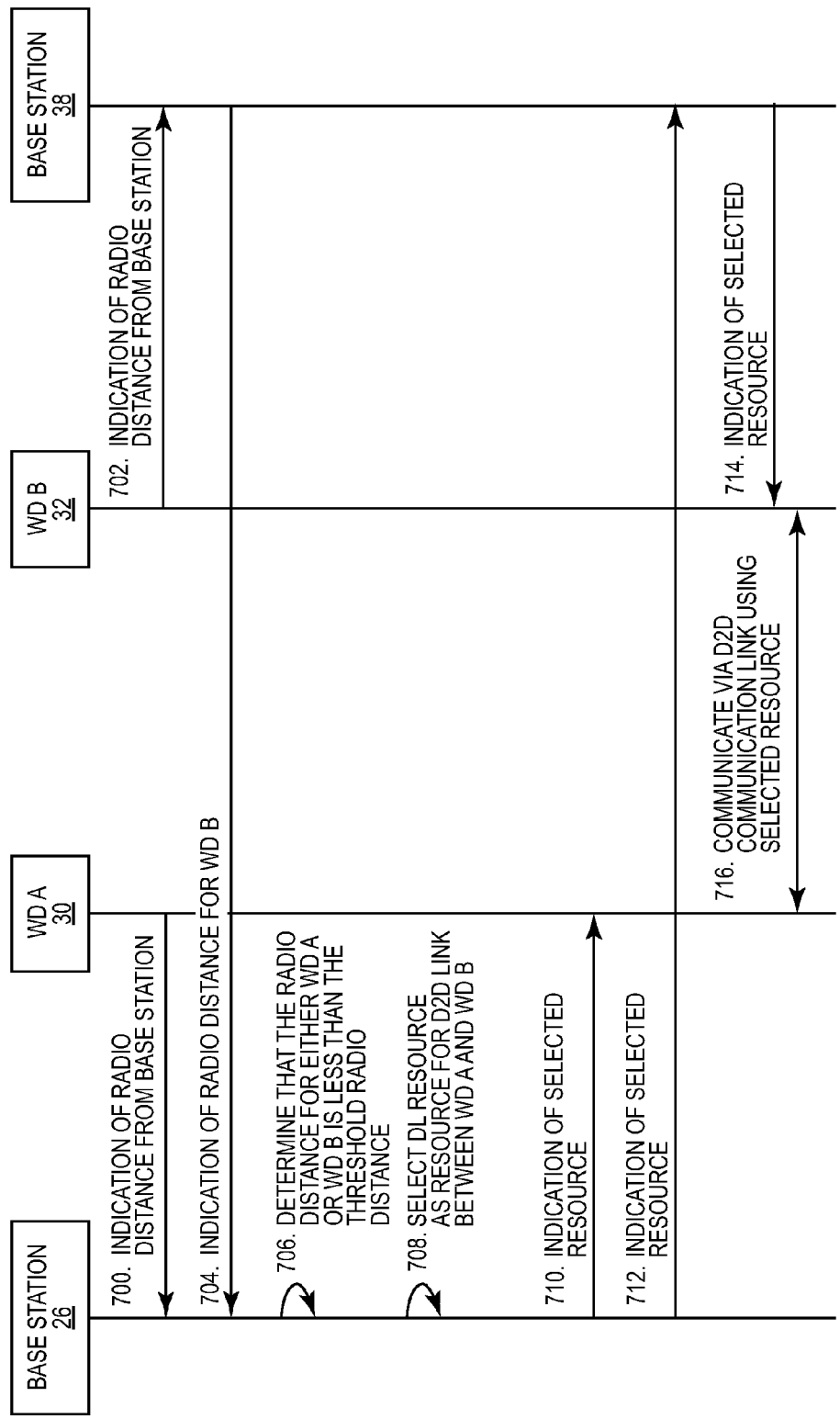
Figure 13:
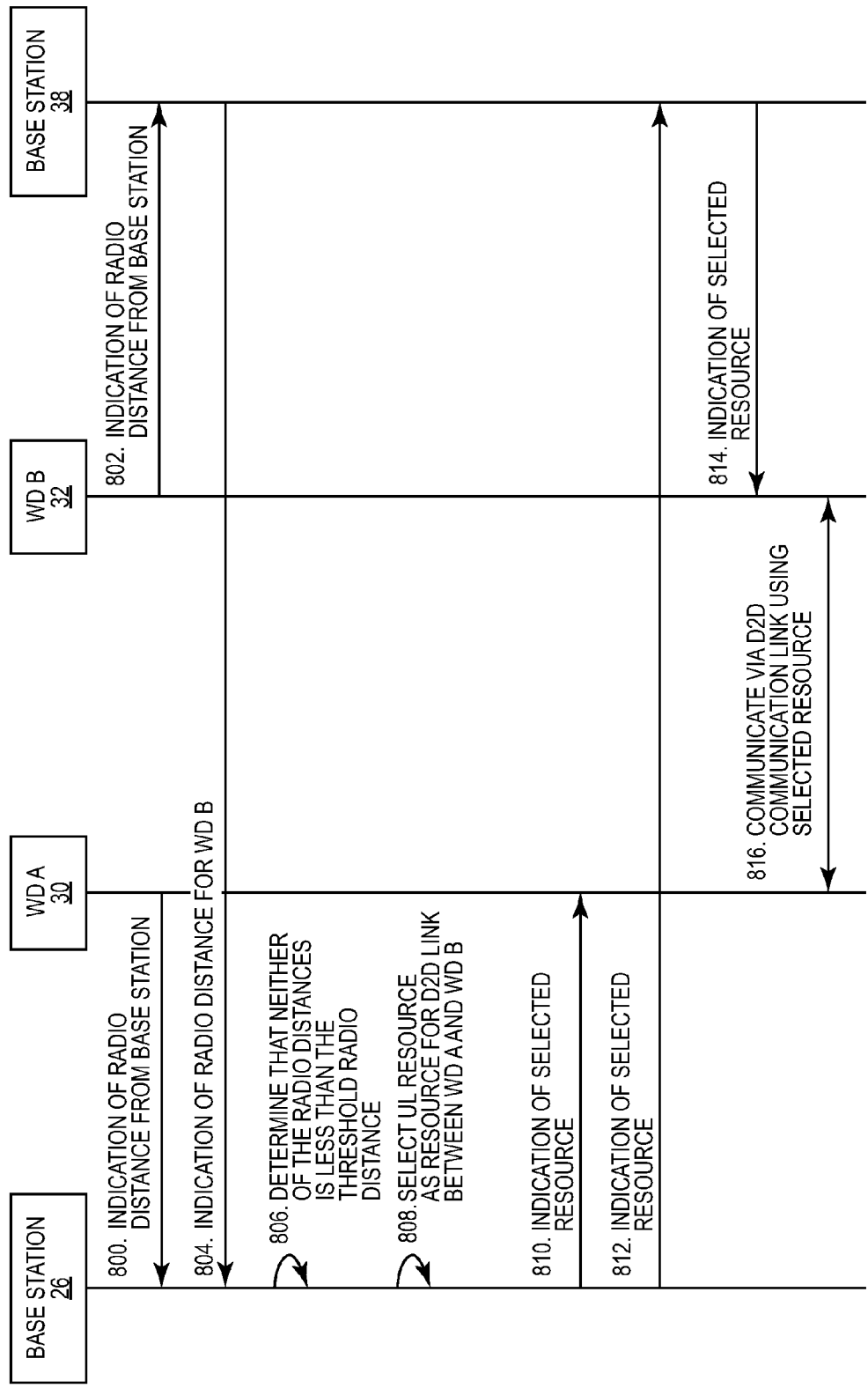
Figure 14:
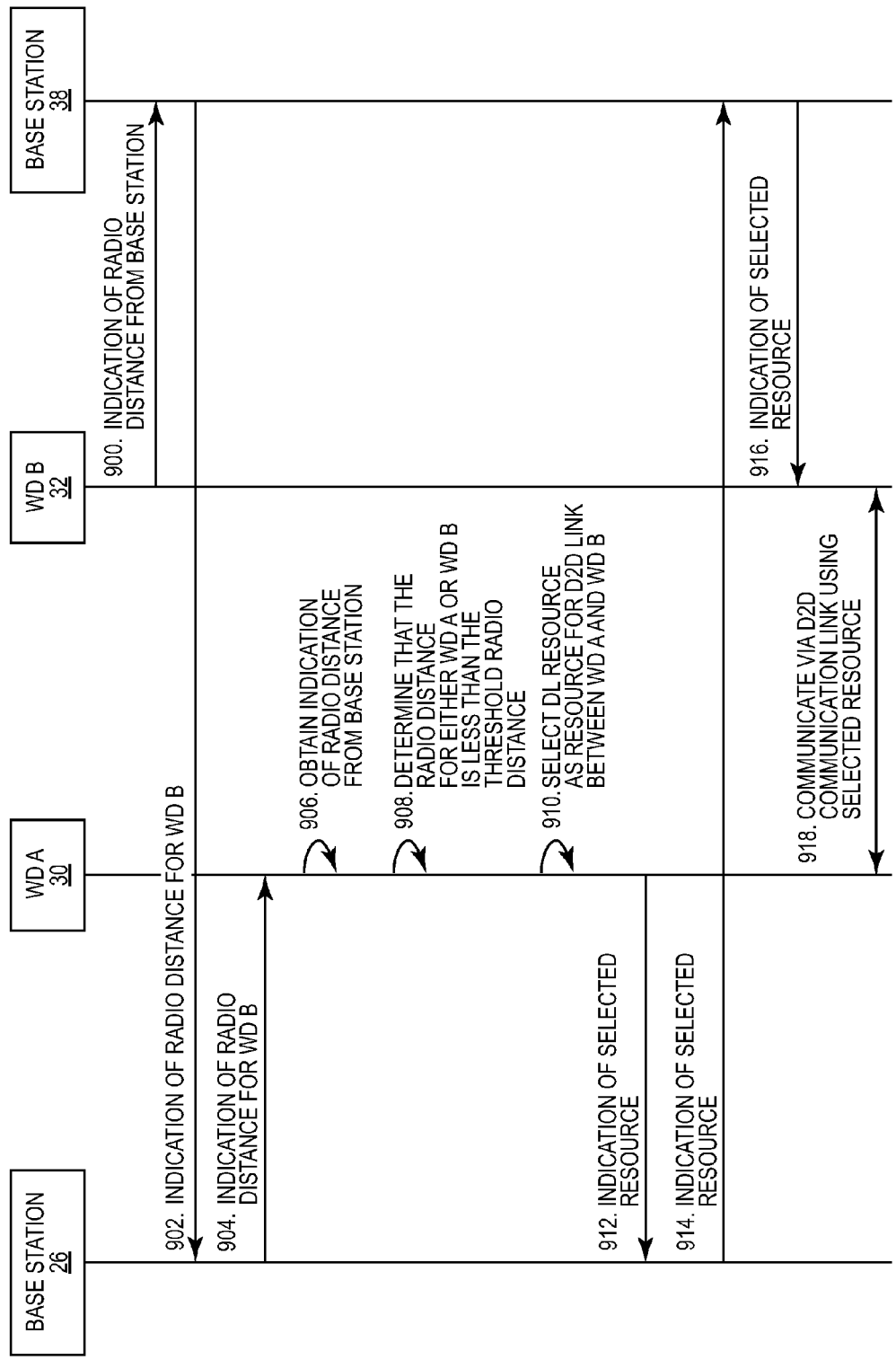
Figure 15:
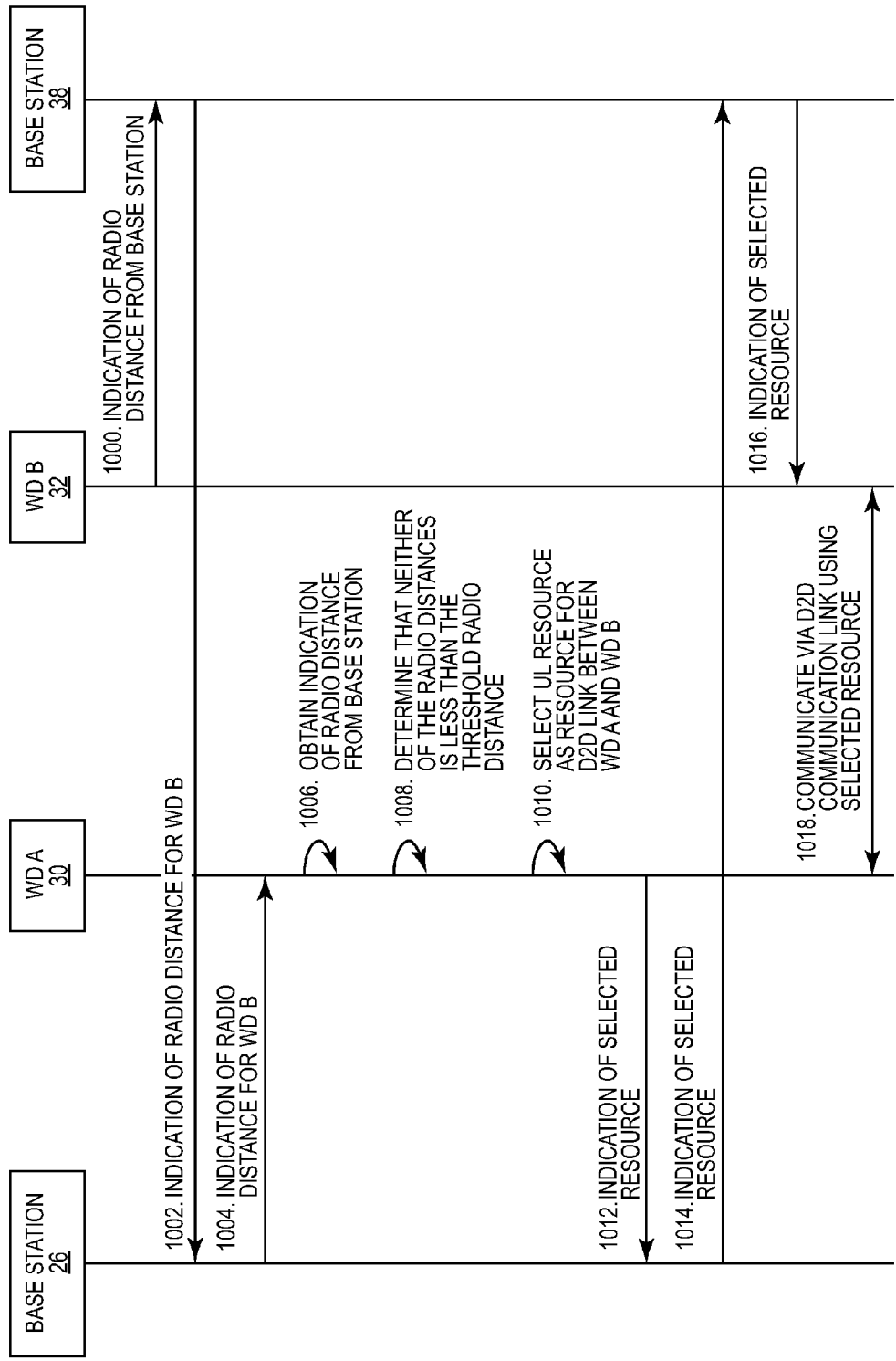
Figure 16:
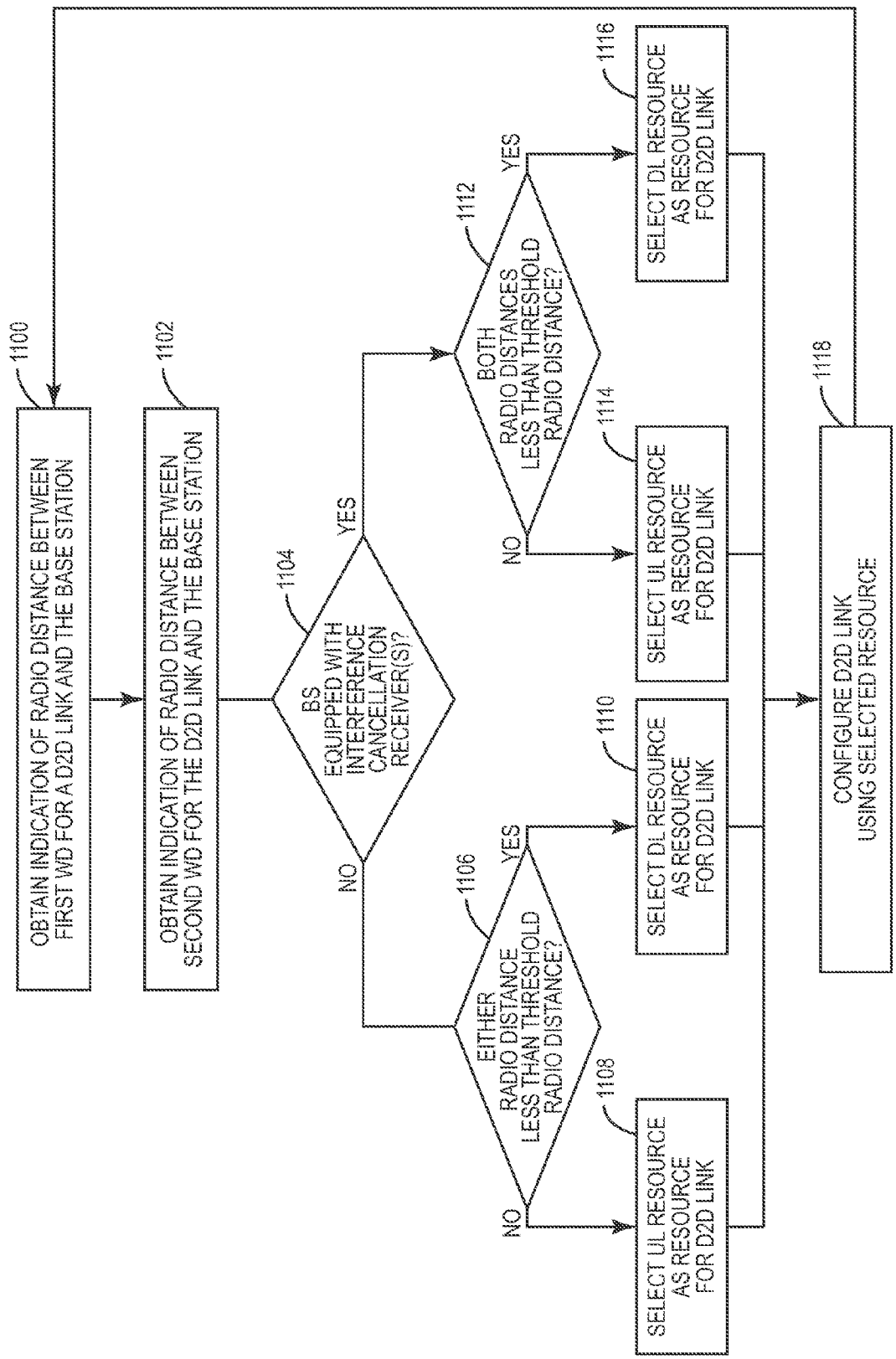
Figure 17:
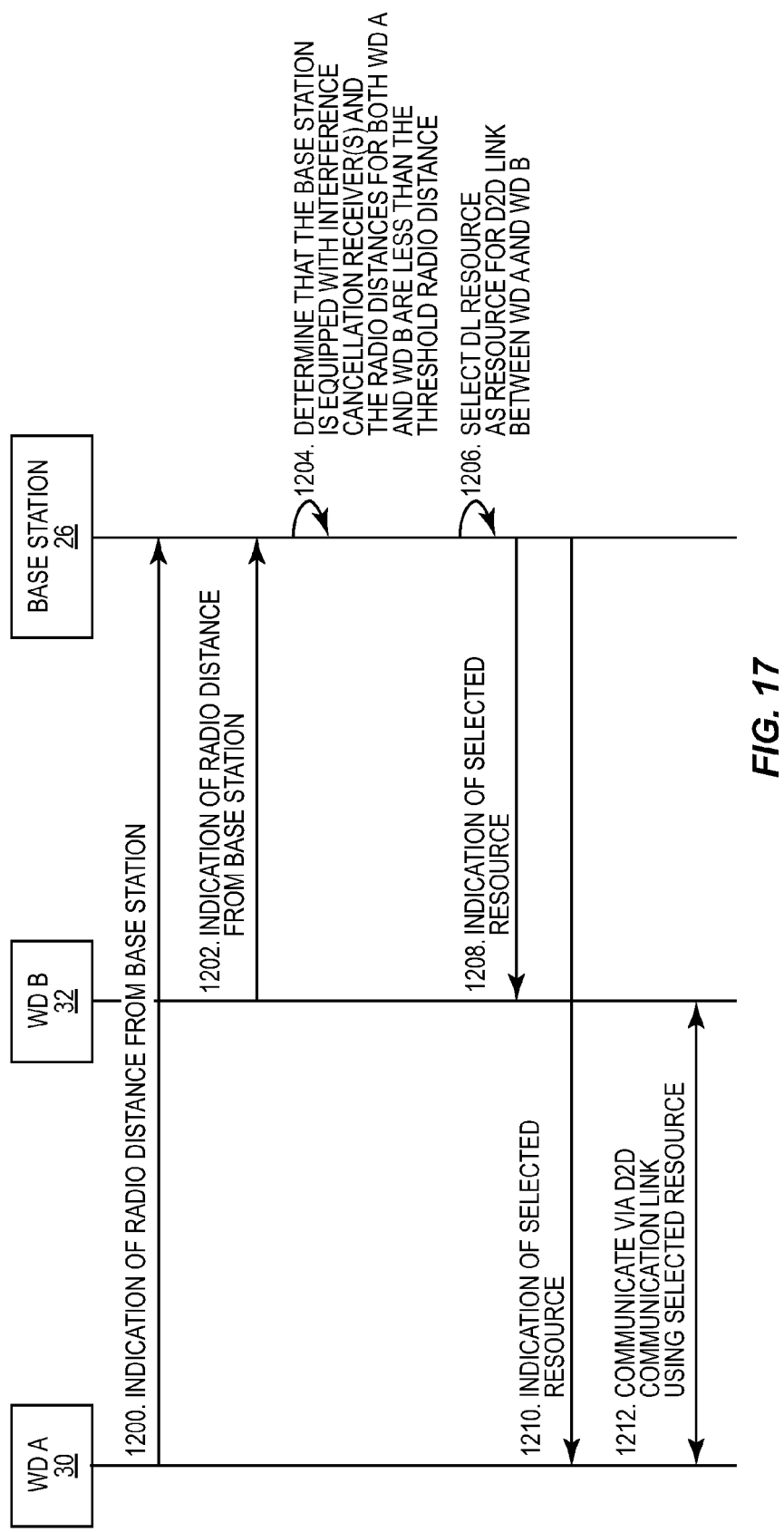
Figure 18:
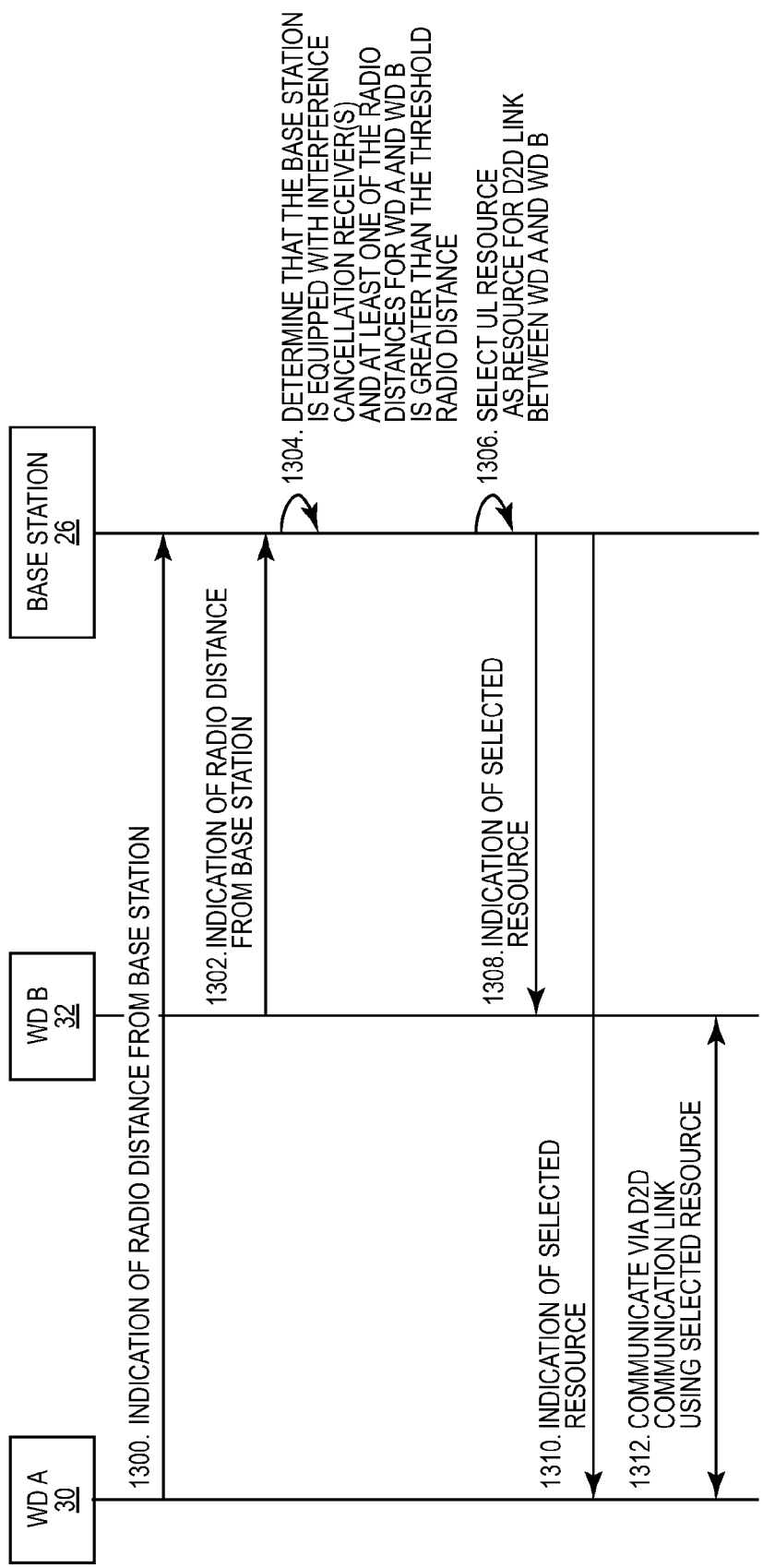
Figure 19:
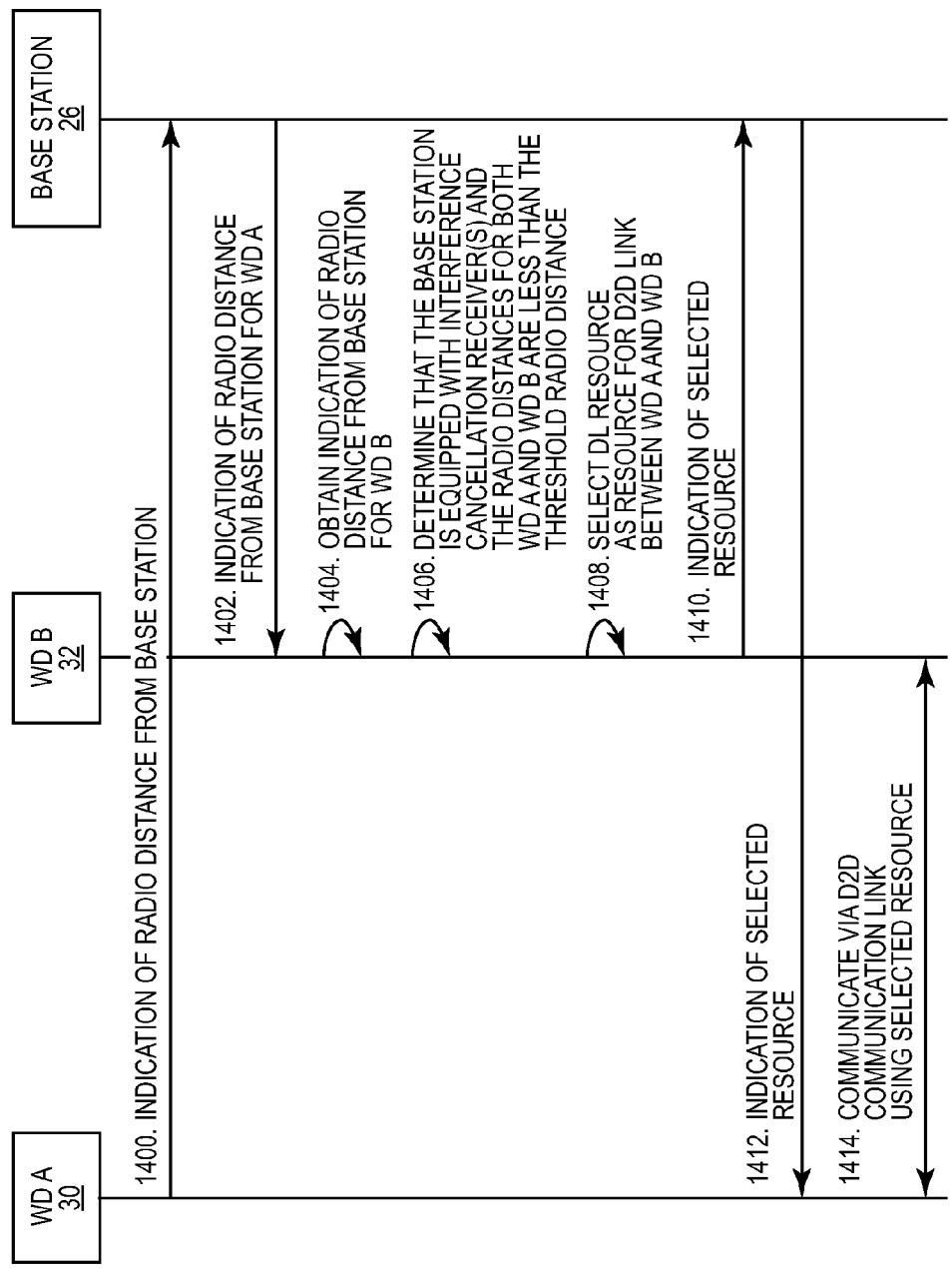
Figure 20:
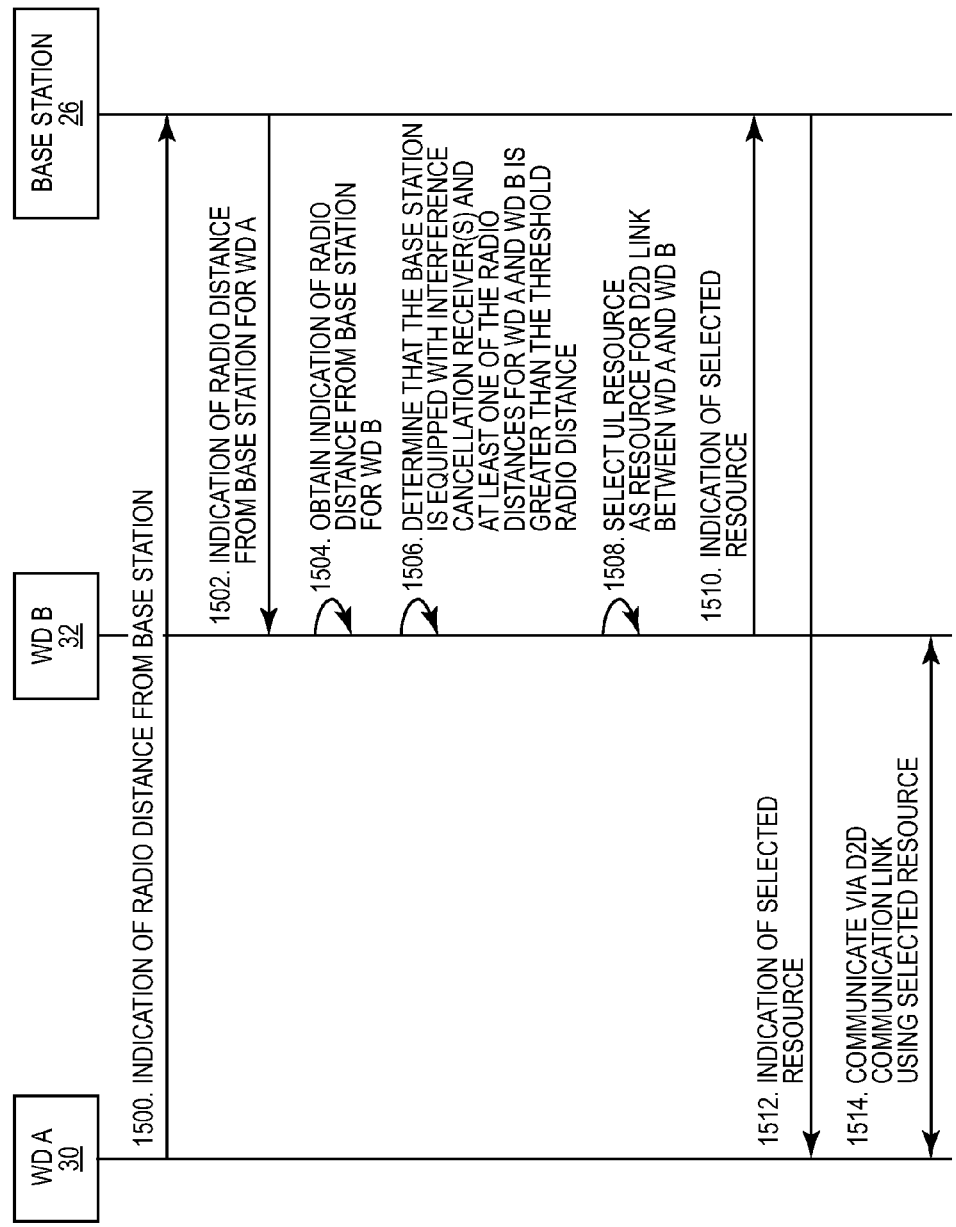
Figure 21:
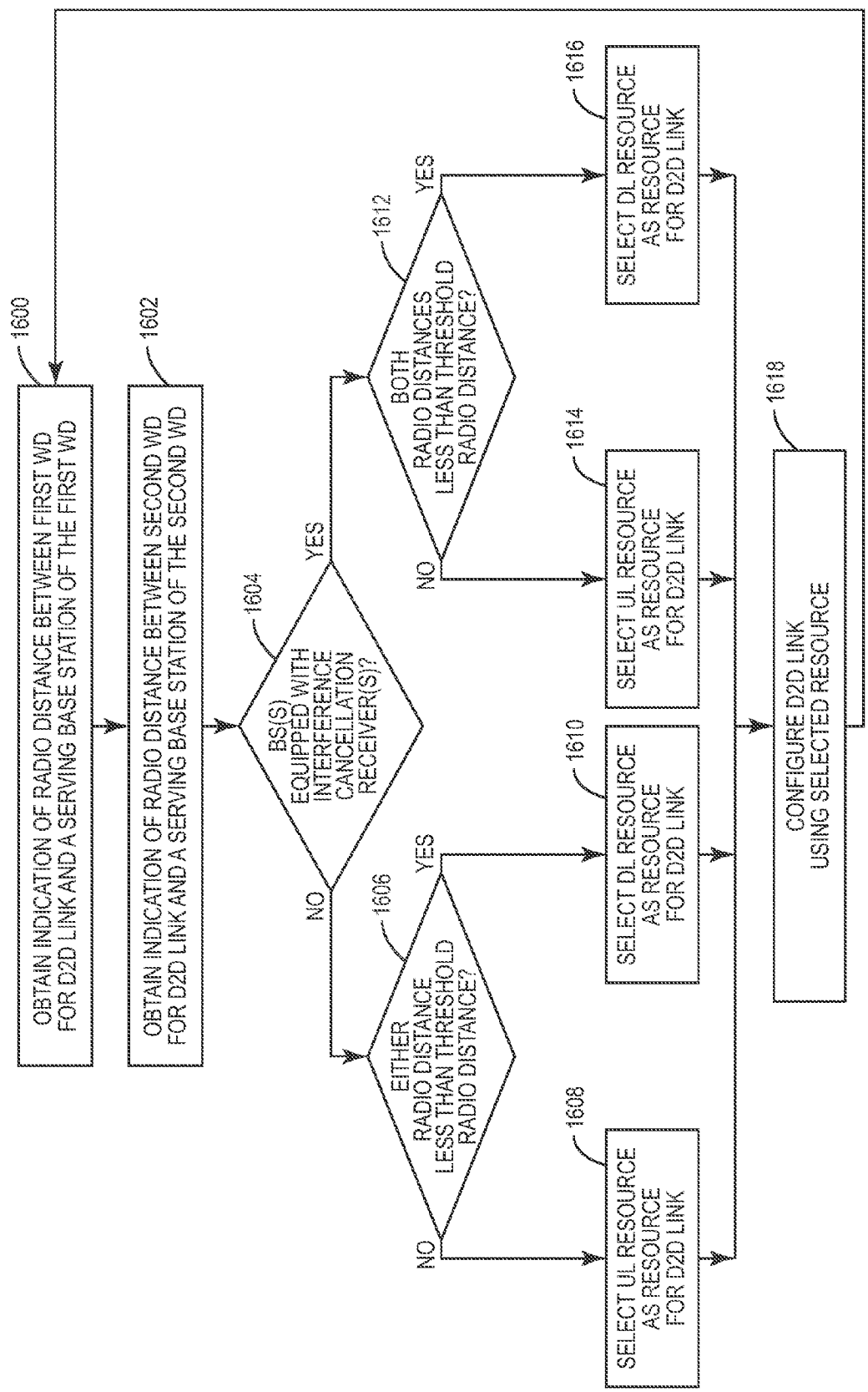
Figure 22:
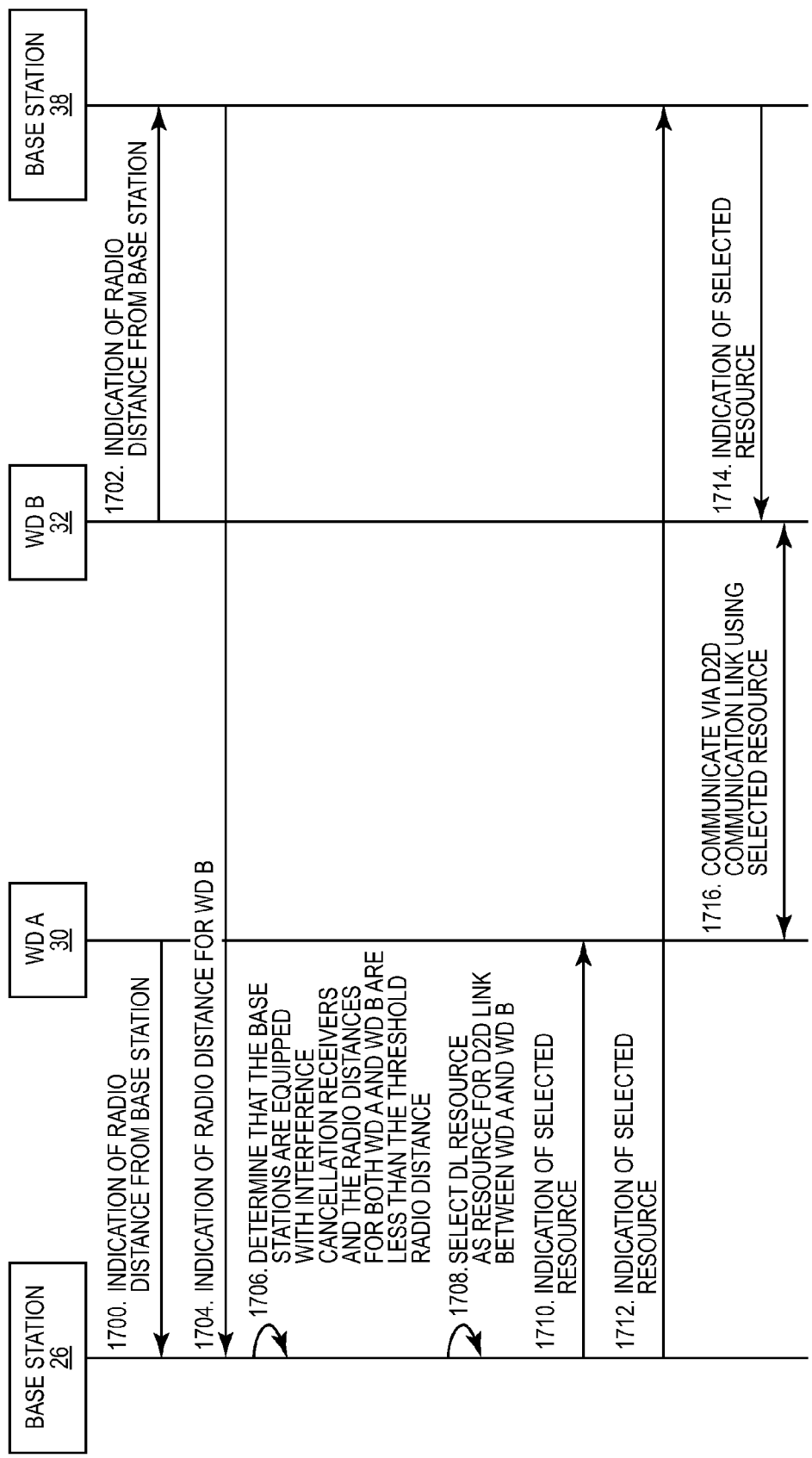
Figure 23:
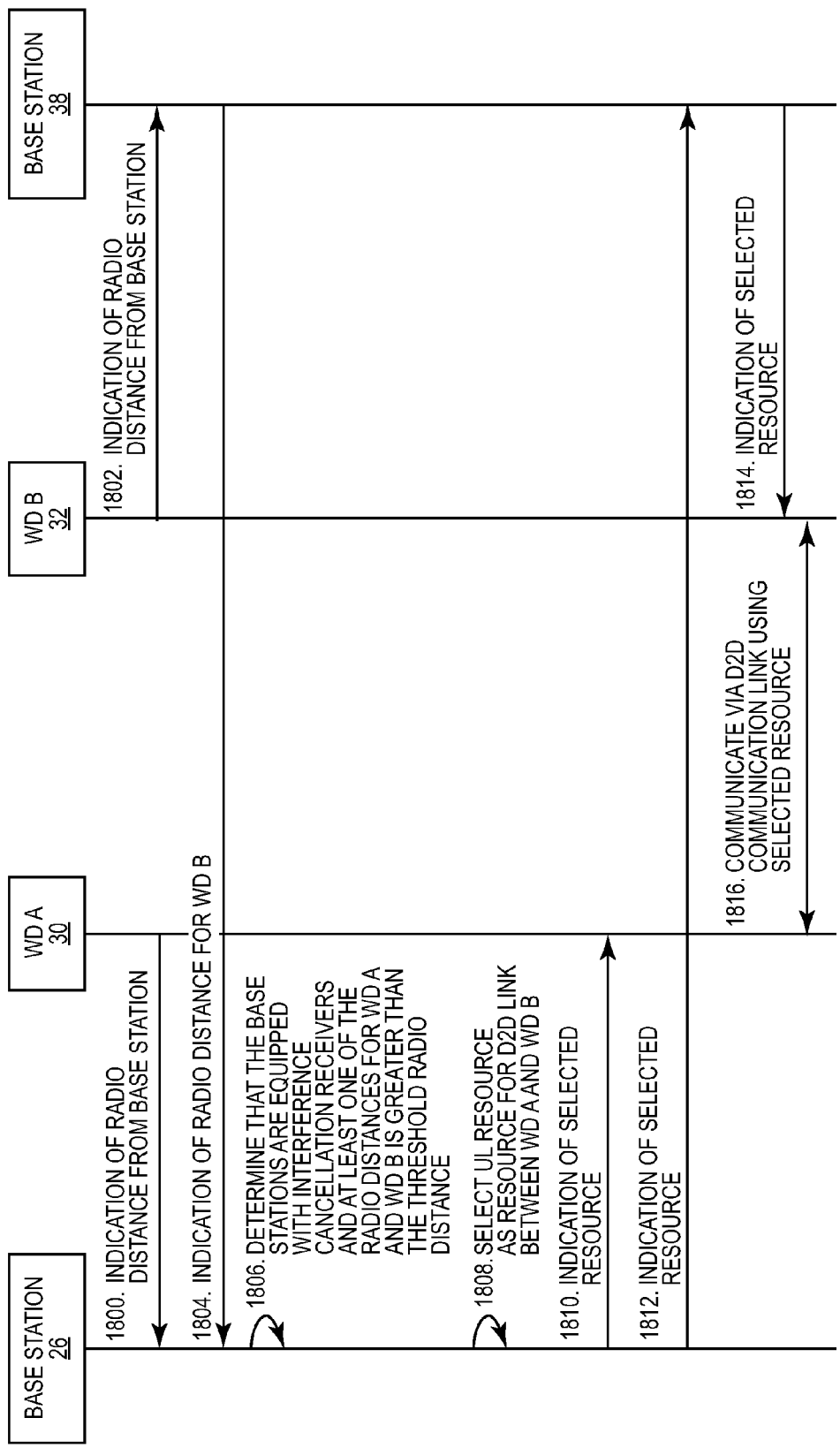
Figure 24:
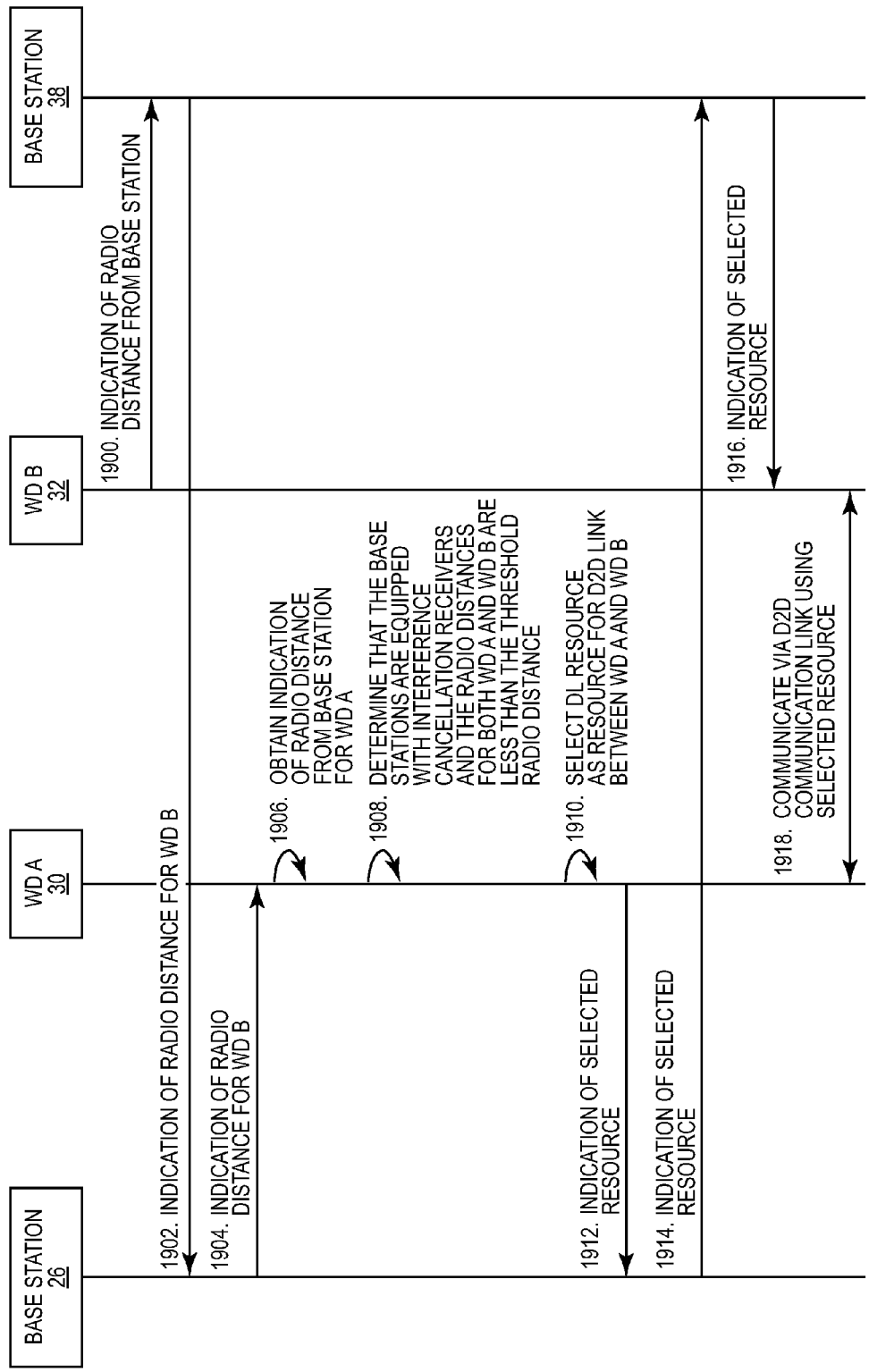
Figure 25:
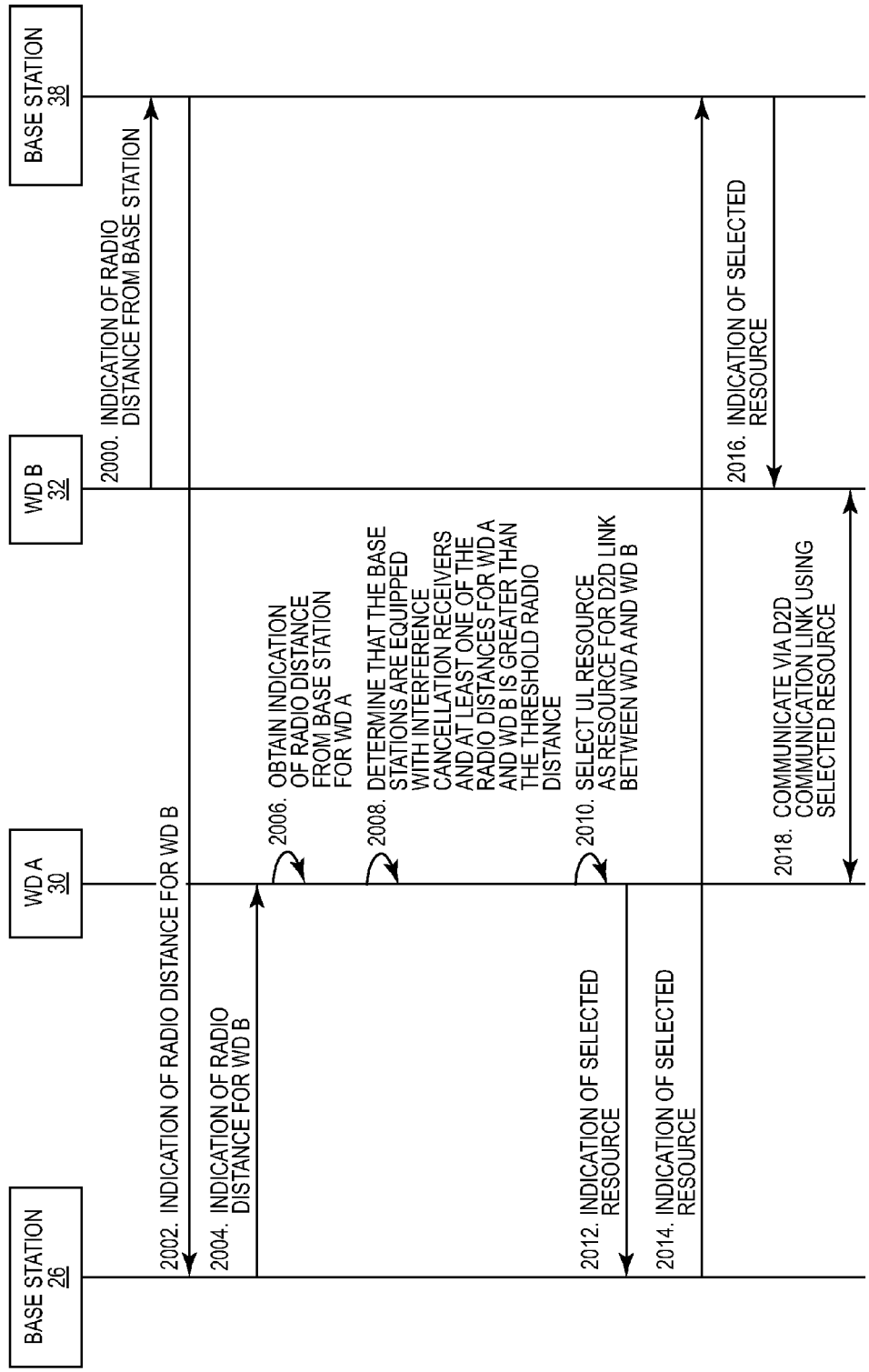
Figure 26:
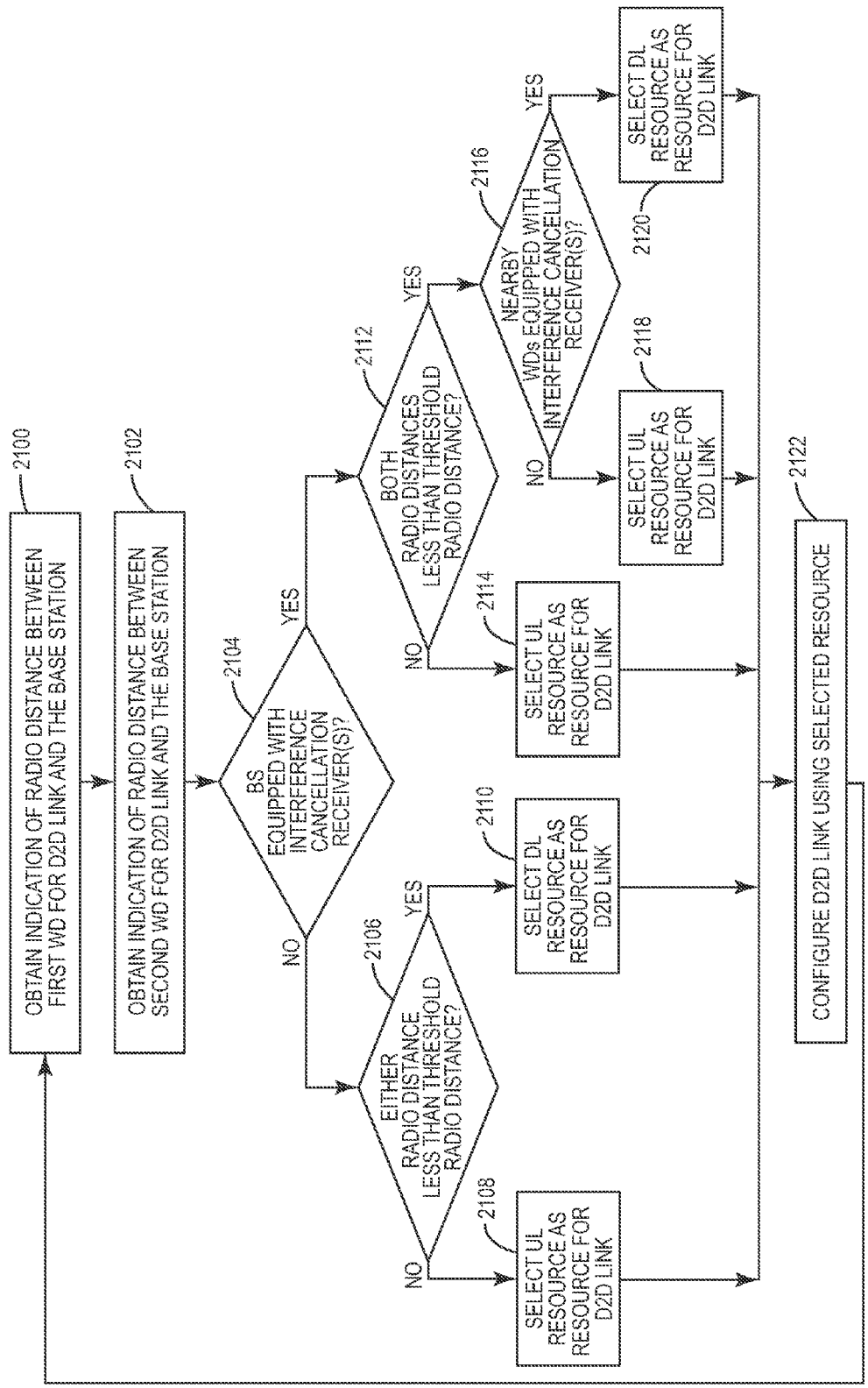
Figure 27:
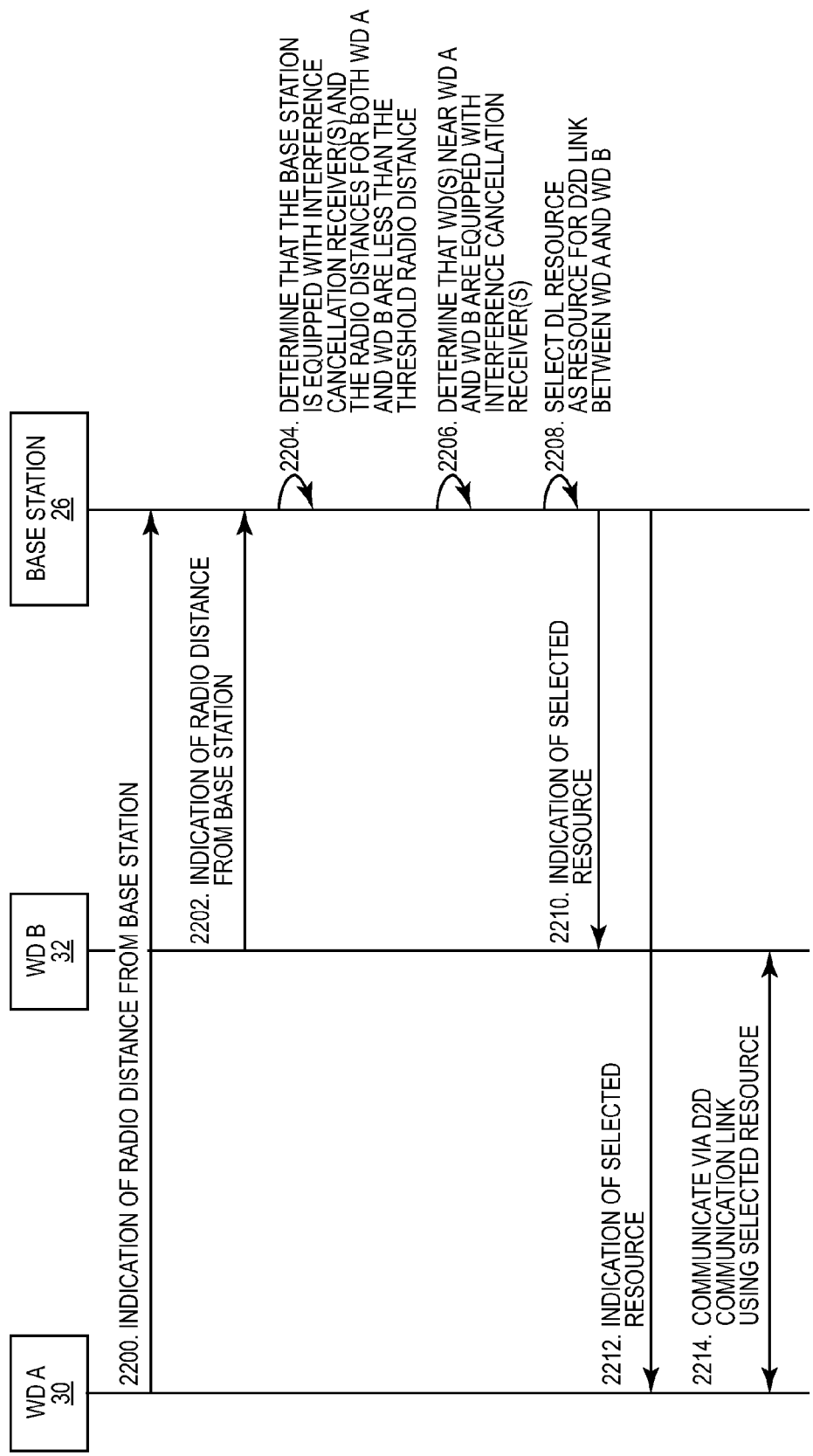
Figure 28:
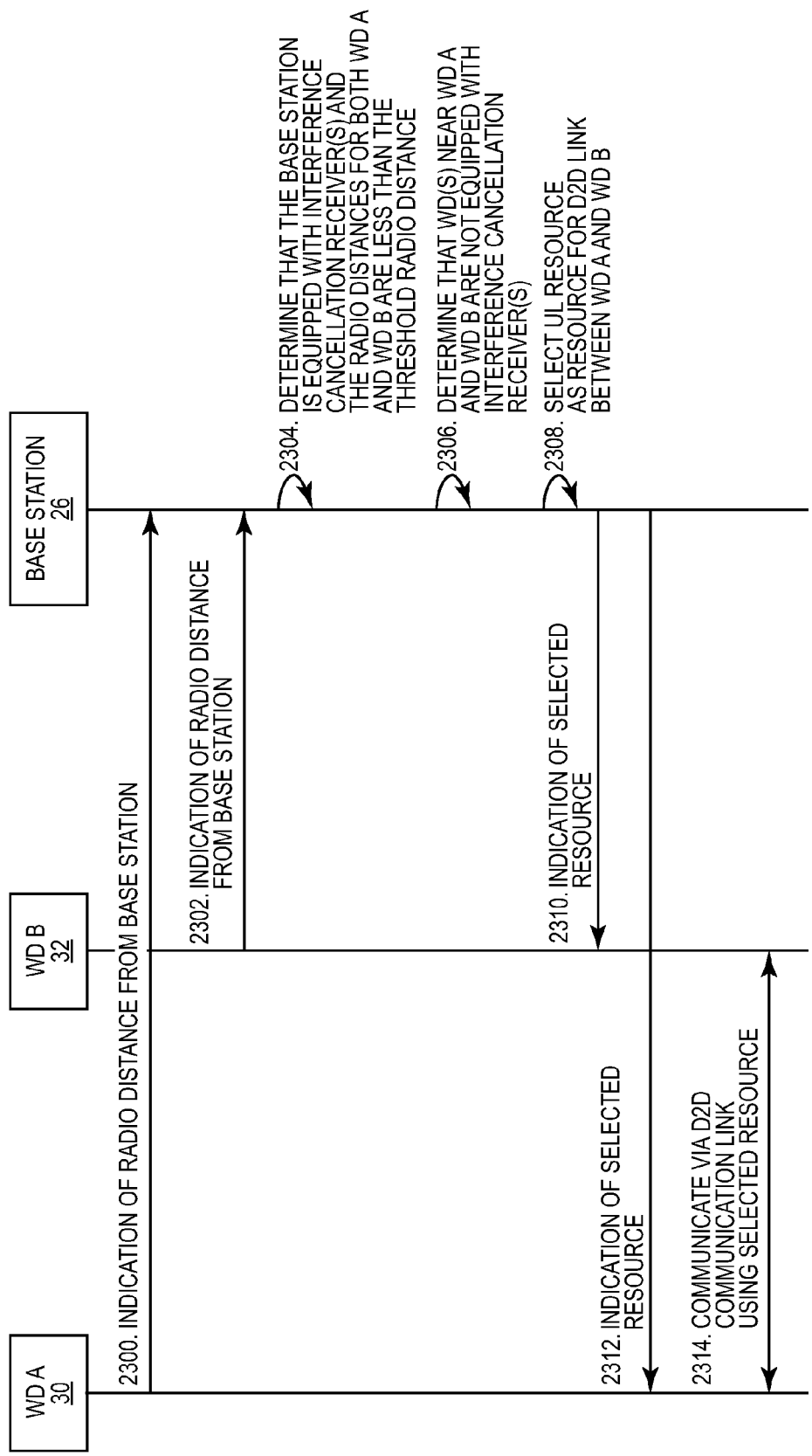
Figure 29:
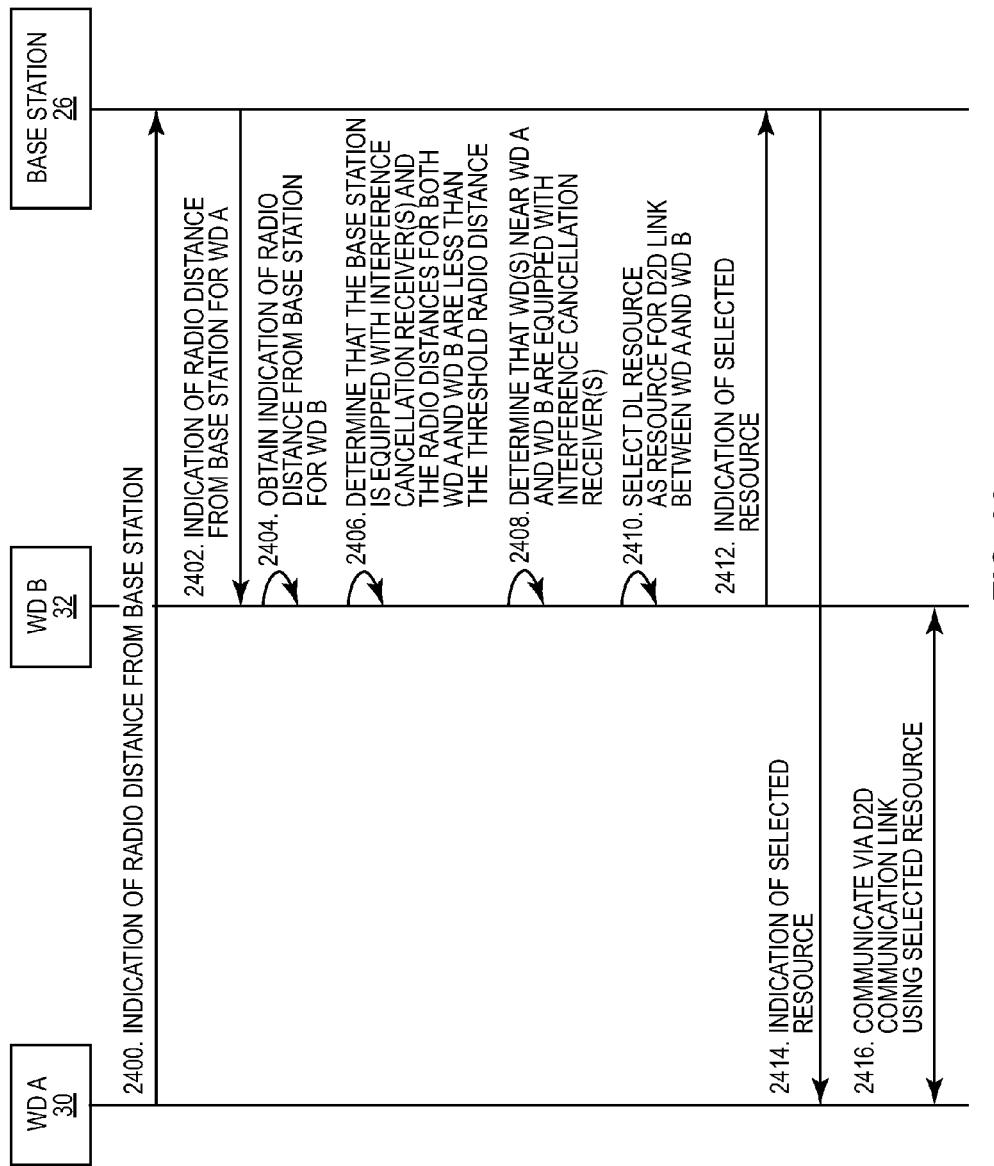
Figure 30:
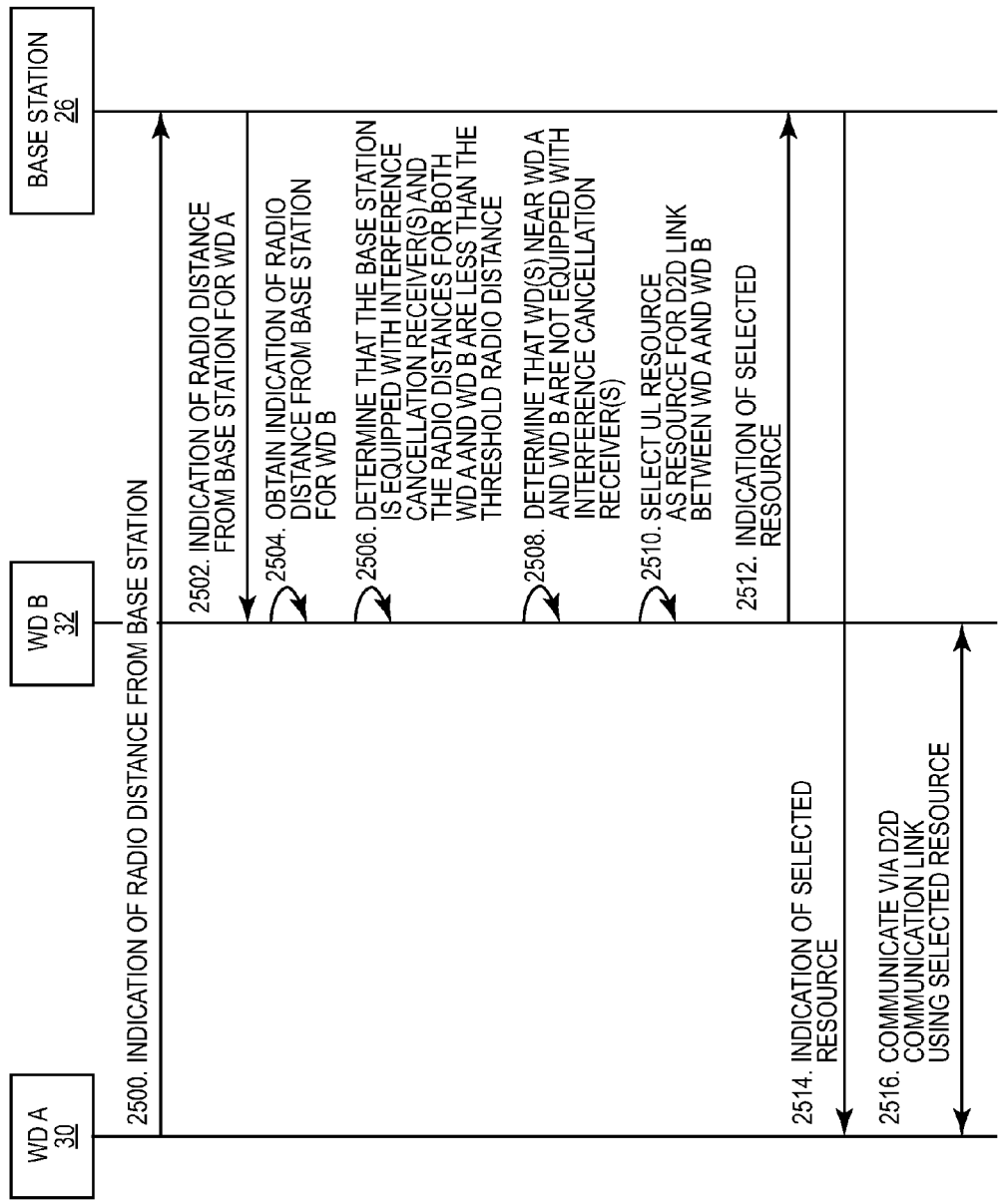
Figure 31:
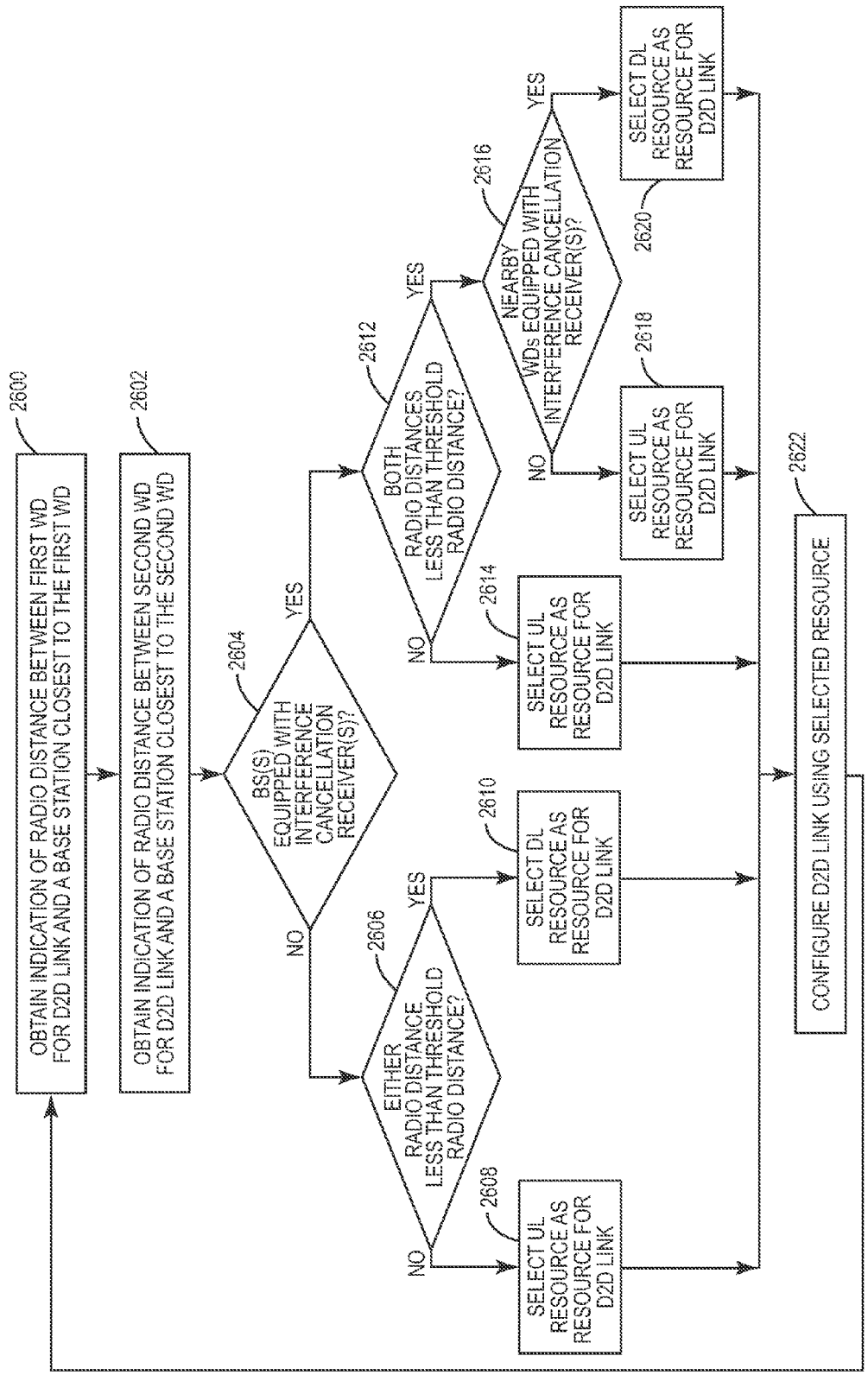
Figure 32:
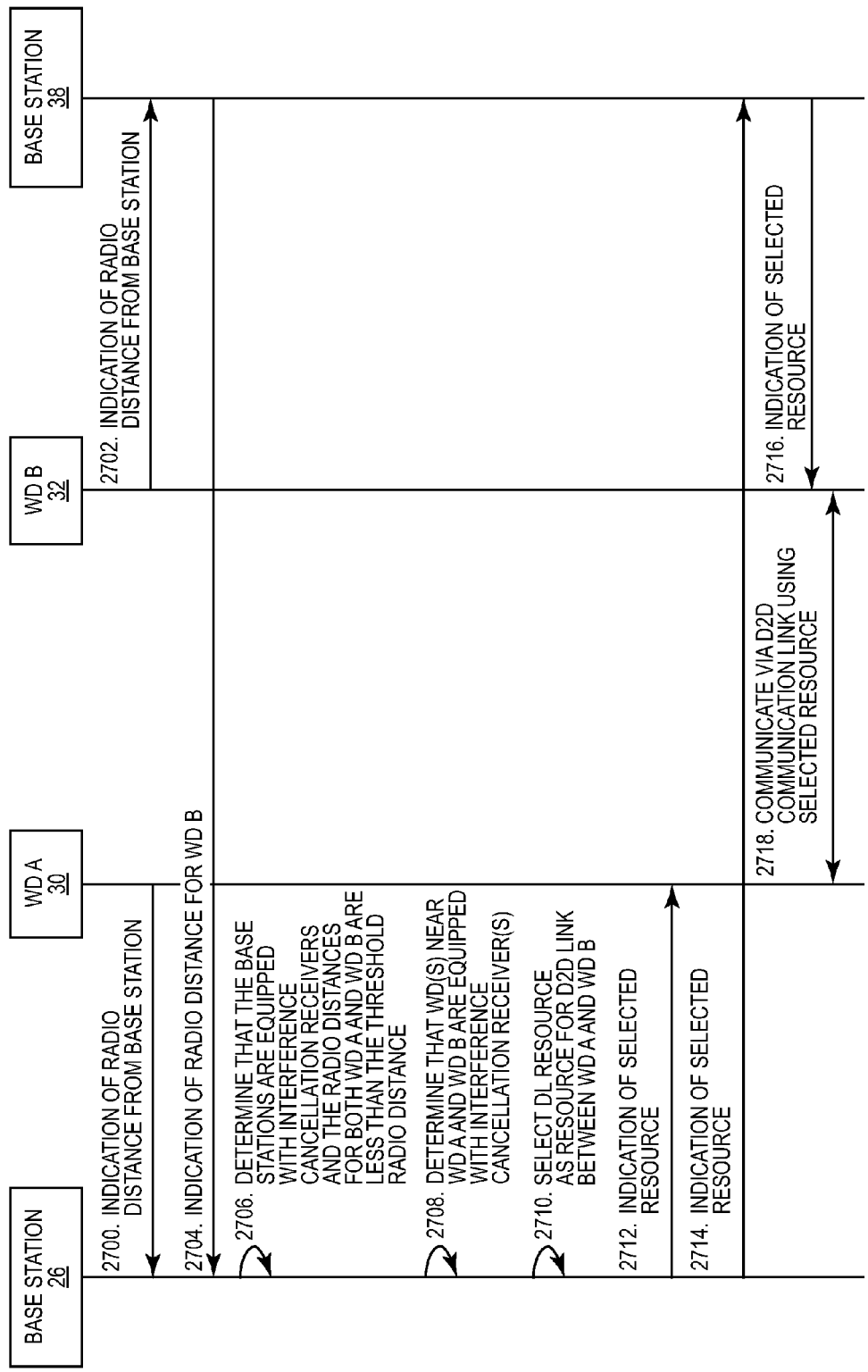
Figure 33:
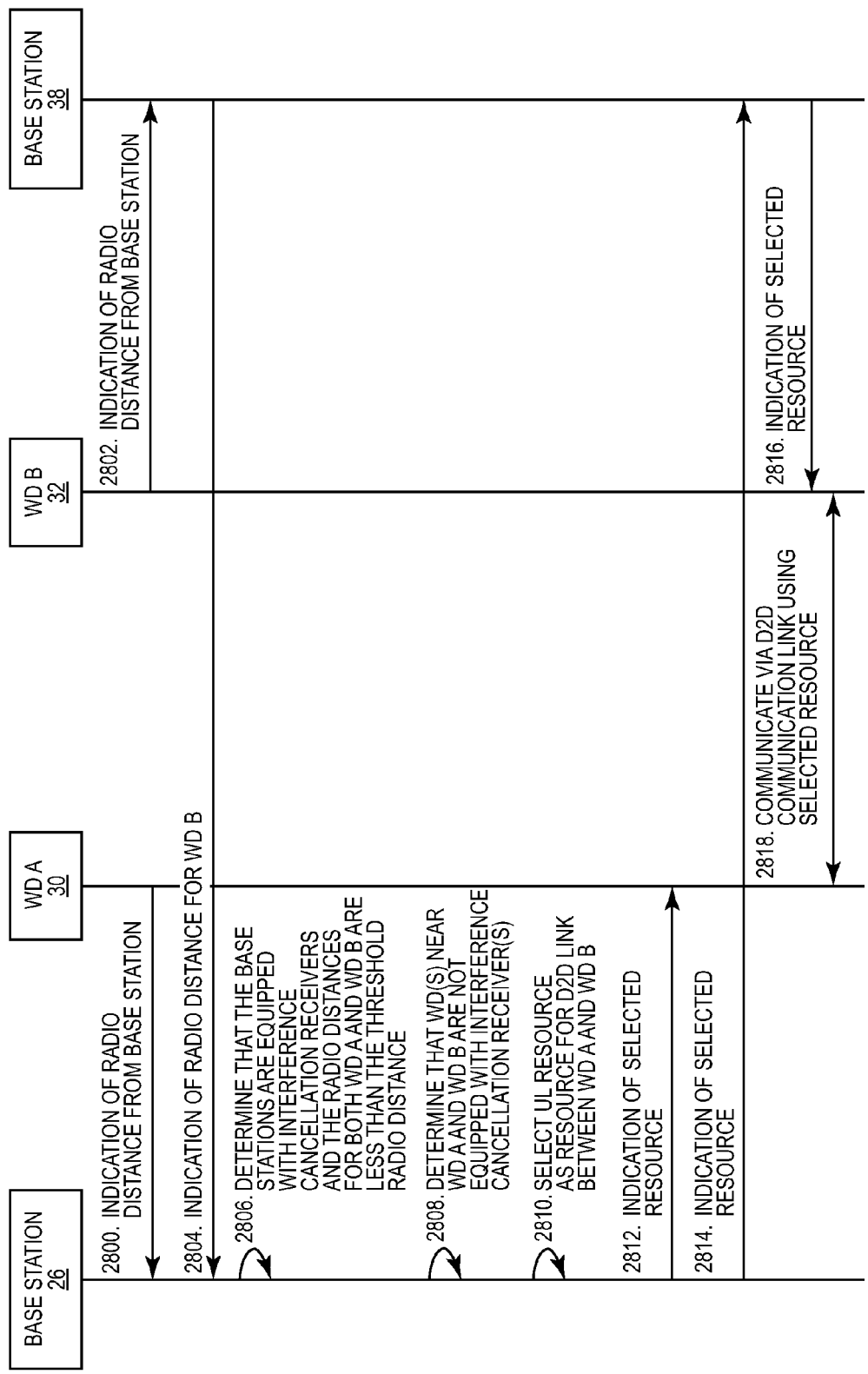
Figure 34:
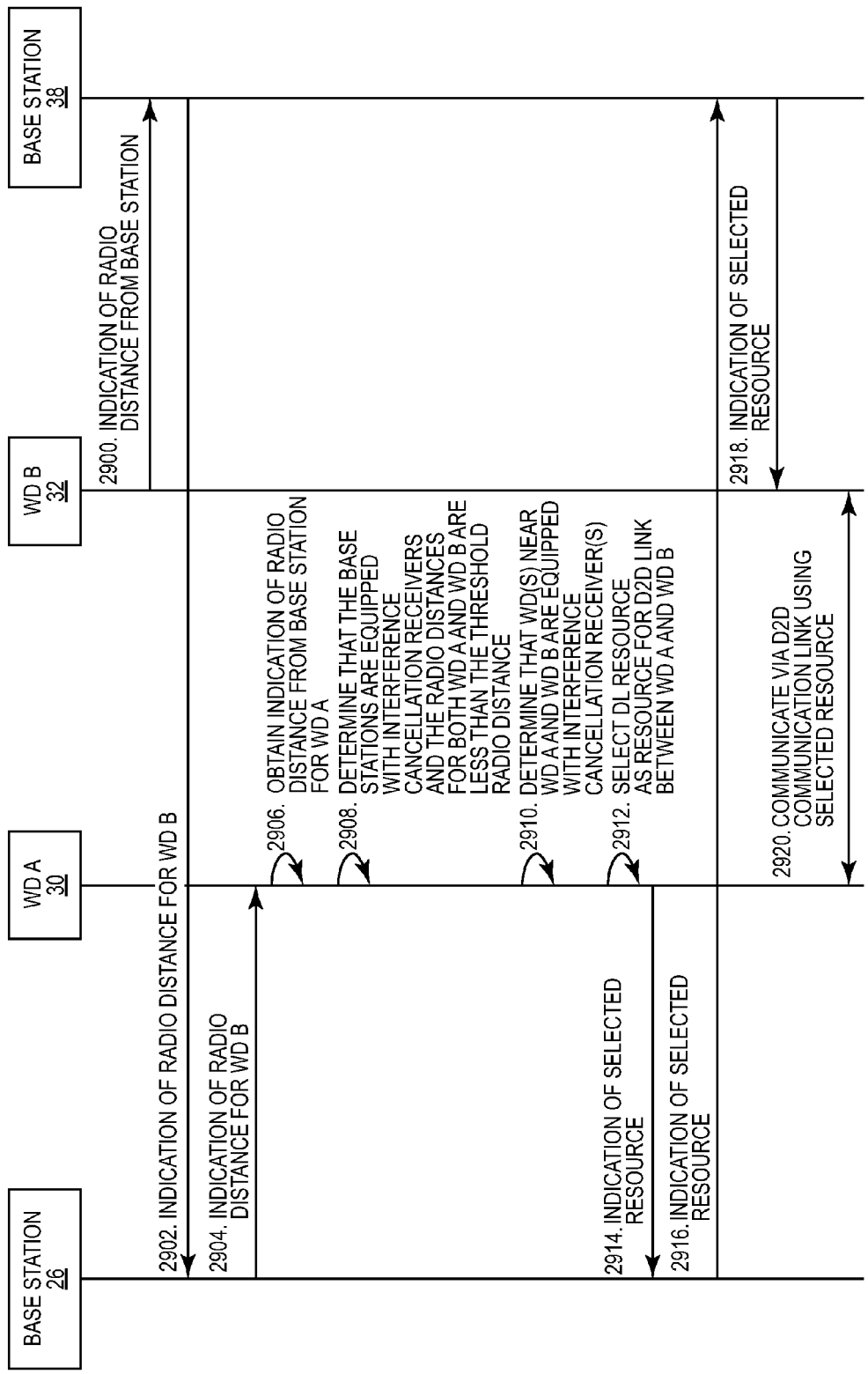
Figure 35:
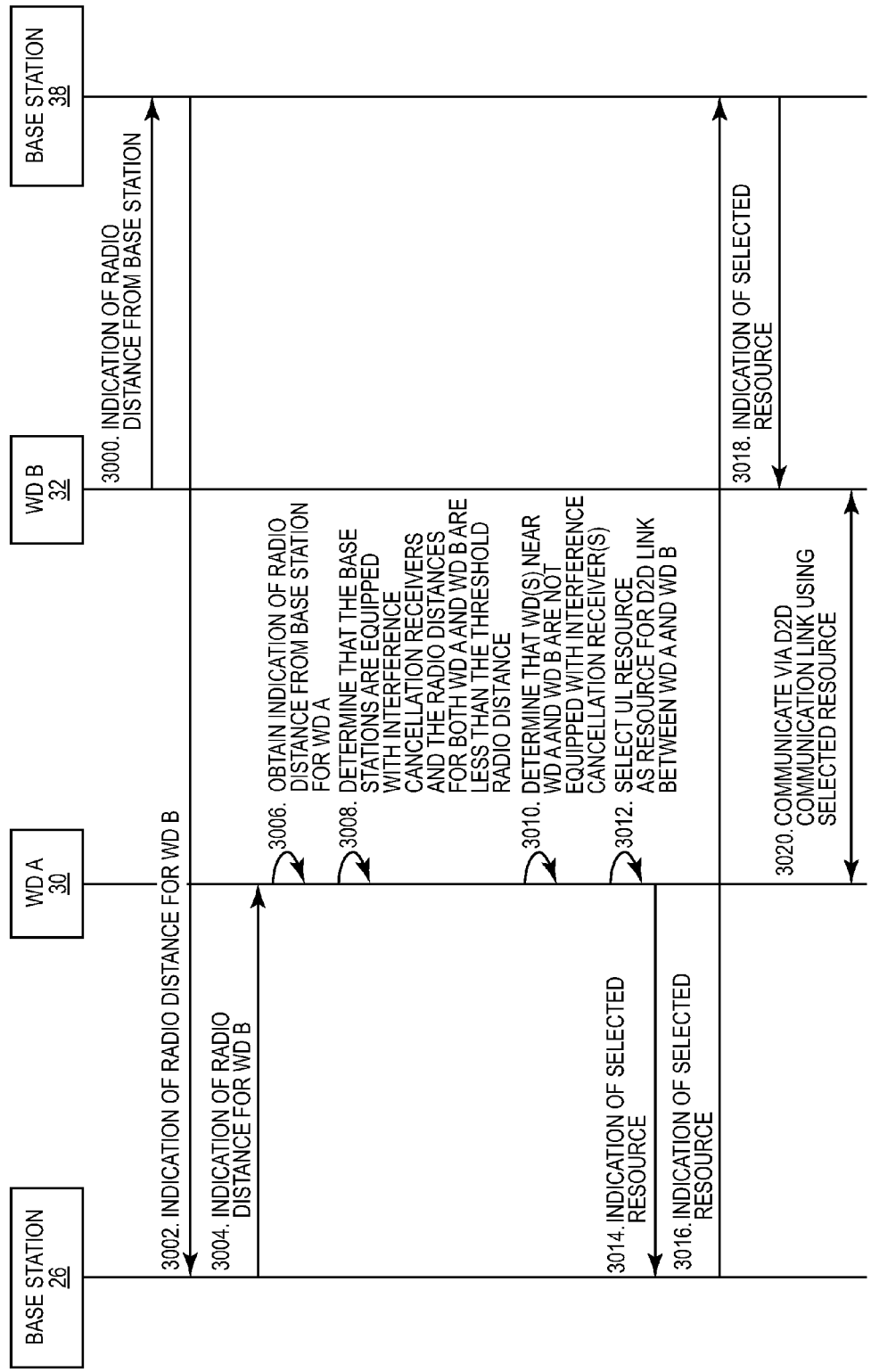
Figure 37:
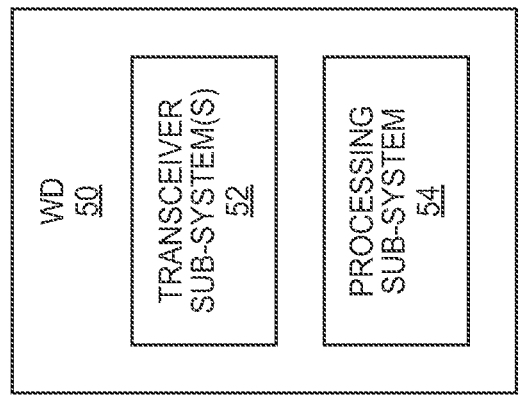
Figure 36:
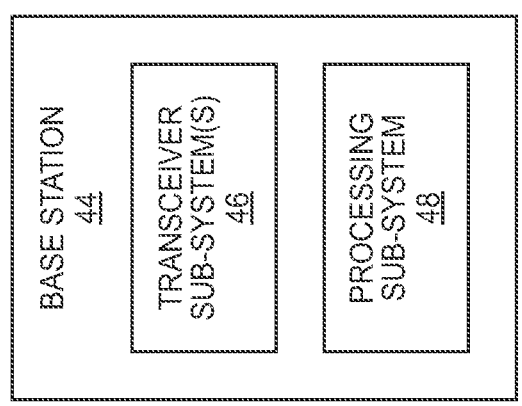

FIGS. 4A through 4C graphically illustrate a resource selection scheme for a direct D2D communication link in a cellular communication network that minimizes, or at least substantially reduces, intra-cell interference according to one embodiment of the present disclosure;

FIG. 5 is a flow chart for a process for selecting resources for a direct D2D communication link in a cellular communication network according to one embodiment of the present disclosure;

FIGS. 6 and 7 are diagrams that illustrate an embodiment in which a base station in the cellular communication network performs the process of FIG. 5 according to one embodiment of the present disclosure;

FIGS. 8 and 9 are diagrams that illustrate an embodiment in which a wireless device in the cellular communication network performs the process of FIG. 5 according to one embodiment of the present disclosure;

FIG. 10 graphically illustrates a resource selection scheme for a direct D2D communication link in a cellular communication network that reduces inter-cell interference according to one embodiment of the present disclosure;

FIG. 11 is a flow chart for a process for selecting resources for a direct D2D communication link in a cellular communication network according to another embodiment of the present disclosure;

FIGS. 12 and 13 are diagrams that illustrate an embodiment in which a base station in the cellular communication network performs the process of FIG. 11 according to one embodiment of the present disclosure;

FIGS. 14 and 15 are diagrams that illustrate an embodiment in which a wireless device in the cellular communication network performs the process of FIG. 11 according to one embodiment of the present disclosure;

FIG. 16 is a flow chart for a process for selecting a resource for a direct D2D communication link between two wireless devices in a cellular communication network that considers receiver capabilities of a serving base station of the two wireless devices according to one embodiment of the present disclosure;

FIGS. 17 and 18 are diagrams that illustrate an embodiment in which a base station in the cellular communication network performs the process of FIG. 16 according to one embodiment of the present disclosure;

FIGS. 19 and 20 are diagrams that illustrate an embodiment in which a wireless device in the cellular communication network performs the process of FIG. 16 according to one embodiment of the present disclosure;

FIG. 21 is a flow chart for a process for selecting a resource for a direct D2D communication link between two wireless devices in a cellular communication network that considers receiver capabilities of serving base stations of the two wireless devices according to one embodiment of the present disclosure;

FIGS. 22 and 23 are diagrams that illustrate an embodiment in which a base station in the cellular communication network performs the process of FIG. 21 according to one embodiment of the present disclosure;

FIGS. 24 and 25 are diagrams that illustrate an embodiment in which a wireless device in the cellular communication network performs the process of FIG. 21 according to one embodiment of the present disclosure;

FIG. 26 is a flow chart for a process for selecting a resource for a direct D2D communication link between two wireless devices in a cellular communication network that considers receiver capabilities of a serving base station of the two wireless devices as well as receiver capabilities of other nearby wireless devices, if any, according to one embodiment of the present disclosure;

FIGS. 27 and 28 are diagrams that illustrate an embodiment in which a base station in the cellular communication network performs the process of FIG. 26 according to one embodiment of the present disclosure;

FIGS. 29 and 30 are diagrams that illustrate an embodiment in which a wireless device in the cellular communication network performs the process of FIG. 26 according to one embodiment of the present disclosure;

FIG. 31 is a flow chart for a process for selecting a resource for a direct D2D communication link between two wireless devices in a cellular communication network that considers receiver capabilities of serving base stations of the two wireless devices as well as receiver capabilities of other nearby wireless devices, if any, according to one embodiment of the present disclosure;

FIGS. 32 and 33 are diagrams that illustrate an embodiment in which a base station in the cellular communication network performs the process of FIG. 31 according to one embodiment of the present disclosure;

FIGS. 34 and 35 are diagrams that illustrate an embodiment in which a wireless device in the cellular communication network performs the process of FIG. 31 according to one embodiment of the present disclosure;

FIG. 36 is a block diagram of a base station according to one embodiment of the present disclosure; and FIG. 37 is a block diagram of a wireless device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for selecting resources for direct device to device (D2D) communications in a cellular communication network. Preferably, resources for the direct D2D communications are selected to minimize, or at least substantially reduce, interference that results from the direct D2D communications in the cellular communication network. In one embodiment, a downlink resource of the cellular communication network is selected as a resource for a direct D2D communication link between a first wireless device and a second wireless device if at least one of the first wireless device and the second wireless device is less than a predefined threshold radio distance from a closest base station in the cellular communication network. Otherwise, an uplink resource of the cellular communication network is selected as a resource for the direct D2D communication link between the first and second wireless devices. Notably, as used herein, a base station that is closest to a wireless device is also referred to herein as a serving base station of the wireless device. However, it should be noted that the serving base station of a wireless device is not necessarily the closest base station to the wireless device in terms of radio distance.

FIGS. 4A through 4C graphically illustrate a process for selecting resources for D2D communications in a cellular communication network 24 according to one embodiment of the present disclosure. By selecting resources for D2D communications in this manner, interference resulting from D2D communications is minimized, or at least substantially reduced. More specifically, as illustrated in FIG. 4A, the cellular communication network 24 includes a base station 26 that serves a corresponding cell 28 of the cellular communication network 24. While only one base station 26 is illustrated, the cellular communication network 24 includes numerous base stations 26 serving corresponding cells 28. In one particular non-limiting embodiment, the base station 26 is an eNodeB (eNB) in a Long Term Evolution (LTE) cellular communication network. However, the base station 26 is not limited thereto. For example, the base station 26 may be a low power node, or lower power base station, in an LTE network.

In this example, wireless devices (WDs) 30 and 32 are located within the cell 28 and are in close proximity to one another. As used herein, two wireless devices are "in close proximity to one another" when the two wireless devices are sufficiently close to form a direct D2D communication link. When the wireless devices 30 and 32 desire to establish a bearer link, rather than establishing the bearer link through the base station 26, the cellular communication network 24 assists the wireless devices 30 and 32 to establish a direct D2D communication link (i.e., a direct D2D bearer link) between one another. More specifically, through signaling with the base station 26 or some other mechanism, the wireless devices 30 and 32 discover one another using a D2D device discovery process and then establish a D2D communication link directly between one another rather than through the base station 26.

The D2D communication link between the wireless devices 30 and 32 is a Time Division Duplex (TDD), or half-duplex, communication link that utilizes either an uplink resource or downlink resource of the cellular communication network 24. In the examples discussed herein, the uplink resource and the downlink resource are the same uplink resource and downlink resource used by a wireless device 34 located in the cell 28. As such, there is a loss of orthogonality within the cell 28. As used herein, an uplink resource is a physical resource utilized by the cellular communication network 24 for uplinks from wireless devices to base stations (e.g., a physical resource utilized for the uplink from the wireless device 34 to the base station 26). In one particular embodiment, the cellular communication network 24 is a Frequency Division Duplexing (FDD) network that utilizes different frequency bands for uplinks and downlinks, and the uplink resource is a physical resource in the uplink frequency band. In another embodiment, the cellular communication network 24 is a TDD network that utilizes the same frequency band but different time slots for uplink and downlink, and the uplink resource is an uplink time slot. Similarly, a downlink resource is a physical resource utilized by the cellular communication network 24 for downlinks from base stations to wireless devices (e.g., a physical resource utilized for the downlink from the base station 26 to the wireless device 34). In one particular embodiment, the cellular communication network 24 is a FDD network that utilizes different frequency bands for uplink and downlink, and the downlink resource is a physical resource in the downlink frequency band. In another embodiment, the cellular communication network 24 is a TDD network that utilizes the same frequency band but different time slots for uplink and downlink, and the downlink resource is a downlink time slot.

As discussed below in detail, a resource for the D2D communication link between the wireless devices 30 and 32 is selected based on radio distances between the wireless devices 30 and 32, respectively, and the base station 26. As used herein, a radio distance is a term that represents a link quality between two nodes rather than a Euclidean distance between the two nodes. The greater the radio distance, the lower the link quality. For example, radio distance may be represented as Reference Signal Received Power (RSRP) value such as that measured by a wireless device in an LTE cellular communication network, a Reference Signal Received Quality (RSRQ) value such as that measured by a wireless device in an LTE cellular communication network, a Channel Quality Index (CQI) value such as that measured by a wireless device in an LTE cellular communication network, an Received Signal Strength Indicator (RSSI) value measured by the wireless device 30 for a signal transmitted from the base station 26 to the wireless device 30, Channel State Information (CSI) such as that generated a wireless device in an LTE network, an Uplink Sounding Reference Signal (UL SRS) transmitted by the wireless device 30, a Signal to Interference plus Noise Ratio (SINR) value, or the like, or any combination thereof.

As illustrated in FIG. 4A, if the radio distance between the wireless device 30 and the base station 26 and the radio distance between the wireless device 32 and the base station 26 are both less than a predefined threshold radio distance 36 from the base station 26, then the downlink resource of the cellular communication network 24 is selected as the resource for the D2D communication link between the wireless devices 30 and 32. Again, the downlink resource is the same downlink resource used by the wireless device 34. By doing so, interference to the uplink to the base station 26 from the wireless device 34 caused by the D2D communication link between the wireless devices 30 and 32 is avoided. More specifically, if the D2D communication link were to use the uplink resource of the wireless device 34 while the wireless devices 30 and 32 are close to the base station 26, uplink interference would be substantial. By utilizing the downlink resource when close to the base station 26, uplink interference resulting from the D2D communication link between the wireless devices 30 and 32 is avoided when the uplink interference would otherwise be strongest. In a similar manner, uplink interference to the base station 26 for other wireless devices (not shown) that do not use the same uplink resource (e.g., a different uplink resource such as, for example, one or more different uplink resource blocks in an LTE cellular communication network) is minimized or reduced.

Conversely, if the radio distance between the wireless device 30 and the base station 26 and the radio distance between the wireless device 32 and the base station 26 are both greater than the predefined threshold radio distance 36 from the base station 26, then the uplink resource of the cellular communication network 24 is selected as the resource for the D2D communication link between the wireless devices 30 and 32, as illustrated in FIG. 4B. Again, the uplink resource is the same uplink resource used by the wireless device 34. By doing so, interference to the downlink from the base station 26 to the wireless device 34 caused by the D2D communication link between the wireless devices 30 and 32 is avoided. More specifically, if the D2D communication link were to use the same downlink resource of the wireless device 34 while the wireless devices 30 and 32 are far from the base station 26, there would be downlink interference caused for the downlink to the wireless device 34 which would become more substantial as the wireless device 34 moves closer to the wireless devices 30 and 32. By utilizing the uplink resource when far from the base station 26, downlink interference resulting from the D2D communication link between the wireless devices 30 and 32 is avoided when the downlink interference would otherwise be most problematic. In a similar manner, downlink interference to other wireless devices (not shown) that are near the wireless devices 30 and 32 is minimized or reduced by using the uplink resource.

Lastly, FIG. 4C illustrates a scenario where the radio distance between the wireless device 30 and the base station 26 is less than the predefined threshold radio distance 36 but the radio distance between the wireless device 32 and the base station 26 is greater than the predefined threshold radio distance 36. In this embodiment, the downlink resource of the cellular communication network 24 is selected for the D2D communication link if either of the radio distances is less than the predefined threshold radio distance 36. As such, the downlink resource is selected for the D2D communication link between the wireless devices 30 and 32.

FIG. 5 is a flow chart illustrating a process for selecting one or more resources for the D2D communication link between the wireless devices 30 and 32 according to one embodiment of the present disclosure. This process may be performed by the base station 26, one of the wireless devices 30 or 32 for the D2D communication link, or potentially some other network node in the cellular communication network 24. First, the network node (i.e., the base station 26, one of the wireless devices 30 or 32, or some other network node in the cellular communication network 24) obtains an indication of a radio distance between a first wireless device for a D2D communication link, which in this case is the wireless device 30, and the base station 26 (step 100). In one embodiment, the indication of the radio distance between the wireless device 30 and the base station 26 is an indication of link quality for a radio link between the base station 26 and the wireless device 30. For example, the indication of the radio distance between the wireless device 30 and the base station 26 may be a RSRP value such as that measured by a wireless device in an LTE cellular communication network, a RSRQ value such as that measured by a wireless device in an LTE cellular communication network, a CQI value such as that measured by a wireless device in an LTE cellular communication network, a RSSI value measured by the wireless device 30 for a signal transmitted from the base station 26 to the wireless device 30, CSI such as that generated a wireless device in an LTE network, an UL SRS transmitted by the wireless device 30, SINR value, or the like, or any combination thereof.

In addition, the network node obtains an indication of a radio distance between a second wireless device for the D2D communication link, which in this case is the wireless device 32, and the base station 26 (step 102). As discussed above for the wireless device 30, in one embodiment, the indication of the radio distance between the wireless device 32 and the base station 26 is an indication of link quality for a radio link between the base station 26 and the wireless device 32. The network node then determines whether the radio distance between the wireless device 30 and the base station 26 or the radio distance between the wireless device 32 and the base station 26 is less than the predefined threshold radio distance 36 (step 104). For example, in one particular embodiment, the indications of the radio distances between the base station 26 and the wireless devices 30 and 32, respectively, are corresponding RSRP values. Then, in step 104, the network node compares the RSRP values for the wireless devices 30 and 32 to a threshold RSRP value that represents the predefined threshold radio distance 36. The network node then determines whether either RSRP value for the wireless device 30 or the RSRP value for the wireless device 32 is less than the threshold RSRP value. In a similar manner, other metrics such as RSRQ, CQI, RSSI, CSI, or UL SRS may be used.

If the network node determines that neither the radio distance between the base station 26 and the wireless device 30 nor the radio distance between the base station 26 and the wireless device 32 is less than the predefined threshold radio distance 36, then the network node selects an uplink (UL) resource of the cellular communication network 24 as a corresponding resource for the D2D communication link between the wireless device 30 and the wireless device 32 (step 106). Again, the UL resource of the cellular communication network 24 is preferably the same UL resource used by the wireless device 34 located in the cell 28. Conversely, if the network node determines that either the radio distance between the base station 26 and the wireless device 30 or the radio distance between the base station 26 and the wireless device 32 is less than the threshold radio distance 36, then the network node selects a downlink (DL) resource of the cellular communication network 24 as a corresponding resource for the D2D communication link between the wireless device 30 and the wireless device 32 (step 108). Again, the DL resource of the cellular communication network 24 is preferably the same DL resource used by the wireless device 34 located in the cell 28.

Lastly, whether proceeding from step 106 or 108, the D2D communication link between the wireless device 30 and the wireless device 32 is configured using the selected resource (step 110). The process then returns to step 100 and is repeated. In this manner, the resource used for the D2D communication link is dynamically configured. Thus, if the wireless device 30 and/or the wireless device 32 move such that the decision in step 104 changes, the resource selected for the D2D communication link also changes. Therefore, for example, if radio distances between the wireless devices 30 and 32 and the base station 26 are both initially greater than the predefined threshold radio distance 36 but the wireless devices 30 and 32 then move such that the radio distance from one of the wireless devices 30 and 32 is less than the predefined threshold radio distance 36, then the resource select for the D2D communication link changes from the UL resource of the cellular communication network 24 to the DL resource of the cellular communication network 24.

FIG. 6 is a diagram that illustrates the operation of the base station 26 to perform the process of FIG. 5 according to one embodiment of the present disclosure. As illustrated, the wireless device 30 provides, to the base station 26, an indication of the radio distance of the wireless device 30 from the base station 26 (step 200). Likewise, the wireless device 32 provides, to the base station 26, an indication of the radio distance of the wireless device 32 from the base station 26 (step 202). In this example, the base station 26 then determines that the radio distance for either the wireless device 30 or the wireless device 32 is less than the predefined threshold radio distance 36 based on the indications of the radio distances for the wireless devices 30 and 32 received in steps 200 and 202 (step 204). As such, the base station 26 selects the DL resource of the cellular communication network 24 as the resource for the D2D communication link between the wireless devices 30 and 32 (step 206). Then, the base station 26 configures the D2D communication link using the selected resource by, in this embodiment, sending an indication of the selected resource for the D2D communication link to both the wireless device 30 and the wireless device 32 (steps 208 and 210). The indication of the selected resource may be any suitable information for conveying the selected resource to the wireless devices 30 and 32. The wireless devices 30 and 32 then communicate via the D2D communication link using the selected resource (step 212).

FIG. 7 is a diagram that illustrates the operation of the base station 26 to perform the process of FIG. 5 according to one embodiment of the present disclosure. As illustrated, the wireless device 30 provides, to the base station 26, an indication of the radio distance of the wireless device 30 from the base station 26 (step 300). Likewise, the wireless device 32 provides, to the base station 26, an indication of the radio distance of the wireless device 32 from the base station 26 (step 302). In this example, the base station 26 then determines that neither of the radio distances for the wireless devices 30 and 32 is less than the predefined threshold radio distance 36 based on the indications of the radio distances for the wireless devices 30 and 32 received in steps 300 and 302 (step 304). As such, the base station 26 selects the UL resource of the cellular communication network 24 as the resource for the D2D communication link between the wireless devices 30 and 32 (step 306). Then, the base station 26 configures the D2D communication link using the selected resource by, in this embodiment, sending an indication of the selected resource for the D2D communication link to both the wireless device 30 and the wireless device 32 (steps 308 and 310). The indication of the selected resource may be any suitable information for conveying the selected resource to the wireless devices 30 and 32. The wireless devices 30 and 32 then communicate via the D2D communication link using the selected resource (step 312).

FIGS. 8 and 9 are similar to FIGS. 6 and 7 but where the process of FIG. 5 is performed by one of the wireless devices 30 and 32 for the D2D communication link. More specifically, FIG. 8 is a diagram that illustrates the operation of the wireless device 32 to perform the process of FIG. 5 according to one embodiment of the present disclosure. Note that the wireless device 30 may alternatively perform the process of FIG. 5. As illustrated, the wireless device 30 provides, to the base station 26, an indication of the radio distance of the wireless device 30 from the base station 26 (step 400). The base station 26 then provides the indication of the radio distance of the wireless device 30 from the base station 26 to the wireless device 32 (step 402). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like).

In addition, the wireless device 32 measures, generates, or otherwise obtains an indication of the radio distance of the wireless device 32 from the base station 26 (step 404). In this example, the wireless device 32 then determines that the radio distance for either the wireless device 30 or the wireless device 32 is less than the predefined threshold radio distance 36 based on the indications of the radio distances for the wireless devices 30 and 32 (step 406). As such, the wireless device 32 selects the DL resource of the cellular communication network 24 as the resource for the D2D communication link between the wireless devices 30 and 32 (step 408). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 410 and 412). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 414).

FIG. 9 is a diagram that illustrates the operation of the wireless device 32 to perform the process of FIG. 5 according to one embodiment of the present disclosure. Note that the wireless device 30 may alternatively perform the process of FIG. 5. As illustrated, the wireless device 30 provides, to the base station 26, an indication of the radio distance of the wireless device 30 from the base station 26 (step 500). The base station 26 then provides the indication of the radio distance of the wireless device 30 from the base station 26 to the wireless device 32 (step 502). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like).

In addition, the wireless device 32 measures, generates, or otherwise obtains an indication of the radio distance of the wireless device 32 from the base station 26 (step 504). In this example, the wireless device 32 then determines that the radio distance for neither the wireless device 30 nor the wireless device 32 is less than the predefined threshold radio distance 36 based on the indications of the radio distances for the wireless devices 30 and 32 (step 506). As such, the wireless device 32 selects the UL resource of the cellular communication network 24 as the resource for the D2D communication link between the wireless devices 30 and 32 (step 508). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 510 and 512). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 514).

Thus far, the description has focused on the scenario where both the wireless device 30 and the wireless device 32 are located within the same cell 28 of the cellular communication network 24. FIGS. 10 through 15 illustrate embodiments where the wireless device 30 and the wireless device 32 are in neighboring cells in the cellular communication network 24. More specifically, FIG. 10 graphically illustrates a resource selection scheme for the D2D communication link between the wireless devices 30 and 32 when the wireless devices 30 and 32 are located in neighboring cells of the cellular communication network 24 according to another embodiment of the present disclosure. As illustrated, the cellular communication network 24 includes the base station 26 as described above. In addition, the cellular communication network 24 includes a base station 38 that serves a corresponding cell 40 of the cellular communication network 24 that neighbors the cell 28 served by the base station 26. As such, the base stations 26 and 38 are referred to herein as neighboring base stations.

In this embodiment, the selection of resources for the D2D communication link between the wireless devices 30 and 32 is based on a radio distance between the wireless device 30 and the base station 26, which is the base station that is closest to the wireless device 30 in terms of radio distance, and a radio distance between the wireless device 32 and the base station 38, which is the base station that is closest to the wireless device 32 in terms of radio distance. Notably, the base station 26 is more generally referred to herein as a serving base station of the wireless device 30 and is not necessarily the closest base station to the wireless device 30. Likewise, the base station 38 is more generally referred to herein as a serving base station of the wireless device 32 and is not necessarily the closest base station to the wireless device 32. In the example of FIG. 10, the radio distance of the wireless device 30 from the base station 26 is greater than the predefined threshold radio distance 36 from the base station 26, and the radio distance of the wireless device 32 from the base station 38 is greater than a predefined threshold radio distance 42 from the base station 38. As such, the UL resource of the cellular communication network 24 is selected for the D2D communication link between the wireless devices 30 and 32.

FIG. 11 is a flow chart illustrating a process for selecting the resource for the D2D communication link between the wireless devices 30 and 32 according to one embodiment of the present disclosure. This process may be performed by the base station 26, the base station 38, one of the wireless devices 30 or 32 for the D2D communication link, or potentially some other network node in the cellular communication network 24. Notably, the process of FIG. 11 is similar to that of FIG. 5, but the process of FIG. 11 can be utilized to select the resource for the D2D communication link when the wireless devices 30 and 32 are located in the same cell or in neighboring cells.

First, the network node (i.e., the base station 26, the base station 38, one of the wireless devices 30 or 32, or some other network node in the cellular communication network 24) obtains an indication of a radio distance between a first wireless device for a D2D communication link, which in this case is the wireless device 30, and the base station that is closest to the wireless device 30 in terms of radio distance (step 600). For the discussion of FIG. 11 and the following discussion of FIGS. 12 through 15, it is assumed that the base station 26 is the base station that is closest to the wireless device 30 or, in other words, that the base station 26 is the serving base station of the wireless device 30. However, the present disclosure is not limited thereto. As discussed above, in one embodiment, the indication of the radio distance between the wireless device 30 and the base station 26 is an indication of link quality for a radio link between the base station 26 and the wireless device 30.

In addition, the network node obtains an indication of a radio distance between a second wireless device for the D2D communication link, which in this case is the wireless device 32, and the base station that is closest to the wireless device 32 in terms of radio distance (step 602). For the discussion of FIG. 11 and the following discussion of FIGS. 12 through 15, it is assumed that the base station 38 is the base station that is closest to the wireless device 32 or, in other words, that the base station 38 is the serving base station of the wireless device 32. However, the present disclosure is not limited thereto. As discussed above for the wireless device 30, in one embodiment, the indication of the radio distance between the wireless device 32 and the base station 38 is an indication of link quality for a radio link between the base station 38 and the wireless device 32.

The network node then determines whether the radio distance between the wireless device 30 and the base station 26 is less than the predefined threshold radio distance 36 or the radio distance between the wireless device 32 and the base station 38 is less than the predefined threshold radio distance 42 (step 604). Notably, the predefined threshold radio distances 36 and 42 are preferably the same predefined threshold radio distance. However, the present disclosure is not limited thereto. As one example of the decision in step 604, the indications of the radio distances between the base station 26 and the wireless device 30 and the base station 38 and the wireless device 32, respectively, may be corresponding RSRP values. Then, in step 604, the network node compares the RSRP values for the wireless devices 30 and 32 to threshold RSRP values that represent the predefined threshold radio distances 36 and 42, respectively. The network node then determines whether either RSRP value for the wireless device 30 or the RSRP value for the wireless device 32 is less than the corresponding threshold RSRP value. In a similar manner, other metrics such as RSRQ, CQI, RSSI, CSI, or UL SRS may be used.

If the network node determines that the radio distance between the base station 26 and the wireless device 30 is not less than the predefined threshold radio distance 36 and the radio distance between the base station 38 and the wireless device 32 is not less than the predefined threshold radio distance 42, then the network node selects the UL resource of the cellular communication network 24 as the corresponding resource for the D2D communication link between the wireless device 30 and the wireless device 32 (step 606). Again, the UL resource of the cellular communication network 24 is preferably the same UL resource used by the wireless device 34 and, potentially, another wireless device located in the neighboring cell 40. If the network node determines that either the radio distance between the base station 26 and the wireless device 30 is less than the predefined threshold radio distance 36 or the radio distance between the base station 38 and the wireless device 32 is less than the predefined threshold radio distance 42, then the network node selects the DL resource of the cellular communication network 24 as the corresponding resource for the D2D communication link between the wireless device 30 and the wireless device 32 (step 608). Again, the DL resource of the cellular communication network 24 is preferably the same DL resource used by the wireless device 34 and, potentially, another wireless device located in the neighboring cell 40.

Lastly, whether proceeding from step 606 or 608, the D2D communication link between the wireless device 30 and the wireless device 32 is configured using the selected resource (step 610). The process then returns to step 600 and is repeated. In this manner, the resource used for the D2D communication link is dynamically configured. Thus, if the wireless device 30 and/or the wireless device 32 move such that the decision in step 604 changes, the resource selected for the D2D communication link also changes.

FIGS. 12 and 13 illustrate embodiments where the base station 26 performs the process of FIG. 11. However, the base station 38 may alternatively perform the process of FIG. 11. More specifically, FIG. 12 is a diagram that illustrates the operation of the base station 26 to perform the process of FIG. 11 according to one embodiment of the present disclosure. As illustrated, the wireless device 30 provides, to the base station 26, an indication of the radio distance of the wireless device 30 from the base station 26 (step 700). Likewise, the wireless device 32 provides, to the base station 38, an indication of the radio distance of the wireless device 32 from the base station 38 (step 702). The base station 38 then sends the indication of the radio distance between the wireless device 32 and the base station 38 to the base station 26 (step 704). Notably, the base stations 26 and 38 are connected via a wired or wireless interface. For example, for LTE, the X2 interface may be used for communication between the base stations 26 and 38.

In this example, the base station 26 then determines that the radio distance for the wireless device 30 is less than the predefined threshold radio distance 36 or the radio distance for the wireless device 32 is less than the predefined threshold radio distance 42 based on the indications of the radio distances for the wireless devices 30 and 32 received in steps 700 and 704 (step 706). As such, the base station 26 selects the DL resource of the cellular communication network 24 as the resource for the D2D communication link between the wireless devices 30 and 32 (step 708). Then, the base station 26 configures the D2D communication link using the selected resource by, in this embodiment, sending an indication of the selected resource for the D2D communication link to the wireless device 30 (step 710) and sending the indication of the selected resource for the D2D communication link to the base station 38 (step 712), which in turn sends the indication of the selected resource for the D2D communication link to the wireless device 32 (step 714). The indication of the selected resource may be any suitable information for conveying the selected resource to the wireless devices 30 and 32. The wireless devices 30 and 32 then communicate via the D2D communication link using the selected resource (step 716).

FIG. 13 is a diagram that illustrates the operation of the base station 26 to perform the process of FIG. 11 according to one embodiment of the present disclosure. As illustrated, the wireless device 30 provides, to the base station 26, an indication of the radio distance of the wireless device 30 from the base station 26 (step 800). Likewise, the wireless device 32 provides, to the base station 38, an indication of the radio distance of the wireless device 32 from the base station 38 (step 802). The base station 38 then sends the indication of the radio distance between the wireless device 32 and the base station 38 to the base station 26 (step 804). Notably, the base stations 26 and 38 are connected via a wired or wireless interface. For example, for LTE, the X2 interface may be used for communication between the base stations 26 and 38.

In this example, the base station 26 then determines that neither the radio distance for the wireless device 30 or the radio distance for the wireless device 32 is less than the corresponding predefined threshold radio distance 36, 42 based on the indications of the radio distances for the wireless devices 30 and 32 received in steps 800 and 804 (step 806). As such, the base station 26 selects the UL resource of the cellular communication network 24 as the resource for the D2D communication link between the wireless devices 30 and 32 (step 808). Then, the base station 26 configures the D2D communication link using the selected resource by, in this embodiment, sending an indication of the selected resource for the D2D communication link to the wireless device 30 (step 810) and sending the indication of the selected resource for the D2D communication link to the base station 38 (step 812), which in turn sends the indication of the selected resource for the D2D communication link to the wireless device 32 (step 814). The indication of the selected resource may be any suitable information for conveying the selected resource to the wireless devices 30 and 32. The wireless devices 30 and 32 then communicate via the D2D communication link using the selected resource (step 816).

FIGS. 14 and 15 are similar to FIGS. 12 and 13 but where the process of FIG. 11 is performed by one of the wireless devices 30 and 32 for the D2D communication link. More specifically, FIG. 14 is a diagram that illustrates the operation of the wireless device 30 to perform the process of FIG. 11 according to one embodiment of the present disclosure. Note that the wireless device 32 may alternatively perform the process of FIG. 11. As illustrated, the wireless device 32 provides, to the base station 38, an indication of the radio distance of the wireless device 32 from the base station 38 (step 900). The base station 900 then provides the indication of the radio distance of the wireless device 32 from the base station 38 to the base station 26 (step 902), which in turn sends the indication of the radio distance of the wireless device 32 from the base station 38 to the wireless device 30 (step 904). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like).

In addition, the wireless device 30 measures, generates, or otherwise obtains an indication of the radio distance of the wireless device 30 from the base station 26 (step 906). In this example, the wireless device 30 then determines that the radio distance for either the wireless device 30 or the wireless device 32 is less than the corresponding predefined threshold radio distance 36, 42 based on the indications of the radio distances for the wireless devices 30 and 32 (step 908). As such, the wireless device 30 selects the DL resource of the cellular communication network 24 as the resource for the D2D communication link between the wireless devices 30 and 32 (step 910). Then, the wireless device 30 configures the D2D communication link using the selected resource by, in this embodiment, sending an indication of the selected resource for the D2D communication link to the base station 26 (step 912). The base station 26 then sends the indication of the selected resource for the D2D communication link to the base station 38, which in turn sends the indication of the selected resource for the D2D communication link to the wireless device 32 (steps 914 and 916). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 918).

FIG. 15 is a diagram that illustrates the operation of the wireless device 30 to perform the process of FIG. 11 according to one embodiment of the present disclosure. Note that the wireless device 32 may alternatively perform the process of FIG. 11. As illustrated, the wireless device 32 provides, to the base station 38, an indication of the radio distance of the wireless device 32 from the base station 38 (step 1000). The base station 38 then provides the indication of the radio distance of the wireless device 32 from the base station 38 to the base station 26 (step 1002), which in turn sends the indication of the radio distance of the wireless device 32 from the base station 38 to the wireless device 30 (step 1004). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like).

In addition, the wireless device 30 measures, generates, or otherwise obtains an indication of the radio distance of the wireless device 30 from the base station 26 (step 1006). In this example, the wireless device 30 then determines that the radio distance for neither the wireless device 30 nor the wireless device 32 is less than the corresponding predefined threshold radio distance 36, 42 based on the indications of the radio distances for the wireless devices 30 and 32 (step 1008). As such, the wireless device 30 selects the UL resource of the cellular communication network 24 as the resource for the D2D communication link between the wireless devices 30 and 32 (step 1010). Then, the wireless device 30 configures the D2D communication link using the selected resource by, in this embodiment, sending an indication of the selected resource for the D2D communication link to the base station 26 (step 1012). The base station 26 then sends the indication of the selected resource for the D2D communication link to the base station 38, which in turn sends the indication of the selected resource for the D2D communication link to the wireless device 32 (steps 1014 and 1016). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 1018).

In the embodiments above, either an UL or a DL resource of the cellular communication network 24 is selected as a resource to the direct D2D communication link between the wireless devices 30 and 32 based on the radio distances of the wireless devices 30 and 32 from their serving base stations. Below, several embodiments are disclosed in which selection of the UL or the DL resource also considers receiver characteristics of the serving base station(s) of the wireless devices 30 and 32 and, in some embodiments, receiver characteristics of other wireless devices that are sufficiently near the wireless devices 30 and 32. In particular, when selecting either the UL or the DL resource, the selection processes takes into consideration whether or not the serving base station(s) and, in some embodiments, any nearby wireless devices are equipped with interference cancellation receivers.

Particularly in the case of heterogeneous cellular networks, different types of base stations are expected to be located within the same geographical area. For instance, for LTE, macro base stations, pico base stations, femto base stations, home eNBs, and relays are expected to be in the same geographical area. Pico base stations, femto base stations, home eNBs, and relays are generally referred to herein as low power nodes, whereas a macro base station is referred to herein as a high power node. These different types of nodes may have different characteristics in terms of receivers, number of antennas, etc. Namely, in LTE, some of the macro base stations may be equipped with advanced receivers capable of cancelling, or mitigating, a significant amount of interference (i.e., interference cancellation receivers), whereas other macro base stations and other types of base stations may not be equipped with interference cancellation receivers. As such, the situation may arise where the serving base station(s) of the wireless devices 30 and 32 is(are) equipped with an interference cancellation receiver. In this situation and under certain conditions, the downlinks in the corresponding cell(s) may be more vulnerable to interference from D2D communication between the wireless devices 30 and 32 than the uplink to the interference cancellation receiver(s) of the serving base station(s).

FIG. 16 is a flow chart illustrating a process for selecting one or more resources for the D2D communication link between the wireless devices 30 and 32 according to another embodiment of the present disclosure. This process may be performed by the base station 26, one of the wireless devices 30 or 32 for the D2D communication link, or potentially some other network node in the cellular communication network 24. First, the network node (i.e., the base station 26, one of the wireless devices 30 or 32, or some other network node in the cellular communication network 24) obtains an indication of a radio distance between a first wireless device for a D2D communication link, which in this case is the wireless device 30, and the base station 26 (step 1100). In one embodiment, the indication of the radio distance between the wireless device 30 and the base station 26 is an indication of link quality for a radio link between the base station 26 and the wireless device 30. For example, the indication of the radio distance between the wireless device 30 and the base station 26 may be a RSRP value such as that measured by a wireless device in an LTE cellular communication network, a RSRQ value such as that measured by a wireless device in an LTE cellular communication network, a CQI value such as that measured by a wireless device in an LTE cellular communication network, a RSSI value measured by the wireless device 30 for a signal transmitted from the base station 26 to the wireless device 30, CSI such as that generated a wireless device in an LTE cellular communication network, an UL SRS transmitted by the wireless device 30, SINR value, or the like, or any combination thereof. In addition, the network node obtains an indication of a radio distance between a second wireless device for the D2D communication link, which in this case is the wireless device 32, and the base station 26 (step 1102). As discussed above for the wireless device 30, in one embodiment, the indication of the radio distance between the wireless device 32 and the base station 26 is an indication of link quality for a radio link between the base station 26 and the wireless device 32.

In this embodiment, the network node determines whether the base station 26 is equipped with one or more interference cancellation receivers (step 1104). If not, the network node proceeds in the manner described above with respect to FIG. 5. Specifically, the network node then determines whether the radio distance between the wireless device 30 and the base station 26 or the radio distance between the wireless device 32 and the base station 26 is less than the predefined threshold radio distance 36 (step 1106). For example, in one particular embodiment, the indications of the radio distances between the base station 26 and the wireless devices 30 and 32, respectively, are corresponding RSRP values. Then, in step 1106, the network node compares the RSRP values for the wireless devices 30 and 32 to a threshold RSRP value that represents the predefined threshold radio distance 36. The network node then determines that the wireless device 30 is less than the threshold distance from the base station 26 if the RSRP value for the wireless device 30 is greater than the threshold RSRP value. Likewise, the network node then determines that the wireless device 32 is less than the threshold distance from the base station 26 if the RSRP value for the wireless device 32 is greater than the threshold RSRP value. In a similar manner, other metrics such as RSRQ, CQI, RSSI, CSI, or UL SRS may be used.

If the network node determines that neither the radio distance between the base station 26 and the wireless device 30 nor the radio distance between the base station 26 and the wireless device 32 is less than the predefined threshold radio distance 36, then the network node selects an UL resource of the cellular communication network 24 as a corresponding resource for the D2D communication link between the wireless device 30 and the wireless device 32 (step 1108). Again, the UL resource of the cellular communication network 24 is preferably the same UL resource used by the wireless device 34 located in the cell 28. Conversely, if the network node determines that either the radio distance between the base station 26 and the wireless device 30 or the radio distance between the base station 26 and the wireless device 32 is less than the predefined threshold radio distance 36, then the network node selects a DL resource of the cellular communication network 24 as a corresponding resource for the D2D communication link between the wireless device 30 and the wireless device 32 (step 1110). Again, the DL resource of the cellular communication network 24 is preferably the same DL resource used by the wireless device 34 located in the cell 28.

Returning to step 1104, if the network node determines that the base station 26 is equipped with one or more interference cancellation receivers, the network node then determines whether both the radio distance between the wireless device 30 and the base station 26 and the radio distance between the wireless device 32 and the base station 26 are less than the predefined threshold radio distance 36 (step 1112). If not, the network node selects the UL resource of the cellular communication network 24 as the corresponding resource for the D2D communication link between the wireless device 30 and the wireless device 32 (step 1114). Again, the UL resource of the cellular communication network 24 is preferably the same UL resource used by the wireless device 34 located in the cell 28. Conversely, if the network node determines both the radio distance between the base station 26 and the wireless device 30 and the radio distance between the base station 26 and the wireless device 32 is less than the predefined threshold radio distance 36, then the network node selects the DL resource of the cellular communication network 24 as the corresponding resource for the D2D communication link between the wireless device 30 and the wireless device 32 (step 1116). Again, the DL resource of the cellular communication network 24 is preferably the same DL resource used by the wireless device 34 located in the cell 28.

Lastly, whether proceeding from step 1108, 1110, 1114, or 1116, the D2D communication link between the wireless device 30 and the wireless device 32 is configured using the selected resource (step 1118). The process then returns to step 1100 and is repeated. In this manner, the resource used for the D2D communication link is dynamically configured. Thus, if the wireless device 30 and/or the wireless device 32 move such that the decision in step 1104, 1106, or 1112 changes, the resource selected for the D2D communication link also changes.

FIG. 17 is a diagram that illustrates the operation of the base station 26 to perform the process of FIG. 16 according to one embodiment of the present disclosure. As illustrated, the wireless device 30 provides, to the base station 26, an indication of the radio distance of the wireless device 30 from the base station 26 (step 1200). Likewise, the wireless device 32 provides, to the base station 26, an indication of the radio distance of the wireless device 32 from the base station 26 (step 1202). In this example, the base station 26 then determines that the base station 26 is equipped with one or more interference cancellation receivers and that both the wireless device 30 and the wireless device 32 are less than the predefined threshold radio distance 36 from the base station 26 (step 1204). As such, the base station 26 selects the DL resource of the cellular communication network 24 as the resource for the D2D communication link between the wireless devices 30 and 32 (step 1206). Then, the base station 26 configures the D2D communication link using the selected resource by, in this embodiment, sending an indication of the selected resource for the D2D communication link to both the wireless device 30 and the wireless device 32 (steps 1208 and 1210). The indication of the selected resource may be any suitable information for conveying the selected resource to the wireless devices 30 and 32. The wireless devices 30 and 32 then communicate via the D2D communication link using the selected resource (step 1212).

FIG. 18 is a diagram that illustrates the operation of the base station 26 to perform the process of FIG. 16 according to one embodiment of the present disclosure. As illustrated, the wireless device 30 provides, to the base station 26, an indication of the radio distance of the wireless device 30 from the base station 26 (step 1300). Likewise, the wireless device 32 provides, to the base station 26, an indication of the radio distance of the wireless device 32 from the base station 26 (step 1302). In this example, the base station 26 then determines that the base station 26 is equipped with one or more interference cancellation receivers and that at least one of the radio distances for the wireless devices 30 and 32 is greater than the predefined threshold radio distance 36 (i.e., that at least one of the wireless device 30 and the wireless device 32 is greater than the predefined threshold radio distance 36 from the base station 26) (step 1304). As such, the base station 26 selects the UL resource of the cellular communication network 24 as the resource for the D2D communication link between the wireless devices 30 and 32 (step 1306). Notably, if one of the wireless devices 30 and 32 is less than the predefined threshold radio distance 36 from the base station 26, the one or more interference cancellation receivers of the base station 26 can then be used to receive uplinks from other wireless devices, including the wireless device 34 that uses the same UL resource, in the presence of the interference from the wireless device 30 or 32 that is less than the predefined threshold radio distance 36 from the base station 26.

The base station 26 then configures the D2D communication link using the selected resource by, in this embodiment, sending an indication of the selected resource for the D2D communication link to both the wireless device 30 and the wireless device 32 (steps 1308 and 1310). The indication of the selected resource may be any suitable information for conveying the selected resource to the wireless devices 30 and 32. The wireless devices 30 and 32 then communicate via the D2D communication link using the selected resource (step 1312).

FIGS. 19 and 20 are similar to FIGS. 17 and 18 but where the process of FIG. 16 is performed by one of the wireless devices 30 and 32 for the D2D communication link. More specifically, FIG. 19 is a diagram that illustrates the operation of the wireless device 32 to perform the process of FIG. 16 according to one embodiment of the present disclosure. Note that the wireless device 30 may alternatively perform the process of FIG. 16. As an example, the wireless device 30 or 32 that is closest to the base station 26 may perform the process.

As illustrated, the wireless device 30 provides, to the base station 26, an indication of the radio distance of the wireless device 30 from the base station 26 (step 1400). The base station 26 then provides the indication of the radio distance of the wireless device 30 from the base station 26 to the wireless device 32 (step 1402). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like). In addition, the wireless device 32 measures, generates, or otherwise obtains an indication of the radio distance of the wireless device 32 from the base station 26 (step 1404).

In this example, the wireless device 32 then determines that the base station 26 is equipped with one or more interference cancellation receivers and that both the wireless device 30 and the wireless device 32 are less than the predefined threshold radio distance 36 from the base station 26 (step 1406). Notably, the wireless device 32 may obtain information from the base station 26 that indicates whether the base station 26 is equipped with one or more interference cancellation receivers. The wireless device 32 then selects the DL resource of the cellular communication network 24 as the resource for the D2D communication link between the wireless devices 30 and 32 (step 1408). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 1410 and 1412). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 1414).

FIG. 20 is a diagram that illustrates the operation of the wireless device 32 to perform the process of FIG. 16 according to another embodiment of the present disclosure. Note that the wireless device 30 may alternatively perform the process of FIG. 16. As illustrated, the wireless device 30 provides, to the base station 26, an indication of the radio distance of the wireless device 30 from the base station 26 (step 1500). The base station 26 then provides the indication of the radio distance of the wireless device 30 from the base station 26 to the wireless device 32 (step 1502). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like). In addition, the wireless device 32 measures, generates, or otherwise obtains an indication of the radio distance of the wireless device 32 from the base station 26 (step 1504).

In this example, the wireless device 32 then determines that the base station 26 is equipped with one or more interference cancellation receivers and that at least one of the radio distances for the wireless devices 30 and 32 is greater than the predefined threshold radio distance 36 (i.e., that at least one of the wireless device 30 and the wireless device 32 is more than the predefined threshold radio distance 36 from the base station 26) (step 1506). Notably, the wireless device 32 may obtain information from the base station 26 that indicates whether the base station 26 is equipped with one or more interference cancellation receivers. The wireless device 32 then selects the UL resource of the cellular communication network 24 as the resource for the D2D communication link between the wireless devices 30 and 32 (step 1508). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 1510 and 1512). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 1514).

FIG. 21 is a flow chart illustrating a process for selecting the resource for the D2D communication link between the wireless devices 30 and 32 according to one embodiment of the present disclosure. This process may be performed by the base station 26, the base station 38, one of the wireless devices 30 or 32 for the D2D communication link, or potentially some other network node in the cellular communication network 24. Notably, the process of FIG. 21 is similar to that of FIG. 16, but the process of FIG. 21 can be utilized to select the resource for the D2D communication link when the wireless devices 30 and 32 are located in the same cell or in neighboring cells.

First, the network node (i.e., the base station 26, one of the wireless devices 30 or 32, or some other network node in the cellular communication network 24) obtains an indication of a radio distance between a first wireless device for a D2D communication link and a serving base station of the first wireless device, which in this embodiment is the base station that is closest to the first wireless device in terms of radio distance (step 1600). For this discussion, the first wireless device is the wireless device 30, and the serving base station of the wireless device 30 is the base station 26. In addition, the network node obtains an indication of a radio distance between a second wireless device for the D2D communication link and a serving base station of the second wireless device, which in this embodiment is the base station that is closest to the second wireless device in terms of radio distance (step 1602). For this discussion, the second wireless device is the wireless device 32, and the serving base station of the wireless device 32 is the base station 38.

In this embodiment, the network node determines whether the base stations 26 and 38 are equipped with one or more interference cancellation receivers (step 1604). If not, the network node proceeds in the manner described above with respect to FIG. 5. Specifically, the network node then determines whether the radio distance between the wireless device 30 and the base station 26 or the radio distance between the wireless device 32 and the base station 38 is less than the corresponding predefined threshold radio distance 36, 42

(step 1606). If the network node determines that neither the radio distance between the base station 26 and the wireless device 30 nor the radio distance between the base station 38 and the wireless device 32 is less than the corresponding predefined threshold radio distance 36, 42, then the network node selects an UL resource of the cellular communication network 24 as a corresponding resource for the D2D communication link between the wireless device 30 and the wireless device 32 (step 1608). Conversely, if the network node determines that either the radio distance between the base station 26 and the wireless device 30 or the radio distance between the base station 38 and the wireless device 32 is less than the corresponding predefined threshold radio distance 36, 42, then the network node selects a DL resource of the cellular communication network 24 as a corresponding resource for the D2D communication link between the wireless device 30 and the wireless device 32 (step 1610).

Returning to step 1604, if the network node determines that the base stations 26 and 38 are equipped with one or more interference cancellation receivers, the network node then determines whether both the radio distance between the wireless device 30 and the base station 26 and the radio distance between the wireless device 32 and the base station 38 are less than the corresponding predefined threshold radio distances 36 and 42 (step 1612). If not, the network node selects the UL resource of the cellular communication network 24 as the corresponding resource for the D2D communication link between the wireless device 30 and the wireless device 32 (step 1614). Conversely, if the network node determines that both the radio distance between the base station 26 and the wireless device 30 and the radio distance between the base station 38 and the wireless device 32 are less than the corresponding predefined threshold radio distances 36 and 42, then the network node selects the DL resource of the cellular communication network 24 as the corresponding resource for the D2D communication link between the wireless device 30 and the wireless device 32 (step 1616).

Lastly, whether proceeding from step 1608, 1610, 1614, or 1616, the D2D communication link between the wireless device 30 and the wireless device 32 is configured using the selected resource (step 1618). The process then returns to step 1600 and is repeated. In this manner, the resource used for the D2D communication link is dynamically configured. Thus, if the wireless device 30 and/or the wireless device 32 move such that the decision in step 1604, 1606, or 1612 changes, the resource selected for the D2D communication link also changes.

FIGS. 22 and 23 illustrate embodiments where the base station 26 performs the process of FIG. 21. However, the base station 38 may alternatively perform the process of FIG. 21. More specifically, FIG. 22 is a diagram that illustrates the operation of the base station 26 to perform the process of FIG. 21 according to one embodiment of the present disclosure. As illustrated, the wireless device 30 provides, to the base station 26, an indication of the radio distance of the wireless device 30 from the base station 26 (step 1700). Likewise, the wireless device 32 provides, to the base station 38, an indication of the radio distance of the wireless device 32 from the base station 38 (step 1702). The base station 38 then sends the indication of the radio distance between the wireless device 32 and the base station 38 to the base station 26 (step 1704). Notably, the base stations 26 and 38 are connected via a wired or wireless interface. For example, for LTE, the X2 interface may be used for communication between the base stations 26 and 38.

In this example, the base station 26 then determines that the base stations 26 and 38 are equipped with interference cancellation receivers and that both the radio distance for the wireless device 30 and the radio distance for the wireless device 32 are less than the corresponding predefined threshold radio distances 36 and 42 based on the indications of the radio distances for the wireless devices 30 and 32 received in steps 1700 and 1704 (step 1706). Notably, the base station 26 may receive information from the base station 38 or some other node in the cellular communication network 24 that indicates whether the base station 38 is equipped with an interference cancellation receiver. This information may be received as part of step 1706 or sometime before step 1706. The base station 26 then selects the DL resource of the cellular communication network 24 as the resource for the D2D communication link between the wireless devices 30 and 32 (step 1708).

Next, the base station 26 configures the D2D communication link using the selected resource by, in this embodiment, sending an indication of the selected resource for the D2D communication link to the wireless device 30 (step 1710) and sending the indication of the selected resource for the D2D communication link to the base station 38 (step 1712), which in turn sends the indication of the selected resource for the D2D communication link to the wireless device 32 (step 1714). The indication of the selected resource may be any suitable information for conveying the selected resource to the wireless devices 30 and 32. The wireless devices 30 and 32 then communicate via the D2D communication link using the selected resource (step 1716).

FIG. 23 is a diagram that illustrates the operation of the base station 26 to perform the process of FIG. 21 according to one embodiment of the present disclosure. As illustrated, the wireless device 30 provides, to the base station 26, an indication of the radio distance of the wireless device 30 from the base station 26 (step 1800). Likewise, the wireless device 32 provides, to the base station 38, an indication of the radio distance of the wireless device 32 from the base station 38 (step 1802). The base station 38 then sends the indication of the radio distance between the wireless device 32 and the base station 38 to the base station 26 (step 1804). Notably, the base stations 26 and 38 are connected via a wired or wireless interface. For example, for LTE, the X2 interface may be used for communication between the base stations 26 and 38.

In this example, the base station 26 then determines that the base stations 26 and 38 are equipped with interference cancellation receivers and that at least one of the radio distance for the wireless device 30 and the radio distance for the wireless device 32 is greater than the corresponding predefined threshold radio distance 36, 42 (step 1806). Notably, the base station 26 may receive information from the base station 38 or some other node in the cellular communication network 24 that indicates whether the base station 38 is equipped with an interference cancellation receiver. This information may be received as part of step 1806 or sometime before step 1806. The base station 26 then selects the UL resource of the cellular communication network 24 as the resource for the D2D communication link between the wireless devices 30 and 32 (step 1808).

Next, the base station 26 configures the D2D communication link using the selected resource by, in this embodiment, sending an indication of the selected resource for the D2D communication link to the wireless device 30 (step 1810) and sending the indication of the selected resource for the D2D communication link to the base station 38 (step 1812), which in turn sends the indication of the selected resource for the D2D communication link to the wireless device 32 (step 1814). The indication of the selected resource may be any suitable information for conveying the selected resource to the wireless devices 30 and 32. The wireless devices 30 and 32 then communicate via the D2D communication link using the selected resource (step 1816).

FIGS. 24 and 25 are similar to FIGS. 22 and 23 but where the process of FIG. 21 is performed by one of the wireless devices 30 and 32 for the D2D communication link. In one particular embodiment, the process of FIG. 21 is performed by the wireless device 30 or 32 that is closest to its serving base station 26 or 38. More specifically, FIG. 24 is a diagram that illustrates the operation of the wireless device 30 to perform the process of FIG. 21 according to one embodiment of the present disclosure. Note that the wireless device 32 may alternatively perform the process of FIG. 21. As illustrated, the wireless device 32 provides, to the base station 38, an indication of the radio distance of the wireless device 32 from the base station 38 (step 1900). The base station 38 then provides the indication of the radio distance of the wireless device 32 from the base station 38 to the base station 26 (step 1902), which in turn sends the indication of the radio distance of the wireless device 32 from the base station 38 to the wireless device 30 (step 1904). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like). In addition, the wireless device 30 measures, generates, or otherwise obtains an indication of the radio distance of the wireless device 30 from the base station 26 (step 1906).

In this example, the wireless device 30 then determines that the base stations 26 and 38 are equipped with interference cancellation receivers and that both the radio distance between the wireless device 30 and the base station 26 and the radio distance between the wireless device 32 and the base station 38 are less than the corresponding predefined threshold radio distances 36 and 42 (step 1908). Notably, the wireless device 30 may obtain information indicating whether the base stations 26 and 38 are equipped with interference cancellation receivers from the base station 26, from the base stations 26 and 38, or from some other network node in the cellular communication network 24. The wireless device 30 then selects the DL resource of the cellular communication network 24 as the resource for the D2D communication link between the wireless devices 30 and 32 (step 1910).

Next, the wireless device 30 configures the D2D communication link using the selected resource by, in this embodiment, sending an indication of the selected resource for the D2D communication link to the base station 26 (step 1912). The base station 26 then sends the indication of the selected resource for the D2D communication link to the base station 38, which in turn sends the indication of the selected resource for the D2D communication link to the wireless device 32 (steps 1914 and 1916). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 1918).

FIG. 25 is a diagram that illustrates the operation of the wireless device 30 to perform the process of FIG. 21 according to one embodiment of the present disclosure. Note that the wireless device 32 may alternatively perform the process of FIG. 21. As illustrated, the wireless device 32 provides, to the base station 38, an indication of the radio distance of the wireless device 32 from the base station 38 (step 2000). The base station 38 then provides the indication of the radio distance of the wireless device 32 from the base station 38 to the base station 26 (step 2002), which in turn sends the indication of the radio distance of the wireless device 32 from the base station 38 to the wireless device 30 (step 2004). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like). In addition, the wireless device 30 measures, generates, or otherwise obtains an indication of the radio distance of the wireless device 30 from the base station 26 (step 2006).

In this example, the wireless device 30 then determines that the base stations 26 and 28 are equipped with interference cancellation receivers and that at least one of the radio distance between the wireless device 30 and the base station 26 and the radio distance between the wireless device 32 and the base station 38 is greater than the corresponding predefined threshold radio distance 36, 42 (step 2008). Notably, the wireless device 30 may obtain information indicating whether the base stations 26 and 38 are equipped with interference cancellation receivers from the base station 26, from the base stations 26 and 38, or from some other network node in the cellular communication network 24. The wireless device 30 then selects the UL resource of the cellular communication network 24 as the resource for the D2D communication link between the wireless devices 30 and 32 (step 2010).

Next, the wireless device 30 configures the D2D communication link using the selected resource by, in this embodiment, sending an indication of the selected resource for the D2D communication link to the base station 26 (step 2012). The base station 26 then sends the indication of the selected resource for the D2D communication link to the base station 38, which in turn sends the indication of the selected resource for the D2D communication link to the wireless device 32 (steps 2014 and 2016). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 2018).

FIG. 26 is a flow chart illustrating a process for selecting one or more resources for the D2D communication link between the wireless devices 30 and 32 according to another embodiment of the present disclosure. This process may be performed by the base station 26, one of the wireless devices 30 or 32 for the D2D communication link, or potentially some other network node in the cellular communication network 24. In general, this process is similar to that of FIG. 16 but further considers whether other wireless devices that are near the wireless devices 30 and 32 are equipped with interference cancellation receivers.

First, the network node (i.e., the base station 26, one of the wireless devices 30 or 32, or some other network node in the cellular communication network 24) obtains an indication of a radio distance between a first wireless device for a D2D communication link, which in this case is the wireless device 30, and the base station 26 (step 2100). In one embodiment, the indication of the radio distance between the wireless device 30 and the base station 26 is an indication of link quality for a radio link between the base station 26 and the wireless device 30. For example, the indication of the radio distance between the wireless device 30 and the base station 26 may be a RSRP value such as that measured by a wireless device in an LTE cellular communication network, a RSRQ value such as that measured by a wireless device in an LTE cellular communication network, a CQI value such as that measured by a wireless device in an LTE cellular communication network, a RSSI value measured by the wireless device 30 for a signal transmitted from the base station 26 to the wireless device 30, CSI such as that generated a wireless device in an LTE cellular communication network, an UL SRS transmitted by the wireless device 30, SINR value, or the like, or any combination thereof. In addition, the network node obtains an indication of a radio distance between a second wireless device for the D2D communication link, which in this case is the wireless device 32, and the base station 26 (step 2102). As discussed above for the wireless device 30, in one embodiment, the indication of the radio distance between the wireless device 32 and the base station 26 is an indication of link quality for a radio link between the base station 26 and the wireless device 32.

In this embodiment, the network node determines whether the base station 26 is equipped with one or more interference cancellation receivers (step 2104). If not, the network node proceeds in the manner described above with respect to FIG. 5. Specifically, the network node then determines whether the radio distance between the wireless device 30 and the base station 26 or the radio distance between the wireless device 32 and the base station 26 is less than the predefined threshold radio distance 36 (step 2106). For example, in one particular embodiment, the indications of the radio distances between the base station 26 and the wireless devices 30 and 32, respectively, are corresponding RSRP values. Then, in step 2106, the network node compares the RSRP values for the wireless devices 30 and 32 to a threshold RSRP value that represents the predefined threshold radio distance 36. The network node then determines that the wireless device 30 is less than the threshold distance from the base station 26 if the RSRP value for the wireless device 30 is greater than the threshold RSRP value. Likewise, the network node then determines that the wireless device 32 is less than the threshold distance from the base station 26 if the RSRP value for the wireless device 32 is greater than the threshold RSRP value. In a similar manner, other metrics such as RSRQ, CQI, RSSI, CSI, or UL SRS may be used.

If the network node determines that neither the radio distance between the base station 26 and the wireless device 30 nor the radio distance between the base station 26 and the wireless device 32 is less than the predefined threshold radio distance 36, then the network node selects an UL resource of the cellular communication network 24 as a corresponding resource for the D2D communication link between the wireless device 30 and the wireless device 32 (step 2108). Again, the UL resource of the cellular communication network 24 is preferably the same UL resource used by the wireless device 34 located in the cell 28. Conversely, if the network node determines that either the radio distance between the base station 26 and the wireless device 30 or the radio distance between the base station 26 and the wireless device 32 is less than the predefined threshold radio distance 36, then the network node selects a DL resource of the cellular communication network 24 as a corresponding resource for the D2D communication link between the wireless device 30 and the wireless device 32 (step 2110). Again, the DL resource of the cellular communication network 24 is preferably the same DL resource used by the wireless device 34 located in the cell 28.

Returning to step 2104, if the network node determines that the base station 26 is equipped with one or more interference cancellation receivers, the network node then determines whether both the radio distance between the wireless device 30 and the base station 26 and the radio distance between the wireless device 32 and the base station 26 are less than the predefined threshold radio distance 36 (step 2112). If not, the network node selects the UL resource of the cellular communication network 24 as the corresponding resource for the D2D communication link between the wireless device 30 and the wireless device 32 (step 2114). Again, the UL resource of the cellular communication network 24 is preferably the same UL resource used by the wireless device 34 located in the cell 28.

In this embodiment, if the network node determines that both the radio distance between the base station 26 and the wireless device 30 and the radio distance between the base station 26 and the wireless device 32 are less than the predefined threshold radio distance 36, the network node determines whether at least a predefined threshold amount of other wireless devices that are sufficiently near the wireless devices 30 and 32, if any, are equipped with one or more interference cancellation receivers (step 2116). In one embodiment, the predefined threshold amount of any other wireless devices is a majority of the other nearby wireless devices that are sufficiently near the wireless devices 30 and 32. The predefined threshold amount may be, for example, a predefined percentage in the range of and including 0% to 100%, a predefined percentage greater than 50%, a predefined percentage greater than 67%, or a predefined percentage greater than 75%. Here, other wireless devices that are "sufficiently near" the wireless devices 30 and 32 are other wireless devices that are within a predefined radio distance from either of the wireless devices 30 and 32.

If less than the threshold number of the other wireless devices that are sufficiently near the wireless devices 30 and 32 are equipped with interference cancellation receiver(s), the network node selects the UL resource of the cellular communication network 24 as the corresponding resource for the D2D communication link between the wireless device 30 and the wireless device 32 (step 2118). In this manner, the downlinks to nearby wireless devices that are not equipped with interference cancellation receivers are protected. However, if at least the threshold number of the other wireless devices that are sufficiently near the wireless devices 30 and 32 are equipped with interference cancellation receiver(s), the network node selects the DL resource of the cellular communication network 24 as the corresponding resource for the D2D communication link between the wireless device 30 and the wireless device 32 (step 2120). Again, the DL resource of the cellular communication network 24 is preferably the same DL resource used by the wireless device 34 located in the cell 28.

Lastly, whether proceeding from step 2108, 2110, 2114, 2118, or 2120, the D2D communication link between the wireless device 30 and the wireless device 32 is configured using the selected resource (step 2122). The process then returns to step 2100 and is repeated. In this manner, the resource used for the D2D communication link is dynamically configured. Thus, if the wireless device 30 and/or the wireless device 32 move such that the decision in step 2104,

2106, 2112, or 2116 changes, the resource selected for the D2D communication link also changes.

FIG. 27 is a diagram that illustrates the operation of the base station 26 to perform the process of FIG. 26 according to one embodiment of the present disclosure. As illustrated, the wireless device 30 provides, to the base station 26, an indication of the radio distance of the wireless device 30 from the base station 26 (step 2200). Likewise, the wireless device 32 provides, to the base station 26, an indication of the radio distance of the wireless device 32 from the base station 26 (step 2202). In this example, the base station 26 then determines that the base station 26 is equipped with one or more interference cancellation receivers and that both the wireless device 30 and the wireless device 32 are less than the predefined threshold radio distance 36 from the base station 26 (step 2204).

The base station 26 then determines that at least the predefined threshold amount of other wireless devices that are sufficiently near the wireless devices 30 and 32 are equipped with interference cancellation receivers (step 2206). Using LTE as an example, base stations operating according to LTE Release 11 and onward know whether wireless devices in their cells are equipped with interference cancellation receivers. More generally, in one embodiment, the base station 26 may obtain information indicative of whether wireless devices served by the base station 26 are equipped with interference cancellation receivers using appropriate signaling. However, other mechanisms may be used to obtain this information.

In response to determining that at least the predefined threshold number of other wireless devices that are sufficiently near the wireless devices 30 and 32 are equipped with interference cancellation receivers, the base station 26 selects the DL resource of the cellular communication network 24 as the resource for the D2D communication link between the wireless devices 30 and 32 (step 2208). Then, the base station 26 configures the D2D communication link using the selected resource by, in this embodiment, sending an indication of the selected resource for the D2D communication link to both the wireless device 30 and the wireless device 32 (steps 2210 and 2212). The indication of the selected resource may be any suitable information for conveying the selected resource to the wireless devices 30 and 32. The wireless devices 30 and 32 then communicate via the D2D communication link using the selected resource (step 2214).

FIG. 28 is a diagram that illustrates the operation of the base station 26 to perform the process of FIG. 26 according to one embodiment of the present disclosure. As illustrated, the wireless device 30 provides, to the base station 26, an indication of the radio distance of the wireless device 30 from the base station 26 (step 2300). Likewise, the wireless device 32 provides, to the base station 26, an indication of the radio distance of the wireless device 32 from the base station 26 (step 2302). In this example, the base station 26 then determines that the base station 26 is equipped with one or more interference cancellation receivers and that both the wireless device 30 and the wireless device 32 are less than the predefined threshold radio distance 36 from the base station 26 (step 2304).

The base station 26 then determines that less than the predefined threshold amount of other wireless devices that are sufficiently near the wireless devices 30 and 32 are equipped with interference cancellation receivers (step 2306). In response, the base station 26 selects the UL resource of the cellular communication network 24 as the resource for the D2D communication link between the wireless devices 30 and 32 (step 2308). Then, the base station 26 configures the D2D communication link using the selected resource by, in this embodiment, sending an indication of the selected resource for the D2D communication link to both the wireless device 30 and the wireless device 32 (steps 2310 and 2312). The indication of the selected resource may be any suitable information for conveying the selected resource to the wireless devices 30 and 32. The wireless devices 30 and 32 then communicate via the D2D communication link using the selected resource (step 2314).

FIGS. 29 and 30 are similar to FIGS. 27 and 28 but where the process of FIG. 26 is performed by one of the wireless devices 30 and 32 for the D2D communication link. More specifically, FIG. 29 is a diagram that illustrates the operation of the wireless device 32 to perform the process of FIG. 26 according to one embodiment of the present disclosure. Note that the wireless device 30 may alternatively perform the process of FIG. 26. As an example, the wireless device 30 or 32 that is closest to the base station 26 may perform the process.

As illustrated, the wireless device 30 provides, to the base station 26, an indication of the radio distance of the wireless device 30 from the base station 26 (step 2400). The base station 26 then provides the indication of the radio distance of the wireless device 30 from the base station 26 to the wireless device 32 (step 2402). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like). In addition, the wireless device 32 measures, generates, or otherwise obtains an indication of the radio distance of the wireless device 32 from the base station 26 (step 2404).

In this example, the wireless device 32 then determines that the base station 26 is equipped with one or more interference cancellation receivers and that both the wireless device 30 and the wireless device 32 are less than the predefined threshold radio distance 36 from the base station 26 (step 2406). Notably, the wireless device 32 may obtain information from the base station 26 that indicates whether the base station 26 is equipped with one or more interference cancellation receivers. In this embodiment, wireless device 32 then determines that at least the predefined threshold amount of other wireless devices that are sufficiently near the wireless devices 30 and 32 are equipped with interference cancellation receivers (step 2408).

In response to determining that at least the predefined threshold amount of other wireless devices that are sufficiently near the wireless devices 30 and 32 are equipped with interference cancellation receivers, the wireless device 32 then selects the DL resource of the cellular communication network 24 as the resource for the D2D communication link between the wireless devices 30 and 32 (step 2410). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 2412 and 2414). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 2416).

FIG. 30 is a diagram that illustrates the operation of the wireless device 32 to perform the process of FIG. 26 according to one embodiment of the present disclosure. Note that the wireless device 30 may alternatively perform the process of FIG. 26. As an example, the wireless device 30 or 32 that is closest to the base station 26 may perform the process.

As illustrated, the wireless device 30 provides, to the base station 26, an indication of the radio distance of the wireless device 30 from the base station 26 (step 2500). The base station 26 then provides the indication of the radio distance of the wireless device 30 from the base station 26 to the wireless device 32 (step 2502). Alternatively, the wireless device 30 may provide the indication of the radio distance between the wireless device 30 and the base station 26 to the wireless device 32 via a direct communication link between the wireless devices 30 and 32 using some other communication mechanism (e.g., a Bluetooth® communication link, a direct WiFi® communication link, or the like). In addition, the wireless device 32 measures, generates, or otherwise obtains an indication of the radio distance of the wireless device 32 from the base station 26 (step 2504).

In this example, the wireless device 32 then determines that the base station 26 is equipped with one or more interference cancellation receivers and that both the wireless device 30 and the wireless device 32 are less than the predefined threshold radio distance 36 from the base station 26 (step 2506). Notably, the wireless device 32 may obtain information from the base station 26 that indicates whether the base station 26 is equipped with one or more interference cancellation receivers. In this embodiment, the wireless device 32 then determines that less than the predefined threshold amount of other wireless devices that are sufficiently near the wireless devices 30 and 32 are equipped with interference cancellation receivers (step 2508).

In response to determining that less than the predefined threshold amount of other wireless devices that are sufficiently near the wireless devices 30 and 32 are equipped with interference cancellation receivers, the wireless device 32 then selects the UL resource of the cellular communication network 24 as the resource for the D2D communication link between the wireless devices 30 and 32 (step 2510). Then, the wireless device 32 configures the D2D communication link using the selected resource by, in this embodiment, sending an indication of the selected resource for the D2D communication link to the base station 26, which in turn provides the indication of the selected resource for the D2D communication link to the wireless device 30 (steps 2512 and 2514). The indication of the selected resource may be any suitable information for conveying the selected resource to the wireless device 30. Alternatively, the wireless device 32 may provide the indication of the selected resource to the wireless device 30 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 2516).

FIG. 31 is a flow chart illustrating a process for selecting the resource for the D2D communication link between the wireless devices 30 and 32 according to one embodiment of the present disclosure. This process may be performed by the base station 26, the base station 38, one of the wireless devices 30 or 32 for the D2D communication link, or potentially some other network node in the cellular communication network 24. Notably, the process of FIG. 31 is similar to that of FIG. 26, but the process of FIG. 31 can be utilized to select the resource for the D2D communication link when the wireless devices 30 and 32 are located in the same cell or in neighboring cells.

First, the network node (i.e., the base station 26, one of the wireless devices 30 or 32, or some other network node in the cellular communication network 24) obtains an indication of a radio distance between a first wireless device for a D2D communication link a serving base station of the first wireless device, which in this embodiment is the base station that is closest to the first wireless device in terms of radio distance (step 2600). For this discussion, the first wireless device is the wireless device 30, and the serving base station of the wireless device 30 is the base station 26. In addition, the network node obtains an indication of a radio distance between a second wireless device for the D2D communication link and a serving base station of the second wireless device, which in this embodiment is the base station that is closest to the second wireless device in terms of radio distance (step 2602). For this discussion, the second wireless device is the wireless device 32, and the serving base station of the second wireless device is the base station 38.

In this embodiment, the network node determines whether the base stations 26 and 38 are equipped with one or more interference cancellation receivers (step 2604). If not, the network node proceeds in the manner described above with respect to FIG. 11. Specifically, the network node then determines whether the radio distance between the wireless device 30 and the base station 26 or the radio distance between the wireless device 32 and the base station 38 is less than the corresponding predefined threshold radio distance 36, 42 (step 2606). If the network node determines that neither the radio distance between the base station 26 and the wireless device 30 nor the radio distance between the base station 38 and the wireless device 32 is less than the corresponding predefined threshold radio distance 36, 42, then the network node selects an UL resource of the cellular communication network 24 as a corresponding resource for the D2D communication link between the wireless device 30 and the wireless device 32 (step 2608). Conversely, if the network node determines that either the radio distance between the base station 26 and the wireless device 30 or the radio distance between the base station 38 and the wireless device 32 is less than the corresponding predefined threshold radio distance 36, 42, then the network node selects a DL resource of the cellular communication network 24 as a corresponding resource for the D2D communication link between the wireless device 30 and the wireless device 32 (step 2610).

Returning to step 2604, if the network node determines that the base stations 26 and 38 are equipped with one or more interference cancellation receivers, the network node then determines whether both the radio distance between the wireless device 30 and the base station 26 and the radio distance between the wireless device 32 and the base station 38 are less than the corresponding predefined threshold radio distances 36 and 42 (step 2612). If not, the network node selects the UL resource of the cellular communication network 24 as the corresponding resource for the D2D communication link between the wireless device 30 and the wireless device 32 (step 2614).

In this embodiment, if the network node determines both the radio distance between the base station 26 and the wireless device 30 and the radio distance between the base station 38 and the wireless device 32 are less than the corresponding predefined threshold radio distances 36 and 42, the network node determines whether at least a predefined threshold amount of other wireless devices that are sufficiently near the wireless devices 30 and 32 are equipped with one or more interference cancellation receivers (step 2616). In one embodiment, the threshold amount of any other wireless devices is a majority of the other nearby wireless devices that are sufficiently near the wireless devices 30 and 32. The predefined threshold amount may be, for example, a predefined percentage in the range of and including 0% to 100%, a predefined percentage greater than 50%, a predefined percentage greater than 67%, or a predefined percentage greater than 75%. Here, other wireless devices that are "sufficiently near" the wireless devices 30 and 32 are other wireless devices that are within a predefined radio distance from either of the wireless devices 30 and 32.

If less than the threshold amount of the other wireless devices that are sufficiently near the wireless devices 30 and 32 are equipped with interference cancellation receiver(s), the network node selects the UL resource of the cellular communication network 24 as the corresponding resource for the D2D communication link between the wireless device 30 and the wireless device 32 (step 2618). In this manner, the downlinks to nearby wireless devices that are not equipped with interference cancellation receivers are protected. However, if at least the threshold amount of the other wireless devices that are sufficiently near the wireless devices 30 and 32 are equipped with interference cancellation receiver(s), the network node selects the DL resource of the cellular communication network 24 as the corresponding resource for the D2D communication link between the wireless device 30 and the wireless device 32 (step 2620). Again, the DL resource of the cellular communication network 24 is preferably the same DL resource used by the wireless device 34 located in the cell 28.

Lastly, whether proceeding from step 2608, 2610, 2614, 2618, or 2620, the D2D communication link between the wireless device 30 and the wireless device 32 is configured using the selected resource (step 2622). The process then returns to step 2600 and is repeated. In this manner, the resource used for the D2D communication link is dynamically configured. Thus, if the wireless device 30 and/or the wireless device 32 move such that the decision in step 2604, 2606, 2612, or 2616 changes, the resource selected for the D2D communication link also changes.

FIGS. 32 and 33 illustrate embodiments where the base station 26 performs the process of FIG. 31. However, the base station 38 may alternatively perform the process of FIG. 31. More specifically, FIG. 32 is a diagram that illustrates the operation of the base station 26 to perform the process of FIG. 31 according to one embodiment of the present disclosure. As illustrated, the wireless device 30 provides, to the base station 26, an indication of the radio distance of the wireless device 30 from the base station 26 (step 2700). Likewise, the wireless device 32 provides, to the base station 38, an indication of the radio distance of the wireless device 32 from the base station 38 (step 2702). The base station 38 then sends the indication of the radio distance between the wireless device 32 and the base station 38 to the base station 26 (step 2704). Notably, the base stations 26 and 38 are connected via a wired or wireless interface. For example, for LTE, the X2 interface may be used for communication between the base stations 26 and 38.

In this example, the base station 26 then determines that the base stations 26 and 38 are equipped with interference cancellation receivers and that both the radio distance for the wireless device 30 and the radio distance for the wireless device 32 are less than the corresponding predefined threshold radio distances 36 and 42 (step 2706). Notably, the base station 26 may receive information from the base station 38 or some other node in the cellular communication network 24 that indicates whether the base station 38 is equipped with an interference cancellation receiver. This information may be received as part of step 2706 or sometime before step 2706.

The base station 26 then determines that at least the predefined threshold number of other wireless devices that are sufficiently near the wireless devices 30 and 32 are equipped with interference cancellation receivers (step 2708). Using LTE as an example, base stations operating according to LTE Release 11 and onward know whether wireless devices in their cells are equipped with interference cancellation receivers. Thus, for LTE Release 11 and onward, the base station 26 knows whether other wireless devices that are served by base station 26 and near the wireless device 30 are equipped with interference cancellation receivers. Further, the base station 26 can obtain information that indicates whether the other wireless devices that are served by the base station 38 and near the wireless device 32 are equipped with interference cancellation receivers from the base station 38 using appropriate signaling. More generally, in one embodiment, the base station 26 may obtain information indicative of whether wireless devices that are sufficiently near the wireless devices 30 and 32 are equipped with interference cancellation receivers using appropriate signaling. However, other mechanisms may be used to obtain this information.

In response to determining that at least the predefined threshold number of other wireless devices that are sufficiently near the wireless devices 30 and 32 are equipped with interference cancellation receivers, the base station 26 selects the DL resource of the cellular communication network 24 as the resource for the D2D communication link between the wireless devices 30 and 32 (step 2710). Then, the base station 26 configures the D2D communication link using the selected resource by, in this embodiment, sending an indication of the selected resource for the D2D communication link to the wireless device 30 (step 2712) and sending the indication of the selected resource for the D2D communication link to the base station 38 (step 2714), which in turn sends the indication of the selected resource for the D2D communication link to the wireless device 32 (step 2716). The indication of the selected resource may be any suitable information for conveying the selected resource to the wireless devices 30 and 32. The wireless devices 30 and 32 then communicate via the D2D communication link using the selected resource (step 2718).

FIG. 33 is a diagram that illustrates the operation of the base station 26 to perform the process of FIG. 31 according to one embodiment of the present disclosure. As illustrated, the wireless device 30 provides, to the base station 26, an indication of the radio distance of the wireless device 30 from the base station 26 (step 2800). Likewise, the wireless device 32 provides, to the base station 38, an indication of the radio distance of the wireless device 32 from the base station 38 (step 2802). The base station 38 then sends the indication of the radio distance between the wireless device 32 and the base station 38 to the base station 26 (step 2804). Notably, the base stations 26 and 38 are connected via a wired or wireless interface. For example, for LTE, the X2 interface may be used for communication between the base stations 26 and 38.

In this example, the base station 26 then determines that the base stations 26 and 38 are equipped with interference cancellation receivers and that both the radio distance for the wireless device 30 and the radio distance for the wireless device 32 are less than the corresponding predefined threshold radio distances 36 and 42 (step 2806). In this embodiment, the base station 26 then determines that less than the predefined threshold amount of other wireless devices that are sufficiently near the wireless devices 30 and 32 are equipped with interference cancellation receivers (step 2808). In response to determining that less than the predefined threshold number of other wireless devices that are sufficiently near the wireless devices 30 and 32 are equipped with interference cancellation receivers, the base station 26 selects the UL resource of the cellular communication network 24 as the resource for the D2D communication link between the wireless devices 30 and 32 (step 2810). Then, the base station 26 configures the D2D communication link using the selected resource by, in this embodiment, sending an indication of the selected resource for the D2D communication link to both the wireless device 30 and the base station 38 (steps 2812 and 2814). The base station 38 then sends the indication of the selected resource for the D2D communication link to the wireless device 32 (step 2816). The indication of the selected resource may be any suitable information for conveying the selected resource to the wireless devices 30 and 32. The wireless devices 30 and 32 then communicate via the D2D communication link using the selected resource (step 2818).

FIGS. 34 and 35 are similar to FIGS. 32 and 33 but where the process of FIG. 31 is performed by one of the wireless devices 30 and 32 for the D2D communication link. In one particular embodiment, the process of FIG. 31 is performed by the wireless device 30 or 32 that is closest to its serving base station 26 or 38. More specifically, FIG. 34 is a diagram that illustrates the operation of the wireless device 30 to perform the process of FIG. 31 according to one embodiment of the present disclosure. Note that the wireless device 32 may alternatively perform the process of FIG. 31.

As illustrated, the wireless device 32 provides, to the base station 38, an indication of the radio distance of the wireless device 32 from the base station 38 (step 2900). The base station 38 then provides the indication of the radio distance of the wireless device 32 from the base station 38 to the base station 26 (step 2902), which in turn sends the indication of the radio distance of the wireless device 32 from the base station 38 to the wireless device 30 (step 2904). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like). In addition, the wireless device 30 measures, generates, or otherwise obtains an indication of the radio distance of the wireless device 30 from the base station 26 (step 2906).

In this example, the wireless device 30 then determines that the base stations 26 and 38 are equipped with interference cancellation receivers and that both the radio distance between the wireless device 30 and the base station 26 and the radio distance between the wireless device 32 and the base station 38 are less than the corresponding predefined threshold radio distances 36 and 42 (step 2908). In one embodiment, the wireless device 30 obtains information that indicates whether the base stations 26 and 38 are equipped with interference cancellation receivers from the base station 26, from the base stations 26 and 38, or from some other network node.

The wireless device 30 then determines that at least the predefined threshold amount of other wireless devices that are sufficiently near the wireless devices 30 and 32 are equipped with interference cancellation receivers (step 2910). Using LTE as an example, base stations operating according to LTE Release 11 and onward know whether wireless devices in their cells are equipped with interference cancellation receivers. Thus, for LTE Release 11 and onward, the base station 26 knows whether other wireless devices that are served by base station 26 and near the wireless device 30 are equipped with interference cancellation receivers. Further, the base station 26 can obtain information that indicates whether the other wireless devices that are served by the base station 38 and near the wireless device 32 are equipped with interference cancellation receivers from the base station 38 using appropriate signaling. The base station 26 may then provide this information to the wireless device 30 using appropriate signaling. More generally, in one embodiment, the wireless device 30 may obtain information indicative of whether wireless devices that are sufficiently near the wireless devices 30 and 32 are equipped with interference cancellation receivers using appropriate signaling. However, other mechanisms may be used to obtain this information. For example, the wireless devices 30 and 32 may gather this information directly from nearby wireless devices using direct wireless communication between the wireless devices 30 and 32 and the nearby wireless devices (e.g., Bluetooth® communication links, direct WiFi® communication links, or the like).

In response to determining that at least the predefined threshold amount of other wireless devices that are sufficiently near the wireless devices 30 and 32 are equipped with interference cancellation receivers, the wireless device 30 selects the DL resource of the cellular communication network 24 as the resource for the D2D communication link between the wireless devices 30 and 32 (step 2912). Then, the wireless device 30 configures the D2D communication link using the selected resource by, in this embodiment, sending an indication of the selected resource for the D2D communication link to the base station 26 (step 2914). The base station 26 then sends the indication of the selected resource for the D2D communication link to the base station 38, which in turn sends the indication of the selected resource for the D2D communication link to the wireless device 32 (steps 2916 and 2918). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 2920).

FIG. 35 is a diagram that illustrates the operation of the wireless device 30 to perform the process of FIG. 31 according to one embodiment of the present disclosure. Note that the wireless device 32 may alternatively perform the process of FIG. 31. As illustrated, the wireless device 32 provides, to the base station 38, an indication of the radio distance of the wireless device 32 from the base station 38 (step 3000). The base station 38 then provides the indication of the radio distance of the wireless device 32 from the base station 38 to the base station 26 (step 3002), which in turn sends the indication of the radio distance of the wireless device 32 from the base station 38 to the wireless device 30 (step 3004). Alternatively, the wireless device 32 may provide the indication of the radio distance between the wireless device 32 and the base station 38 to the wireless device 30 via a direct communication link between the wireless devices 30 and 32 using some other communication mechanism (e.g., a Bluetooth® communication link, a direct WiFi® communication link, or the like). In addition, the wireless device 30 measures, generates, or otherwise obtains an indication of the radio distance of the wireless device 30 from the base station 26 (step 3006).

In this example, the wireless device 30 then determines that the base stations 26 and 28 are equipped with interference cancellation receivers and that at least one of the radio distance between the wireless device 30 and the base station 26 and the radio distance between the wireless device 32 and the base station 38 is greater than the corresponding predefined threshold radio distance 36, 42 (step 3008). In this embodiment, the wireless device 30 then determines that less than the predefined threshold amount of other wireless devices that are sufficiently near the wireless devices 30 and 32 are equipped with interference cancellation receivers (step 3010).

In response to determining that less than the predefined threshold number of other wireless devices that are sufficiently near the wireless devices 30 and 32 are equipped with interference cancellation receivers, the wireless device 30 selects the UL resource of the cellular communication network 24 as the resource for the D2D communication link between the wireless devices 30 and 32 (step 3012). Then, the wireless device 30 configures the D2D communication link using the selected resource by, in this embodiment, sending an indication of the selected resource for the D2D communication link to the base station 26 (step 3014). The base station 26 then sends the indication of the selected resource for the D2D communication link to the base station 38, which in turn sends the indication of the selected resource for the D2D communication link to the wireless device 32 (steps 3016 and 3018). The indication of the selected resource may be any suitable information for conveying the selected resource to the wireless device 32. Alternatively, the wireless device 30 may provide the indication of the selected resource to the wireless device 32 via a direct communication link between the wireless devices 30 and 32 using some other communication mechanism (e.g., a Bluetooth® communication link, a direct WiFi® communication link, or the like). The wireless devices 30 and 32 then communicate via the D2D communication link using the selected resource (step 3020).

FIG. 36 is a block diagram of one example of a base station 44 according to one embodiment of the present disclosure. The base station 44 may be the base station 26 or the base station 38 discussed above. The base station 44 includes one or more transceiver sub-systems 46 and a processing sub-system 48. At least one of the transceiver sub-systems 46 generally includes analog and, in some embodiments, digital components for wirelessly sending and receiving messages to and from wireless devices in the cellular communication network 24. In particular embodiments, the transceiver sub-systems 46 may represent or include radio-frequency (RF) transceivers, or separate RF transmitters and receivers, capable of transmitting such messages and/or other suitable information wirelessly to wireless devices such as the wireless devices 30, 32, and 34.

The processing sub-system 48 is implemented in hardware or a combination of hardware and software. In general, the processing sub-system 48 operates to communicate with the wireless devices 30 and 32 and potentially other base stations via the transceiver sub-system(s) 46 to perform the D2D resource selection process described herein. Specifically, the processing sub-system 48 operates to, in some embodiments, obtain information indicating the radio distances of the wireless devices 30 and 32 from their closest base stations and select either the UL resource or the DL resource of the cellular communication network 24 as the resource for the D2D communication link between the wireless devices 30 and 32 based thereon.

In particular embodiments, the processing sub-system 48 may comprise, for example, one or several general-purpose or special-purpose microprocessors or other microcontrollers programmed with suitable software and/or firmware to carry out some or all of the functionality of the base station 26 or 38 described herein. In addition or alternatively, the processing sub-system 48 may comprise various digital hardware blocks (e.g., one or more Application Specific Integrated Circuits (ASICs), one or more off-the-shelf digital and analog hardware components, or a combination thereof) configured to carry out some or all of the functionality of the base station 26 or 38 described herein. Additionally, in particular embodiments, the above described functionality of base station 26 or 38 may be implemented, in whole or in part, by the processing sub-system 48 executing software or other instructions stored on a non-transitory computer-readable medium, such as random access memory (RAM), read only memory (ROM), a magnetic storage device, an optical storage device, or any other suitable type of data storage components.

FIG. 37 is a block diagram of one example of a wireless device 50 according to one embodiment of the present disclosure. The wireless device 50 may be the wireless device 30 or 32 discussed above. The wireless device 50 includes one or more transceiver sub-systems 52 and a processing sub-system 54. At least one of the transceiver sub-systems 52 generally includes analog and, in some embodiments, digital components for wirelessly sending and receiving messages to and from base stations or other wireless devices in the cellular communication network 24. In particular embodiments, the transceiver sub-systems 52 may represent or include RF transceivers, or separate RF transmitters and receivers, capable of transmitting such messages and/or other suitable information wirelessly to base stations or other wireless devices.

The processing sub-system 54 is implemented in hardware or a combination of hardware and software. In general, the processing sub-system 54 operates to communicate with the base station(s) 26, 38 via the transceiver sub-system 52 to perform the D2D resource selection process described herein. Specifically, the processing sub-system 54 operates to determine information indicating the radio distance of the wireless devices 50 from its closest base station and, in some embodiments, select either the UL resource or the DL resource of the cellular communication network 24 as the resource for the D2D communication link between the wireless device 50 and another wireless device.

In particular embodiments, the processing sub-system 54 may comprise, for example, one or several general-purpose or special-purpose microprocessors or other microcontrollers programmed with suitable software and/or firmware to carry out some or all of the functionality of the wireless device 30 or 32 described herein. In addition or alternatively, the processing sub-system 54 may comprise various digital hardware blocks (e.g., one or more ASICs, one or more off-the-shelf digital and analog hardware components, or a combination thereof) configured to carry out some or all of the functionality of the wireless device 30 or 32 described herein. Additionally, in particular embodiments, the above described functionality of the wireless devices 30 or 32 may be implemented, in whole or in part, by the processing sub-system 54 executing software or other instructions stored on a non-transitory computer-readable medium, such as RAM, ROM, a magnetic storage device, an optical storage device, or any other suitable type of data storage components.

The following acronyms are used throughout this disclosure.

ASIC Application Specific Integrated Circuit
CSI Channel State Information
CQI Channel Quality Index
D2D Device to Device DL Downlink
eNB eNodeB
FDD Frequency Division Duplex
LTE Long Term Evolution
OFDM Orthogonal Frequency Division Multiplexing
RAM Random Access Memory
RF Radio Frequency
ROM Read Only Memory
RSRP Reference Signal Received Power
RSRQ Reference Signal Received Quality
RSSI Received Signal Strength Indicator
TDD Time Division Duplex
WD Wireless Device
UL Uplink
UL SRS Uplink Sounding Reference Signal Those skilled in the art will recognize improvements and modifications to the preferred embodiments of the present disclosure. All such improvements and modifications are considered within the scope of the concepts disclosed herein and the claims that follow.

What is claimed is:

1. A network node configured to select resources for a direct device to device communication link between a first wireless device and a second wireless device in a cellular communication network, comprising:
   a transceiver sub-system configured to enable wireless communication; and
   a processing sub-system associated with the transceiver sub-system configured to:
      select a downlink resource of the cellular communication network as a resource for the direct device to device communication link between the first wireless device and the second wireless device if a base station serving the first wireless device and a base station serving the second wireless device are equipped with an interference cancellation receiver and both a radio distance between the first wireless device and the base station serving the first wireless device and a radio distance between the second wireless device and the base station serving the second wireless device are less than a predefined threshold radio distance; and
      select an uplink resource of the cellular communication network as the resource for the direct device to device communication link between the first wireless device and the second wireless device if the base station serving the first wireless device and the base station serving the second wireless device are equipped with an interference cancellation receiver and at least one of the radio distance between the first wireless device and the base station serving the first wireless device and the radio distance between the second wireless device and the base station serving the second wireless device is greater than the predefined threshold radio distance.

2. The network node of claim 1 wherein the processing sub-system is configured to select the downlink resource of the cellular communication network as the resource for the direct device to device communication link between the first wireless device and the second wireless device if:
   the base station serving the first wireless device and the base station serving the second wireless device are equipped with an interference cancellation receiver;
   both the radio distance between the first wireless device and the base station serving the first wireless device and the radio distance between the second wireless device and the base station serving the second wireless device are less than the predefined threshold radio distance; and
   at least a predefined threshold amount of other wireless devices that are near the first and second wireless devices are equipped with an interference cancellation receiver.

3. The network node of claim 1 wherein the base station serving the first wireless device and the base station serving the second wireless device are the same base station in the cellular communication network.

4. The network node of claim 3 wherein the processing sub-system is further configured to:
   obtain information that is indicative of the radio distance between the first wireless device and the base station serving the first and second wireless devices;
   obtain information that is indicative of the radio distance between the second wireless device and the base station serving the first and second wireless devices;
   determine that the base station serving the first and second wireless devices is equipped with one or more interference cancellation receivers;
   determine that both the radio distance between the first wireless device and the base station serving the first and second wireless devices and the radio distance between the second wireless device and the base station serving the first and second wireless devices are less than the predefined threshold radio distance; and
   select the downlink resource of the cellular communication network as the resource for the direct device to device communication link between the first wireless device and the second wireless device in response to determining that the base station serving the first and second wireless devices is equipped with one or more interference cancellation receivers and determining that both the radio distance between the first wireless device and the base station serving the first and second wireless devices and the radio distance between the second wireless device and the base station serving the first and second wireless devices are less than the predefined threshold radio distance.

5. The network node of claim 3 wherein the processing sub-system is further configured to:
   obtain information that is indicative of the radio distance between the first wireless device and the base station serving the first and second wireless devices;
   obtain information that is indicative of the radio distance between the second wireless device and the base station serving the first and second wireless devices;
   determine that the base station serving the first and second wireless devices is equipped with one or more interference cancellation receivers;
   determine that at least one of the radio distance between the first wireless device and the base station serving the first and second wireless devices and the radio distance between the second wireless device and the base station serving the first and second wireless devices is greater than the predefined threshold radio distance; and
   select the uplink resource of the cellular communication network as the resource for the direct device to device communication link between the first wireless device and the second wireless device in response to determining that the base station serving the first and second wireless devices is equipped with one or more interference cancellation receivers and determining that at least one of the radio distance between the first wireless device and the base station serving the first and second wireless devices and the radio distance between the second wireless device and the base station serving the first and second wireless devices is greater than the predefined threshold radio distance.

6. The network node of claim 3 wherein the processing sub-system is further configured to:
   obtain information that is indicative of the radio distance between the first wireless device and the base station serving the first and second wireless devices;
   obtain information that is indicative of the radio distance between the second wireless device and the base station serving the first and second wireless devices;
   determine that the base station serving the first and second wireless devices is not equipped with one or more interference cancellation receivers;
   determine that at least one of the radio distance between the first wireless device and the base station serving the first and second wireless devices and the radio distance between the second wireless device and the base station serving the first and second wireless devices is less than the predefined threshold radio distance; and
   select the downlink resource of the cellular communication network as the resource for the direct device to device communication link between the first wireless device and the second wireless device in response to determining that the base station serving the first and second wireless devices is not equipped with one or more interference cancellation receivers and determining that at least one of the radio distance between the first wireless device and the base station serving the first and second wireless devices and the radio distance between the second wireless device and the base station serving the first and second wireless devices is less than the predefined threshold radio distance.

7. The network node of claim 3 wherein the processing sub-system is further configured to:
   obtain information that is indicative of the radio distance between the first wireless device and the base station serving the first and second wireless devices;
   obtain information that is indicative of the radio distance between the second wireless device and the base station serving the first and second wireless devices;
   determine that the base station serving the first and second wireless devices is not equipped with one or more interference cancellation receivers;
   determine that neither of the radio distance between the first wireless device and the base station serving the first and second wireless devices and the radio distance between the second wireless device and the base station serving the first and second wireless devices is less than the predefined threshold radio distance; and
   select the uplink resource of the cellular communication network as the resource for the direct device to device communication link between the first wireless device and the second wireless device in response to determining that the base station serving the first and second wireless devices is not equipped with one or more interference cancellation receivers and determining that neither of the radio distance between the first wireless device and the base station serving the first and second wireless devices and the radio distance between the second wireless device and the base station serving the first and second wireless devices is less than the predefined threshold radio distance.

8. The network node of claim 3 wherein the processing sub-system is further configured to:
   obtain information that is indicative of the radio distance between the first wireless device and the base station serving the first and second wireless devices;
   obtain information that is indicative of the radio distance between the second wireless device and the base station serving the first and second wireless devices;
   determine that the base station serving the first and second wireless devices is equipped with one or more interference cancellation receivers;
   determine that both the radio distance between the first wireless device and the base station serving the first and second wireless devices and the radio distance between the second wireless device and the base station serving the first and second wireless devices are less than the predefined threshold radio distance;
   determine that at least a predefined threshold amount of other wireless devices that are near the first and second wireless devices are equipped with an interference cancellation receiver; and
   select the downlink resource of the cellular communication network as the resource for the direct device to device communication link between the first wireless device and the second wireless device in response to determining that the base station serving the first and second wireless devices is equipped with one or more interference cancellation receivers, determining that both the radio distance between the first wireless device and the base station serving the first and second wireless devices and the radio distance between the second wireless device and the base station serving the first and second wireless devices are less than the predefined threshold radio distance, and determining that at least a predefined threshold amount of other wireless devices that are near the first and second wireless devices are equipped with an interference cancellation receiver.

9. The network node of claim 3 wherein the processing sub-system is further configured to:
   obtain information that is indicative of the radio distance between the first wireless device and the base station serving the first and second wireless devices;
   obtain information that is indicative of the radio distance between the second wireless device and the base station serving the first and second wireless devices;
   determine that the base station serving the first and second wireless devices is equipped with one or more interference cancellation receivers;
   determine that both the radio distance between the first wireless device and the base station serving the first and second wireless devices and the radio distance between the second wireless device and the base station serving the first and second wireless devices are less than the predefined threshold radio distance;
   determine that at least a predefined threshold amount of other wireless devices that are near the first and second wireless devices are not equipped with an interference cancellation receiver; and
   select the uplink resource of the cellular communication network as the resource for the direct device to device communication link between the first wireless device and the second wireless device in response to determining that the base station serving the first and second wireless devices is equipped with one or more interference cancellation receivers, determining that both the radio distance between the first wireless device and the base station serving the first and second wireless devices and the radio distance between the second wireless device and the base station serving the first and second wireless devices are less than the predefined threshold radio distance, and determining that at least a predefined threshold amount of other wireless devices that are near the first and second wireless devices are not equipped with an interference cancellation receiver.

10. The network node of claim 3 wherein the processing sub-system is further configured to:
obtain information that is indicative of the radio distance between the first wireless device and the base station serving the first and second wireless devices;
obtain information that is indicative of the radio distance between the second wireless device and the base station serving the first and second wireless devices;
determine that the base station serving the first and second wireless devices is equipped with one or more interference cancellation receivers;
determine that at least one of the radio distance between the first wireless device and the base station serving the first and second wireless devices and the radio distance between the second wireless device and the base station serving the first and second wireless devices is greater than the predefined threshold radio distance; and
select the uplink resource of the cellular communication network as the resource for the direct device to device communication link between the first wireless device and the second wireless device in response to determining that the base station serving the first and second wireless devices is equipped with one or more interference cancellation receivers and determining that at least one of the radio distance between the first wireless device and the base station serving the first and second wireless devices and the radio distance between the second wireless device and the base station serving the first and second wireless devices is greater than the predefined threshold radio distance.

11. The network node of claim 3 wherein the processing sub-system is further configured to:
obtain information that is indicative of the radio distance between the first wireless device and the base station serving the first and second wireless devices;
obtain information that is indicative of the radio distance between the second wireless device and the base station serving the first and second wireless devices;
determine that the base station serving the first and second wireless devices is not equipped with one or more interference cancellation receivers;
determine that at least one of the radio distance between the first wireless device and the base station serving the first and second wireless devices and the radio distance between the second wireless device and the base station serving the first and second wireless devices is less than the predefined threshold radio distance; and
select the downlink resource of the cellular communication network as the resource for the direct device to device communication link between the first wireless device and the second wireless device in response to determining that the base station serving the first and second wireless devices is not equipped with one or more interference cancellation receivers and determining that at least one of the radio distance between the first wireless device and the base station serving the first and second wireless devices and the radio distance between the second wireless device and the base station serving the first and second wireless devices is less than the predefined threshold radio distance.

12. The network node of claim 3 wherein the processing sub-system is further configured to:
obtain information that is indicative of the radio distance between the first wireless device and the base station serving the first and second wireless devices;
obtain information that is indicative of the radio distance between the second wireless device and the base station serving the first and second wireless devices;
determine that the base station serving the first and second wireless devices is not equipped with one or more interference cancellation receivers;
determine that neither of the radio distance between the first wireless device and the base station serving the first and second wireless devices and the radio distance between the second wireless device and the base station serving the first and second wireless devices is less than the predefined threshold radio distance; and
select the uplink resource of the cellular communication network as the resource for the direct device to device communication link between the first wireless device and the second wireless device in response to determining that the base station serving the first and second wireless devices is not equipped with one or more interference cancellation receivers and determining that neither of the radio distance between the first wireless device and the base station serving the first and second wireless devices and the radio distance between the second wireless device and the base station serving the first and second wireless devices is less than the predefined threshold radio distance.

13. The network node of claim 1 wherein the base station serving the first wireless device and the base station serving the second wireless device are neighboring base stations in the cellular communication network.

14. The network node of claim 13 wherein the processing sub-system is further configured to:
obtain information that is indicative of the radio distance between the first wireless device and the base station serving the first wireless device;
obtain information that is indicative of the radio distance between the second wireless device and the base station serving the second wireless device;
determine that the base station serving the first wireless device and the base station serving the second wireless device are equipped with one or more interference cancellation receivers;
determine that both the radio distance between the first wireless device and the base station serving the first wireless device and the radio distance between the second wireless device and the base station serving the second wireless device are less than the predefined threshold radio distance; and
select the downlink resource of the cellular communication network as the resource for the direct device to device communication link between the first wireless device and the second wireless device in response to determining that the base station serving the first wireless device and the base station serving the second wireless device are equipped with one or more interference cancellation receivers and that both the radio distance between the first wireless device and the base station serving the first wireless device and the radio distance between the second wireless device and the base station serving the second wireless device are less than the predefined threshold radio distance.

15. The network node of claim 13 wherein the processing sub-system is further configured to:
obtain information that is indicative of the radio distance between the first wireless device and the base station serving the first wireless device;

obtain information that is indicative of the radio distance between the second wireless device and the base station serving the second wireless device;

determine that the base station serving the first wireless device and the base station serving the second wireless device are equipped with one or more interference cancellation receivers;

determine that at least one of the radio distance between the first wireless device and the base station serving the first wireless device and the radio distance between the second wireless device and the base station serving the second wireless device is greater than the predefined threshold radio distance; and select the uplink resource of the cellular communication network as the resource for the direct device to device communication link between the first wireless device and the second wireless device in response to determining that the base station serving the first wireless device and the base station serving the second wireless device are equipped with one or more interference cancellation receivers and that at least one of the radio distance between the first wireless device and the base station serving the first wireless device and the radio distance between the second wireless device and the base station serving the second wireless device is greater than the predefined threshold radio distance.

16. The network node of claim 13 wherein the processing sub-system is further configured to:

obtain information that is indicative of the radio distance between the first wireless device and the base station serving the first wireless device;

obtain information that is indicative of the radio distance between the second wireless device and the base station serving the second wireless device;

determine that at least one of the base station serving the first wireless device and the base station serving the second wireless device is not equipped with one or more interference cancellation receivers;

determine that at least one of the radio distance between the first wireless device and the base station serving first wireless device and the radio distance between the second wireless device and the base station serving the second wireless device is less than the predefined threshold radio distance; and select the downlink resource of the cellular communication network as the resource for the direct device to device communication link between the first wireless device and the second wireless device in response to determining that at least one of the base station serving the first wireless device and the base station serving the second wireless device is not equipped with one or more interference cancellation receivers and that at least one of the radio distance between the first wireless device and the base station serving the first wireless device and the radio distance between the second wireless device and the base station serving the second wireless device is less than the predefined threshold radio distance.

17. The network node of claim 13 wherein the processing sub-system is further configured to:

obtain information that is indicative of the radio distance between the first wireless device and the base station serving the first wireless device;

obtain information that is indicative of the radio distance between the second wireless device and the base station serving the second wireless device;

determine that at least one of the base station the first wireless device and the base station the second wireless device is not equipped with one or more interference cancellation receivers;

determine that neither of the radio distance between the first wireless device and the base station the first wireless device and the radio distance between the second wireless device and the base station the second wireless device is less than the predefined threshold radio distance; and select the uplink resource of the cellular communication network as the resource for the direct device to device communication link between the first wireless device and the second wireless device in response to determining that at least one of the base station the first wireless device and the base station serving the second wireless device is not equipped with one or more interference cancellation receivers and determine that neither of the radio distance between the first wireless device and the base station serving the first wireless device and the radio distance between the second wireless device and the base station serving the second wireless device is less than the predefined threshold radio distance.

18. The network node of claim 13 wherein the processing sub-system is further configured to:

obtain information that is indicative of the radio distance between the first wireless device and the base station serving the first wireless device;

obtain information that is indicative of the radio distance between the second wireless device and the base station serving the second wireless device;

determine that the base station serving the first wireless device and the base station serving the second wireless device are equipped with one or more interference cancellation receivers;

determine that both the radio distance between the first wireless device and the base station serving the first wireless device and the radio distance between the second wireless device and the base station serving the second wireless device are less than the predefined threshold radio distance;

determine that at least a predefined threshold amount of other wireless devices that are near the first and second wireless devices are equipped with an interference cancellation receiver; and select the downlink resource of the cellular communication network as the resource for the direct device to device communication link between the first wireless device and the second wireless device in response to determining that the base station serving the first wireless device and the base station serving the second wireless device are equipped with one or more interference cancellation receivers, that both the radio distance between the first wireless device and the base station serving the first wireless device and the radio distance between the second wireless device and the base station serving the second wireless device are less than the predefined threshold radio distance, and that at least a predefined threshold amount of other wireless devices that are near the first and second wireless devices are equipped with an interference cancellation receiver.

19. The network node of claim 13 wherein the processing sub-system is further configured to:

obtain information that is indicative of the radio distance between the first wireless device and the base station serving the first wireless device;

obtain information that is indicative of the radio distance between the second wireless device and the base station serving the second wireless device;

determine that the base station serving the first wireless device and the base station serving the second wireless device are equipped with one or more interference cancellation receivers;

determine that both the radio distance between the first wireless device and the base station serving the first wireless device and the radio distance between the second wireless device and the base station serving the second wireless device are less than the predefined threshold radio distance;

determine that at least a predefined threshold amount of other wireless devices that are near the first and second wireless devices are not equipped with an interference cancellation receiver; and select the uplink resource of the cellular communication network as the resource for the direct device to device communication link between the first wireless device and the second wireless device in response to determining that the base station serving the first wireless device and the base station serving the second wireless device are equipped with one or more interference cancellation receivers, that both the radio distance between the first wireless device and the base station serving the first wireless device and the radio distance between the second wireless device and the base station serving the second wireless device are less than the predefined threshold radio distance, and that at least a predefined threshold amount of other wireless devices that are near the first and second wireless devices are not equipped with an interference cancellation receiver.

20. The network node of claim 13 wherein the processing sub-system is further configured to:

obtain information that is indicative of the radio distance between the first wireless device and the base station serving the first wireless device;

obtain information that is indicative of the radio distance between the second wireless device and the base station serving the second wireless device;

determine that the base station serving the first wireless device and the base station serving the second wireless device are equipped with one or more interference cancellation receivers;

determine that at least one of the radio distance between the first wireless device and the base station serving the first wireless device and the radio distance between the second wireless device and the base station serving the second wireless devices is greater than the predefined threshold radio distance; and select the uplink resource of the cellular communication network as the resource for the direct device to device communication link between the first wireless device and the second wireless device in response to determining that the base station serving the first wireless device and the base station serving the second wireless device are equipped with one or more interference cancellation receivers and that at least one of the radio distance between the first wireless device and the base station serving the first wireless device and the radio distance between the second wireless device and the base station serving the second wireless devices is greater than the predefined threshold radio distance.

21. The network node of claim 13 wherein the processing sub-system is further configured to:

obtain information that is indicative of the radio distance between the first wireless device and the base station serving the first wireless device;

obtain information that is indicative of the radio distance between the second wireless device and the base station serving the second wireless device;

determine that at least one of the base station serving the first wireless device and the base station serving the second wireless device is not equipped with one or more interference cancellation receivers;

determine that at least one of the radio distance between the first wireless device and the base station serving the first wireless device and the radio distance between the second wireless device and the base station serving the second wireless device is less than the predefined threshold radio distance; and select the downlink resource of the cellular communication network as the resource for the direct device to device communication link between the first wireless device and the second wireless device in response to determining that at least one of the base station serving the first wireless device and the base station serving the second wireless device is not equipped with one or more interference cancellation receivers and that at least one of the radio distance between the first wireless device and the base station serving the first wireless device and the radio distance between the second wireless device and the base station serving the second wireless device is less than the predefined threshold radio distance.

22. The network node of claim 13 wherein the processing sub-system is further configured to:

obtain information that is indicative of the radio distance between the first wireless device and the base station serving the first wireless device;

obtain information that is indicative of the radio distance between the second wireless device and the base station serving the second wireless device;

determine that at least one of the base station serving the first wireless device and the base station serving the second wireless device is not equipped with one or more interference cancellation receivers;

determine that neither of the radio distance between the first wireless device and the base station serving the first wireless device and the radio distance between the second wireless device and the base station serving the second wireless device is less than the predefined threshold radio distance; and select the uplink resource of the cellular communication network as the resource for the direct device to device communication link between the first wireless device and the second wireless device in response to determining that at least one of the base station serving the first wireless device and the base station serving the second wireless device is not equipped with one or more interference cancellation receivers and that neither of the radio distance between the first wireless device and the base station serving the first wireless device and the radio distance between the second wireless device and the base station serving the second wireless device is less than the predefined threshold radio distance.

23. The network node of claim 1 wherein the network node is the base station serving the first wireless device and the base station serving the second wireless device.

24. The network node of claim 1 wherein the network node is one of a group consisting of the first wireless device and the second wireless device.

25. The network node of claim 1 wherein the processing sub-system is further configured to dynamically update the resource selected for the direct device to device communication link.

26. The network node of claim 1 wherein the resource selected for the direct device to device communication link is a frequency band.

27. The network node of claim 1 wherein the resource selected for the direct device to device communication link is one or more time slots in a frequency band.

28. The network node of claim 1 wherein:
the radio distance between the first wireless device and the base station serving the first wireless device is represented by one of a group consisting of: an RSRP value, an RSRQ value, a CQI value, an RSSI value, and a CSI value; and
the radio distance between the second wireless device and the base station serving the second wireless device is represented by one of a group consisting of: an RSRP value, an RSRQ value, a CQI value, an RSSI value, and a CSI value.

29. The network node of claim 1 wherein:
the radio distance between the first wireless device and the base station serving the first wireless device is represented by a combination of two or more of a group consisting of: an RSRP value, an RSRQ value, a CQI value, an RSSI value, and a CSI value; and
the radio distance between the second wireless device and the base station serving the second wireless device is represented by a combination of two or more of a group consisting of: an RSRP value, an RSRQ value, a CQI value, an RSSI value, and a CSI value.

30. A method of operation of a network node to select resources for a direct device to device communication link between a first wireless device and a second wireless device in a cellular communication network, comprising:
selecting a downlink resource of the cellular communication network as a resource for the direct device to device communication link between the first wireless device and the second wireless device if a base station serving the first wireless device and a base station serving the second wireless device are equipped with an interference cancellation receiver and both of a radio distance between the first wireless device and the base station serving the first wireless device and a radio distance between the second wireless device and the base station serving the second wireless device are less than a predefined threshold radio distance; and
selecting an uplink resource of the cellular communication network as the resource for the direct device to device communication link between the first wireless device and the second wireless device if the base station serving the first wireless device and the base station serving the second wireless device are equipped with an interference cancellation receiver and at least one of the radio distance between the first wireless device and the base station serving the first wireless device and the radio distance between the second wireless device and the base station serving the second wireless device is greater than the predefined threshold radio distance.

* * * * *